United States Patent

[11] 3,573,732

[72] Inventors Carl Greenblum
Stamford;
Robert L. Metz, Nichols, Conn.
[21] Appl. No. 703,052
[22] Filed Feb. 5, 1968
[45] Patented Apr. 6, 1971
[73] Assignee The Bunker-Ramo Corporation
Stamford, Conn.

[54] INFORMATION STORAGE AND DISPLAY SYSTEM
74 Claims, 35 Drawing Figs.

[52] U.S. Cl. .......... 340/154, 340/324
[51] Int. Cl. .......... G08b 11/00
[50] Field of Search .......... 235/157, 166; 340/172.5, 154, 152, 153, 324, 324.1

[56] References Cited

UNITED STATES PATENTS

| | | | |
|---|---|---|---|
| 3,242,470 | 3/1966 | Hagelbarger et al. .......... | 340/153X |
| 3,296,597 | 1/1967 | Scantlin et al. .......... | 340/152X |
| 3,310,782 | 3/1967 | Sinn et al. .......... | 340/152X |
| 3,387,268 | 6/1968 | Epstein .......... | 340/154 |
| 3,416,134 | 12/1968 | Gertler et al. .......... | 340/154 |
| 3,453,384 | 7/1969 | Donner et al. .......... | 340/324.1X |

*Primary Examiner*—Donald J. Yusko
*Attorney*—Frederick M. Arbuckle

ABSTRACT: An information storage and display system having a memory element in which items of information to be displayed on a plurality of display devices are stored. The information may be displayed in any one of a plurality of different forms with the information in a given form which is to be displayed on a given display device being stored in an identifiable address position of tee memory element. Information of various types is sequentially applied to the system and is selectively stored, under control of item and form selecting means, in positions of the memory element. Also provided are means for selecting a display form for a given display device and means operable in response to the selecting means for gating information from the appropriate position in the memory element to control the display on a display device.

INVENTOR.
CARL GREENBLUM
ROBERT L. METZ
BY Ronald J. Kransdorf
ATTORNEY

| RECORD LINE | DATA LINE | WORD | 0 | 1 | 2 | 3 |
|---|---|---|---|---|---|---|
| | 1 | | ABC | DEF | GHI | JKL |
| | 2 | CLOSE | 42::1 | 105::2 | 6::5 | 12 |
| | 3 | OPEN | 42::1 | 05::2 | 6::6 | 12 |
| 0 | 4 | HI | 43::2 | 05::3 | 6::6 | 12::2 |
| | 5 | LO | 42::1 | 04::7 | 6::5 | 12 |
| | 6 | LAST | ∴ 42::7 | ∵ 04::7 | ∵ 6::5 | ∴ 12::2 |
| | 0 | | | | | |
| | 1 | | MNO | PQR | STU | VWX |
| | 2 | CLOSE | 234::2 | 83::5 | 52 | 2::4 |
| | 3 | OPEN | 34::3 | 83::7 | 52 | 2::4 |
| 1 | 4 | HI | 34::5 | 84::1 | 52 | 2::6 |
| | 5 | LO | 34::2 | 83::6 | 51::7 | 2::4 |
| | 6 | LAST | ∴ 34::4 | ∴ 84 | ∵ 51::7 | ∵ 2::4 |
| | 0 | | | | | |
| | 1 | | YZA | BCD | EFG | HIJ |
| | 2 | CLOSE | 93 | 64::4 | 126 | 25::4 |
| | 3 | OPEN | 93 | 64::4 | 26 | 25::5 |
| 2 | 4 | HI | 93::4 | 64::5 | 26::3 | 26:: |
| | 5 | LO | 93 | 64::3 | 26 | 25::5 |
| | 6 | LAST | ∴ 93::4 | ∴ 64::5 | ∵ 26::1 | ∴ 26 |

FIG. 2

| | | | | |
|---|---|---|---|---|
| | ABC | DEF | GHI | JKL |
| CLOSE | 42::1 | 105::2 | 6::5 | 12 |
| BID | 42::6 | 04::7 | 6::5 | 12::2 |
| ASK | 42::7 | 04::9 | 6::5 | 12::4 |
| VOL | 90 | 10 | 300 | 200 |
| LAST | ∴ 42::7 | ∵ 04::7 | ∵ 6::5 | ∴ 12::2 |
| | MNO | PQR | STU | VWX |
| CLOSE | 234::2 | 83::5 | 52 | 2::4 |
| BID | 34::4 | 83::6 | 51::7 | 2::4 |
| ASK | 34::4 | 84 | 52 | 2::4 |
| VOL | 100 | 50 | 100 | 500 |
| LAST | 34::4 | 84 | 51::7 | 2::4 |
| | YZA | BCD | EFG | HIJ |
| CLOSE | 93 | 64::4 | 126 | 25::7 |
| BID | 93::3 | 64::5 | 26 | 26 |
| ASK | 93::5 | 64::7 | 26::1 | 26 |
| VOL | 40 | 50 | 100 | 120 |
| LAST | ∴ 93::4 | ∴ 64::5 | ∵ 26::1 | ∴ 26 |

FIG. 3

PATENTED APR 6 1971 3,573,732

SHEET 07 OF 30

INFORMATION STORAGE AND DISPLAY SYSTEM

This invention relates to an information storage and display system and more particularly to a system which is capable of accepting input information in a first form and of selectively storing the information in various other forms such that the information may be displayed in a selected one or more forms on a plurality of display devices.

The form in which information is transmitted from one location to another is not generally the form in which the information may most suitably be displayed. The reason for this is that, in order to conserve bandwidth, it is desirable to transmit as little information as possible. This information generally relates to changes only. The display form should, on the other hand, provide as much information as possible.

One environment in which the above problem arises, and the environment which will be used in describing an illustrative embodiment of the invention, is the financial community. The line which is used to energize the large stockboards which appear in many stockbrokers' offices may, for example, transmit a first type of message for each transaction which includes a stock identification, the transaction price, the volume of the transaction, an indication as to whether the transaction price on the stock is a high or a low for the day, and perhaps an indication as to whether the last change in price for the particular stock was up or down. In the alternative, the message might be of a second type which identifies a particular stock and provides the latest bid and ask prices on the stock. The receiving system must determine whether the particular stock is one which is being displayed on the board at the receiving office and, if so, must select and store such portions of the input message as are to be displayed. For example, if the board displays only last prices, then only the price portion of the input message would be stored. If the display is of the type which shows close, open, high, low and last, then the price would be stored to be displayed in the last price position and, if an indication is received that the price is a high or a low, the price would also be stored to be displayed in the appropriate one of these positions. If the board is of a type which displays close, bid, ask, volume, and last, then it would store the volume and last price from a message of the first type, and would store bid and ask prices from a message of the second type. It might also be desired to display all transactions, or selected transactions, on a particular stock. In this event, when a transaction on the selected stock is detected, the price and volume inputs for the transaction would be stored in an appropriate memory position so as to permit this information to be displayed.

It is apparent that there are other environments in which it is desirable to be able to arrange and store information in incoming messages and to be able to retrieve the stored information for display. These environments may include, but are certainly not limited to, airline, railroad and other reservation systems, various military applications, election return results, and the like.

Systems presently in existence for accepting and displaying information generally lack flexibility. For stockboards, the incoming information is applied directly to the board to control the setting of the indicators thereon. If it is desired to change the form of the information being displayed, or to change one or more of the stocks being indicated, an expensive and time consuming rewiring of the board is required. In order to provide optimum utilization of available display capacity, a more flexible system should be provided. It should, therefore, be possible to change the form of the display from, for example, last price only to close, open, high, low, last merely by the pressing of button, or to change the stocks being displayed by merely pressing a few keys on a keyboard. More generally, it would be desirable to be able to rearrange the input information in a manner such that the form of the information, its level of detail, and the nature of the items being displayed may be easily changed in response to inputs from a keyboard or similar device. A system of this type should also be able to call attention to changes, or other interesting conditions, and to provide some limited information about them. A change in a last price could, for example, be caused to flash, or a flashing arrow could be provided adjacent to it, to indicate the change and the direction thereof.

It is apparent that in order to provide capabilities of the type described above, a storage device is required. Once a storage device is available, it may be used to store other types of information which it may be desired to display. For example, a stockbroker speaking to a customer may wish to view the customer's portfolio in order to be able to more effectively advise him as to a course of action to follow. Information as to the stock portfolios of selected customers could be stored during off hours in memory and made available to the broker on a display device in response to a keyboard input. Similarly, when news breaks on a particular stock which would indicate that immediate action should be taken by those holding it, a broker would like to be able to quickly ascertain the customers who should be contacted. A list of customers who hold certain selected stocks, along with quantity and other information, could also be stored and made available to the broker in response to a keyboard input. It is apparent that there are other situations and environments in which input data could be organized into selected lists which would be made available as required in response to a keyboard input.

It is therefore a primary object of this invention to provide an improved information storage and display system.

A more specific object of this invention is to provide an information storage and display system which is capable of accepting information in a first form and of storing it in a form more suitable for display.

Another object of this invention is to provide a system which is capable of storing applied data in a variety of different formats and of permitting the format in which the data is to be displayed to be easily controlled.

Still another object of this invention is to provide a system of the type described above which permits not only the form of the display to be easily altered but also permits easy alteration of the particular items which are to be displayed.

A further object of this invention is to provide an information storage and display system which permits changes or other factors to be displayed in a unique manner so as to call attention to them and to provide some additional information as to these factors.

A still further object of this invention is to provide an information storage and display system which permits the retrieval of selected items of information in response to a user input.

Another object of this invention is to provide a system of the type described above which may have its functional capabilities varied in a modular fashion in response to user inputs.

In accordance with these objects this invention provides a system for storing information and for displaying the stored information on a plurality of display devices such as cathode ray tubes (CRT's). Information is sequentially applied to this system in a first form and is converted, by the system, into at least two other forms more suitable for display. The conversion is accomplished by selectively storing the information in storage slots of a memory element with the information which is to be displayed in a particular form on a given display device being stored in an identifiable storage slot. In a preferred embodiment of the invention the memory element is divided into sections with each section being adapted to receive information in a different one of the forms. A corresponding storage position or slot is provided in each memory element section adapted to receive information in a particular form for each index point of each display element which is to display information in the form. The form displayed on any given storage element may be controlled and varied by an operator. In a preferred embodiment of the invention this is accomplished by changing the section of the memory element from which information for the given display tube is derived. The system also contains controls to permit the items to be displayed in each of the forms to be selected either by an operator or under computer control. The system then selects from the incoming information the information relating to the previously selected items and stores this information in appropriate positions of the memory element for subsequent display.

A change in the stored data may be noted by the system and utilized to cause a unique display on the display devices. The system may also respond to interrogations from, for example, a manually operated keyboard, to cause certain desired information to be displayed on a selected display device.

The foregoing and other objects, features and advantages of the invention will be apparent from the following more particular description of a preferred embodiment of the invention, as illustrated in the accompanying drawings.

In the drawings:

FIGS. 2–7 are illustrations of various display forms which may appear on a display device in a preferred embodiment of the invention.

Figure 9:
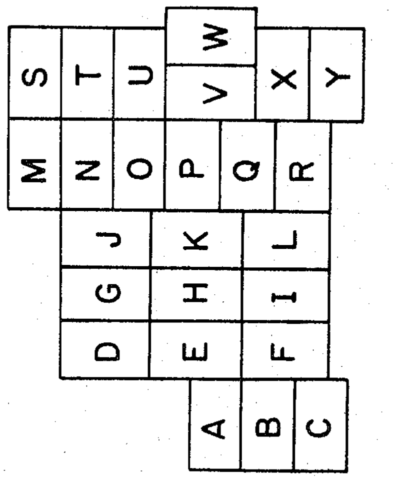
FIG. 9 is a diagram illustrating how
Figure 9A:
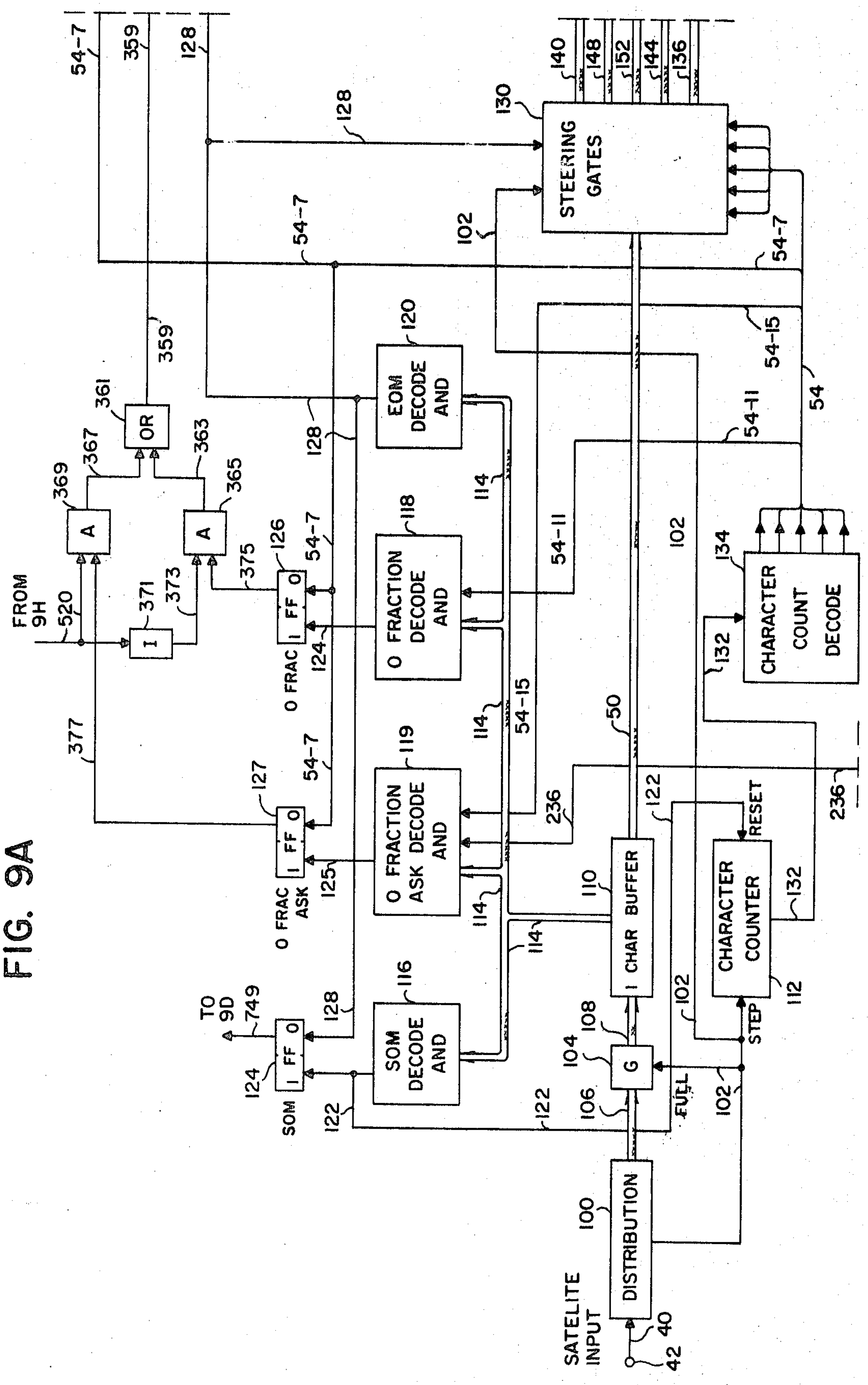
FIGS. 9A—9Y are to be combined to form a composite schematic block diagram of a preferred embodiment of the invention.
Figure 9B:
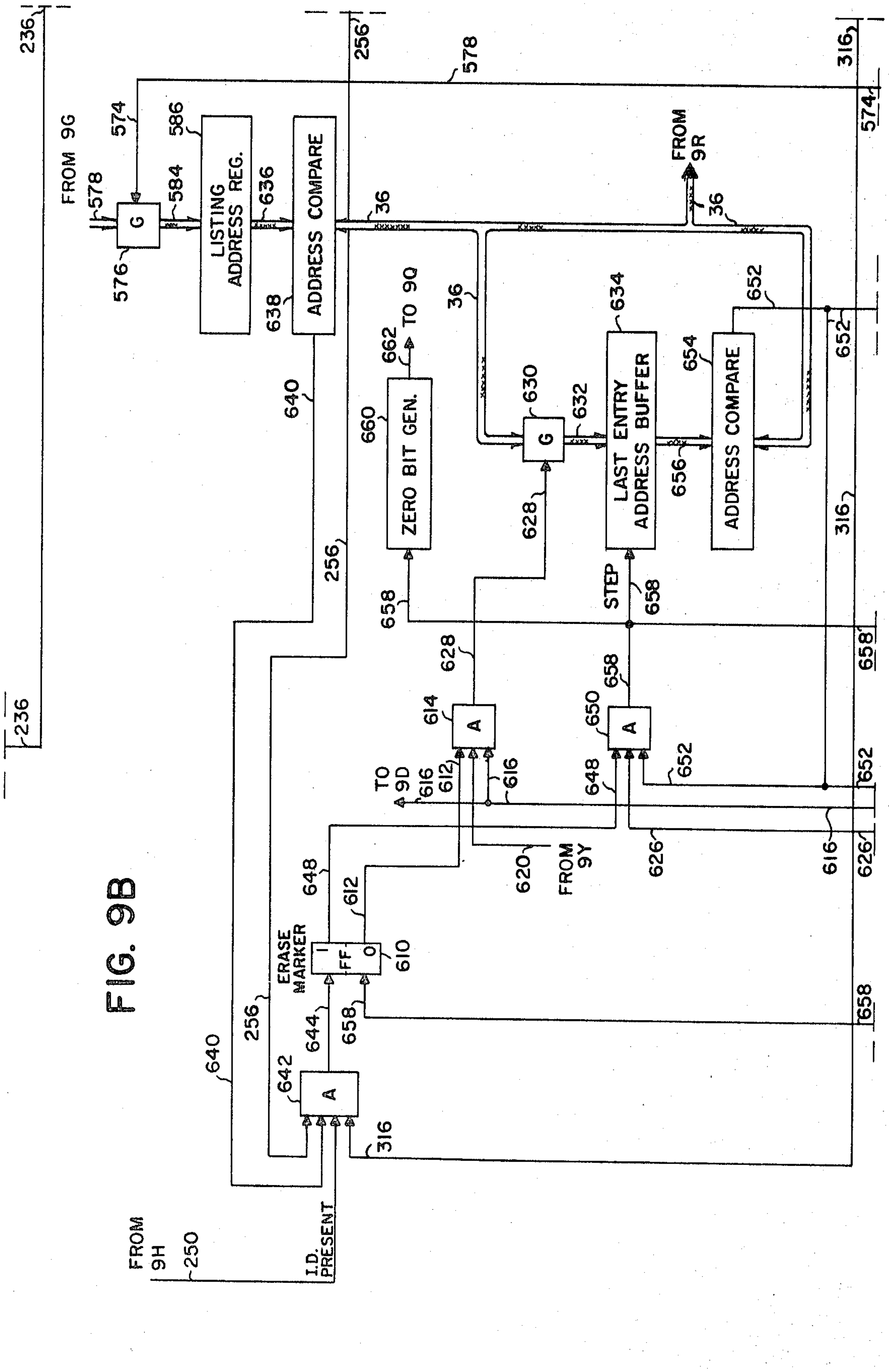
Figure 9C:
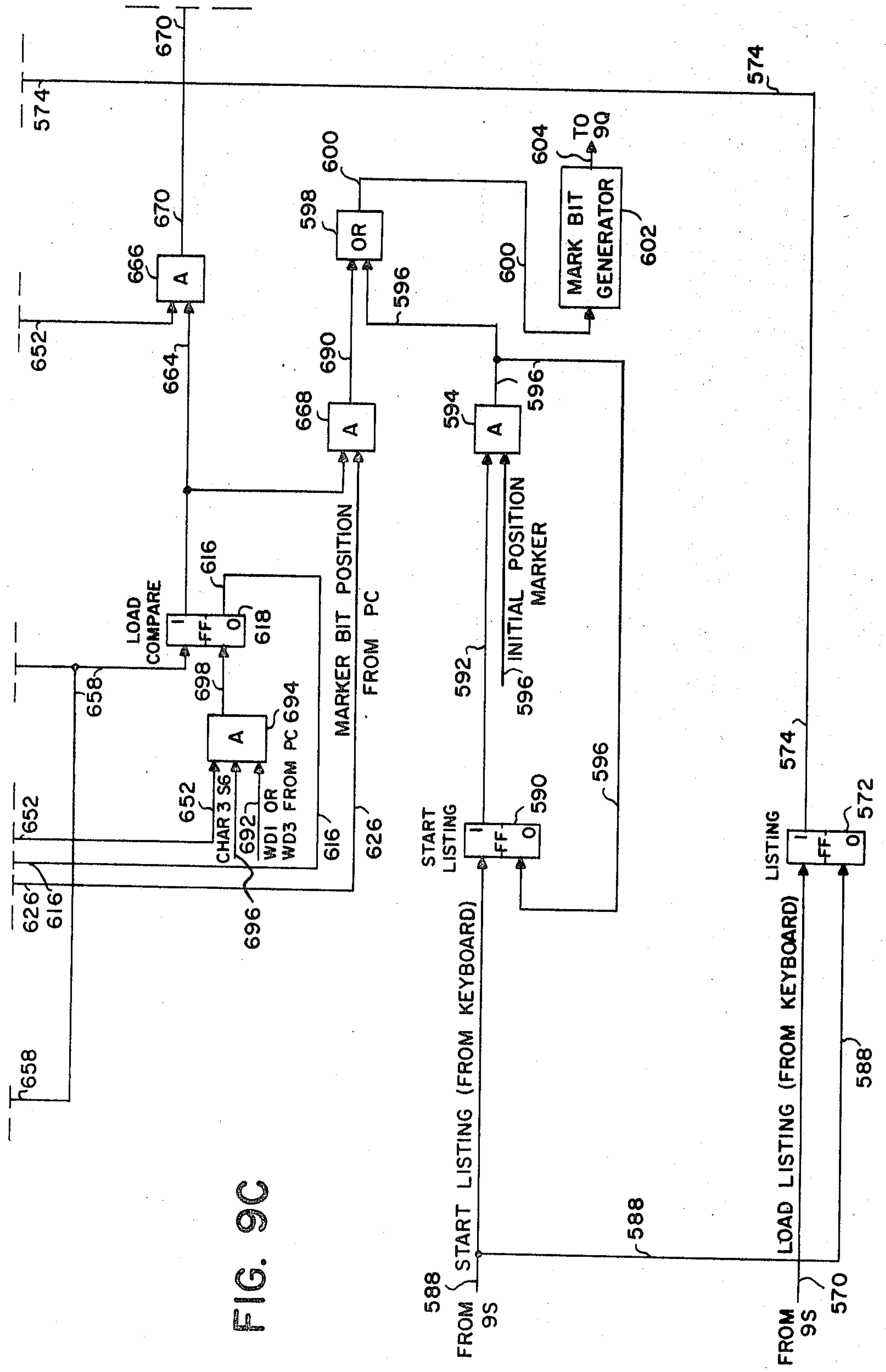
Figure 9D:
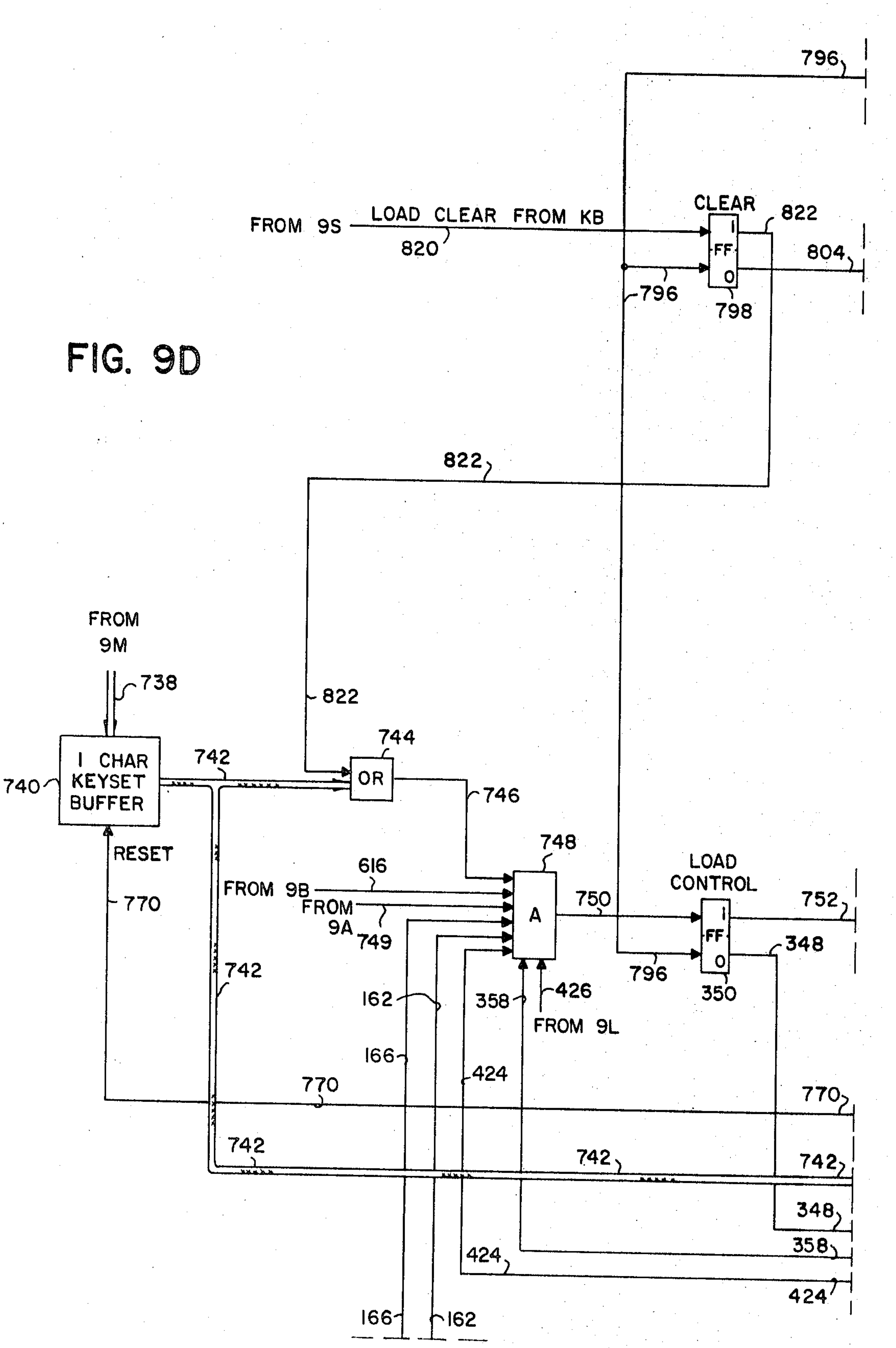
Figure 9E:
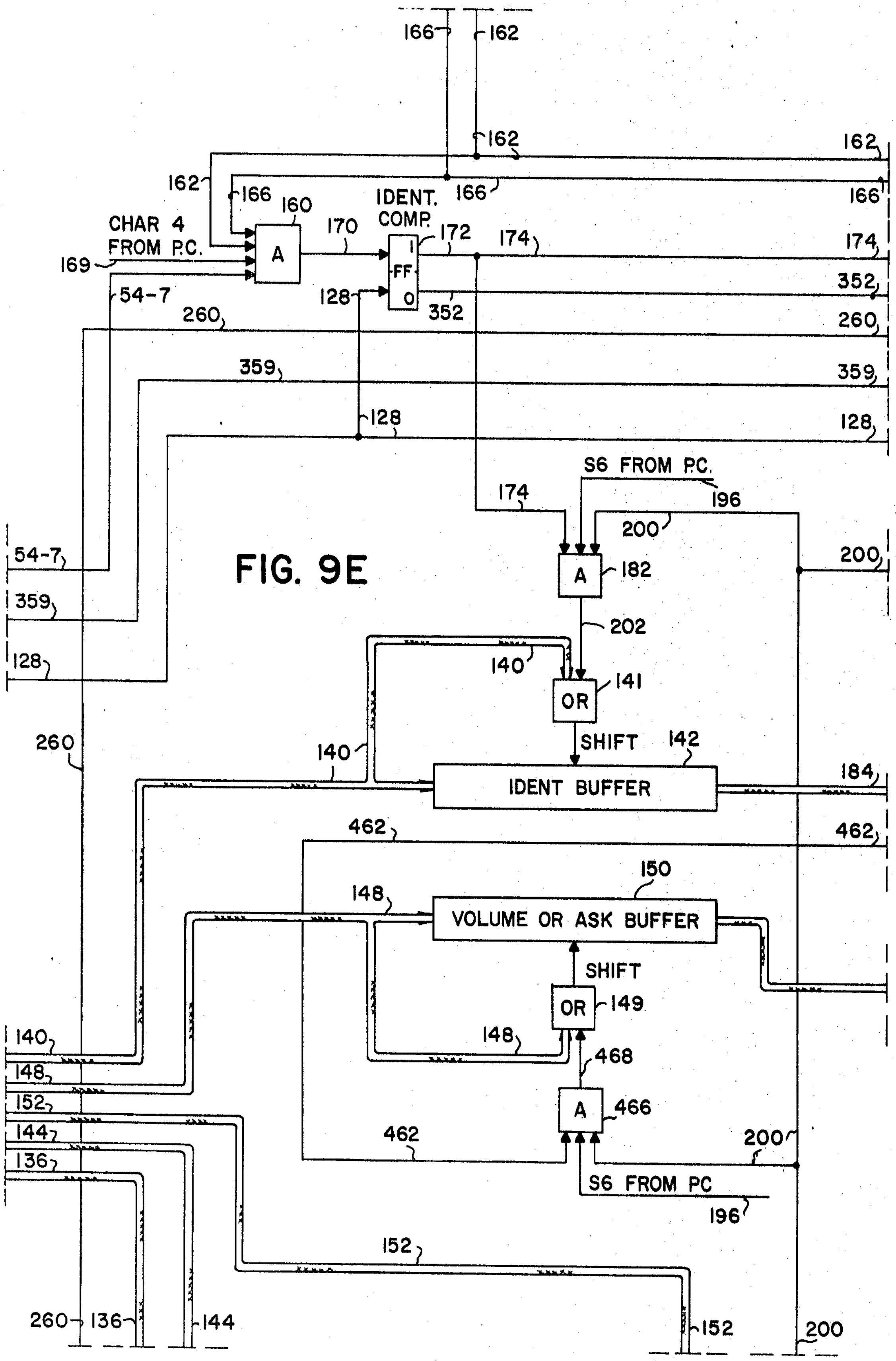
Figure 9F:
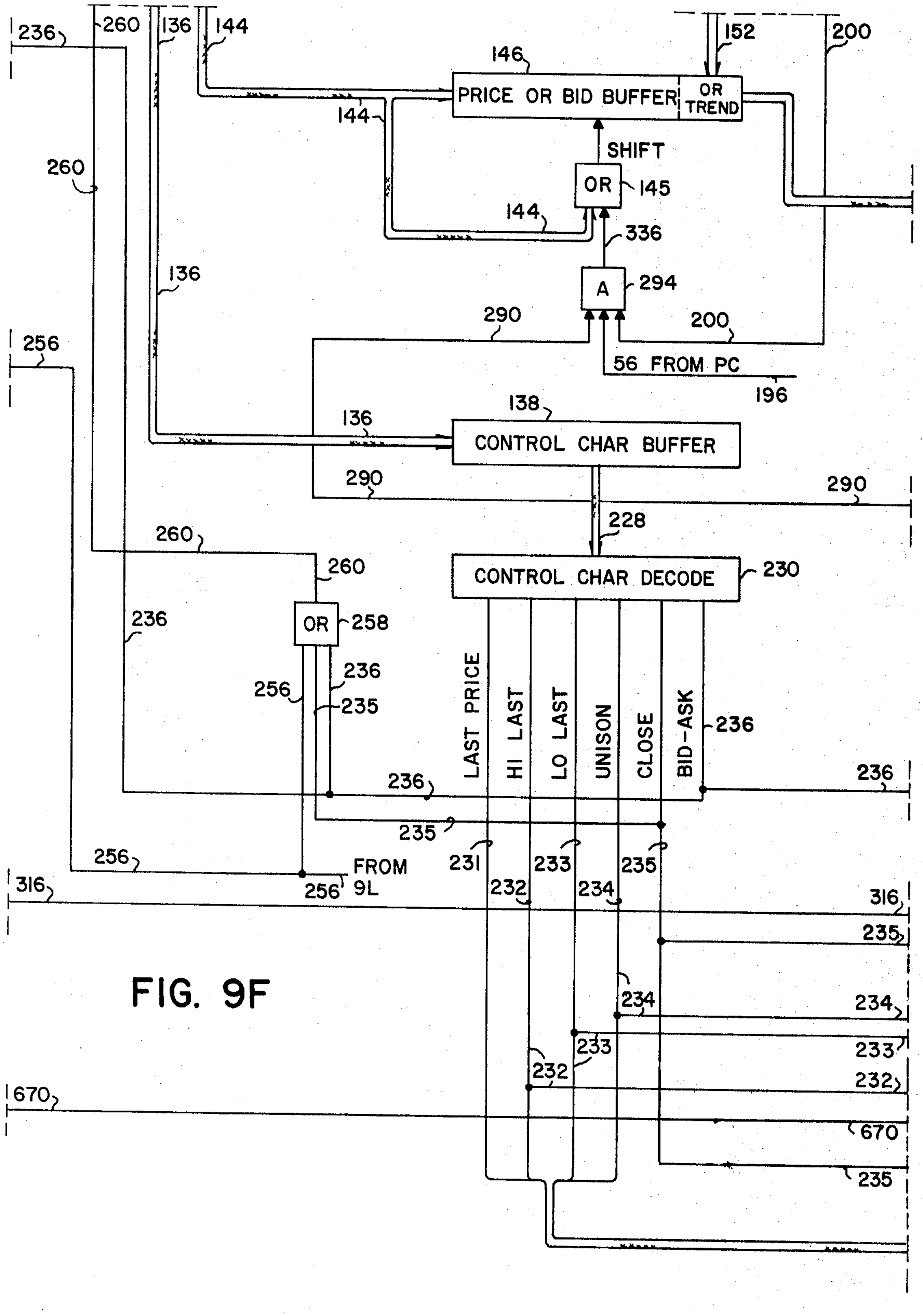
Figure 9G:
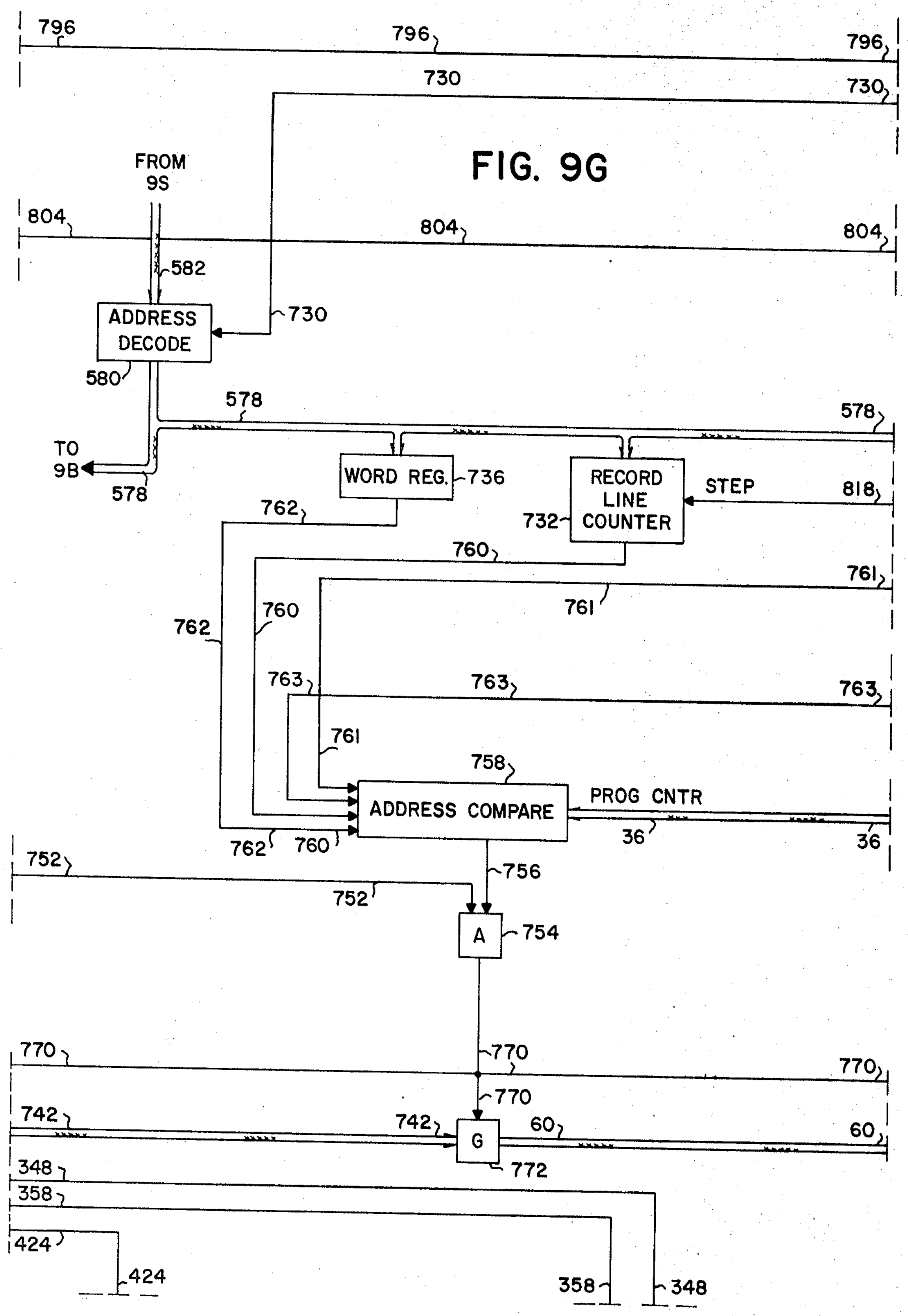
Figure 9H:
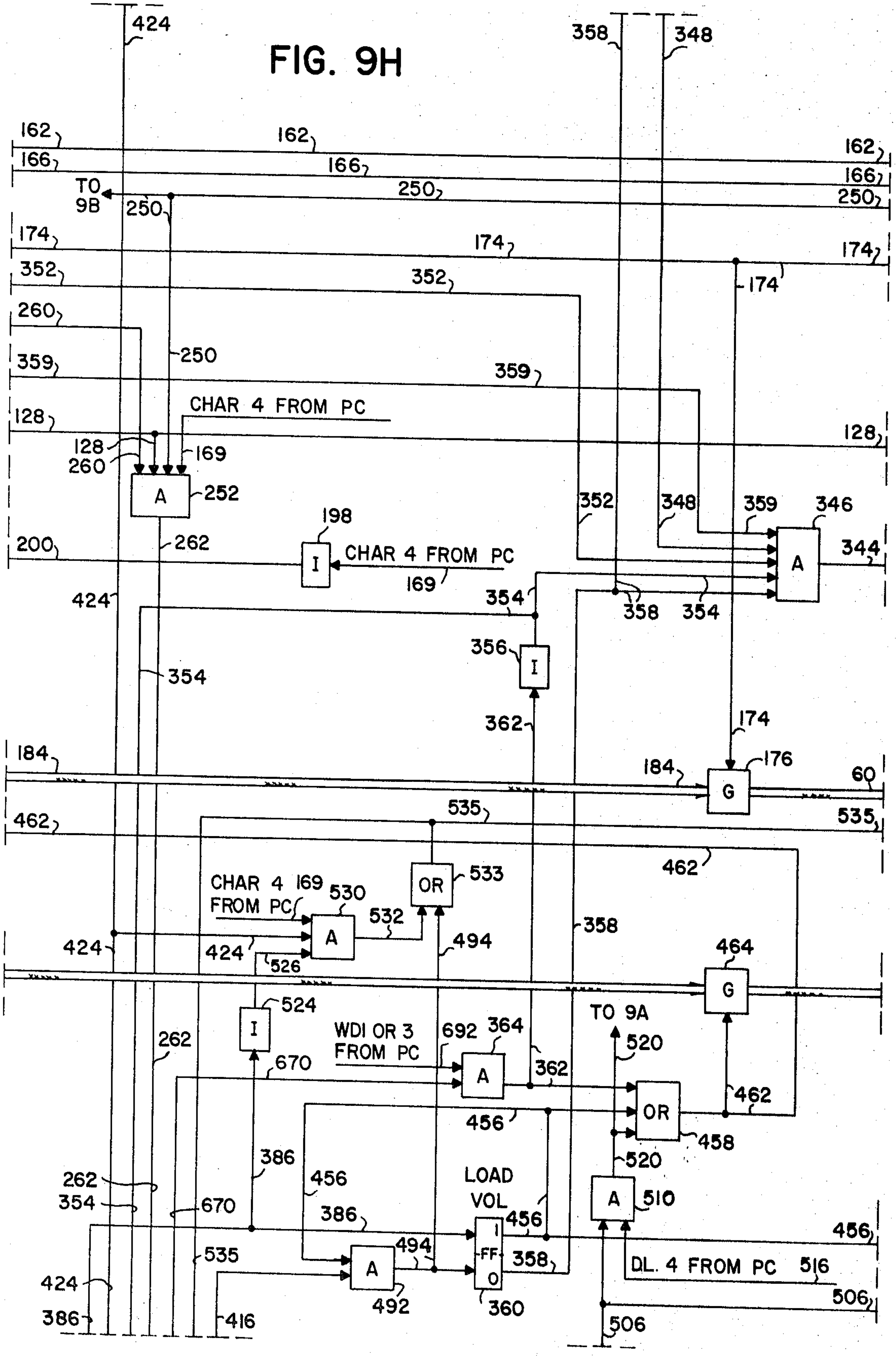
Figure 9I:
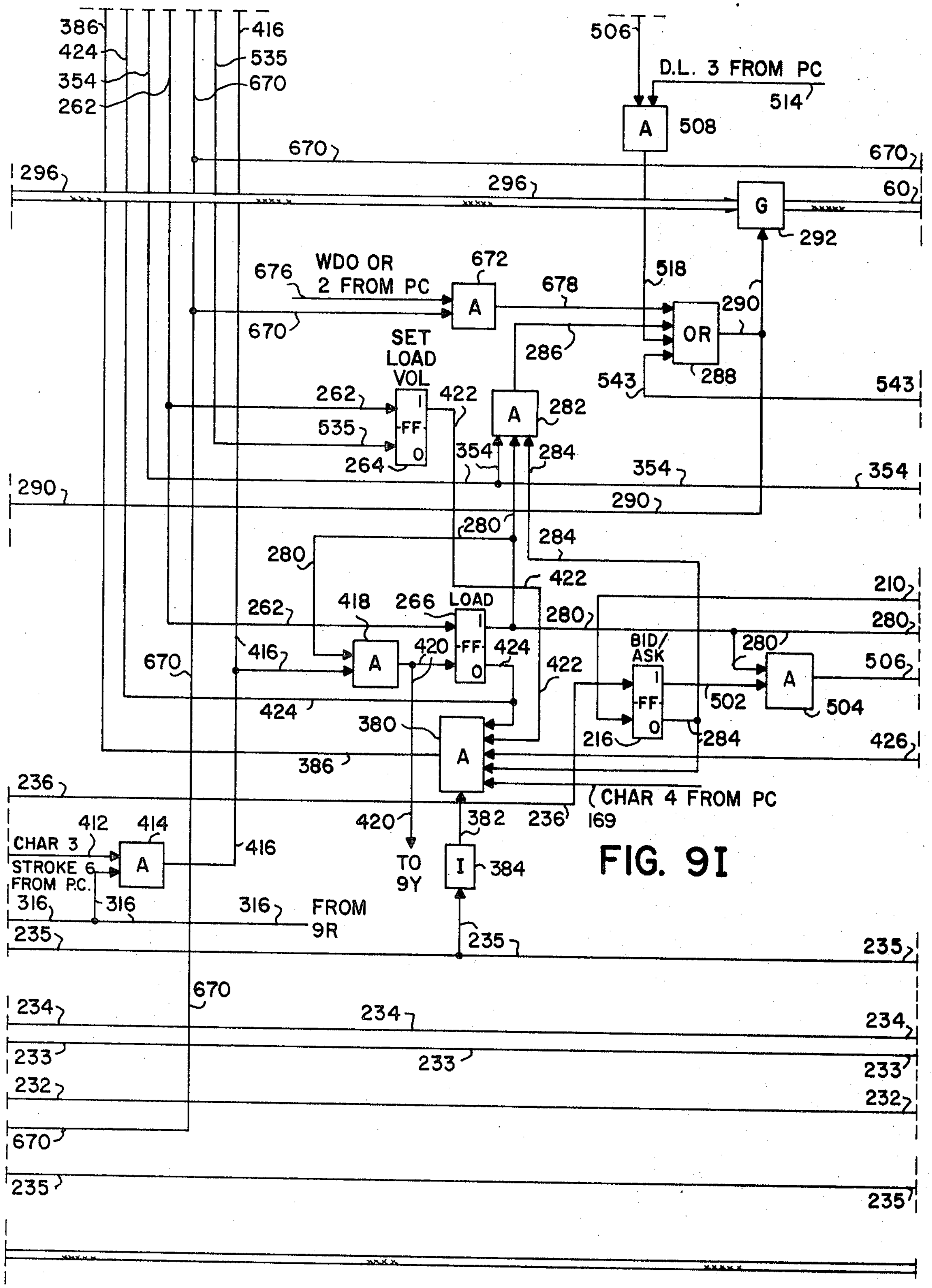
Figure 9J:
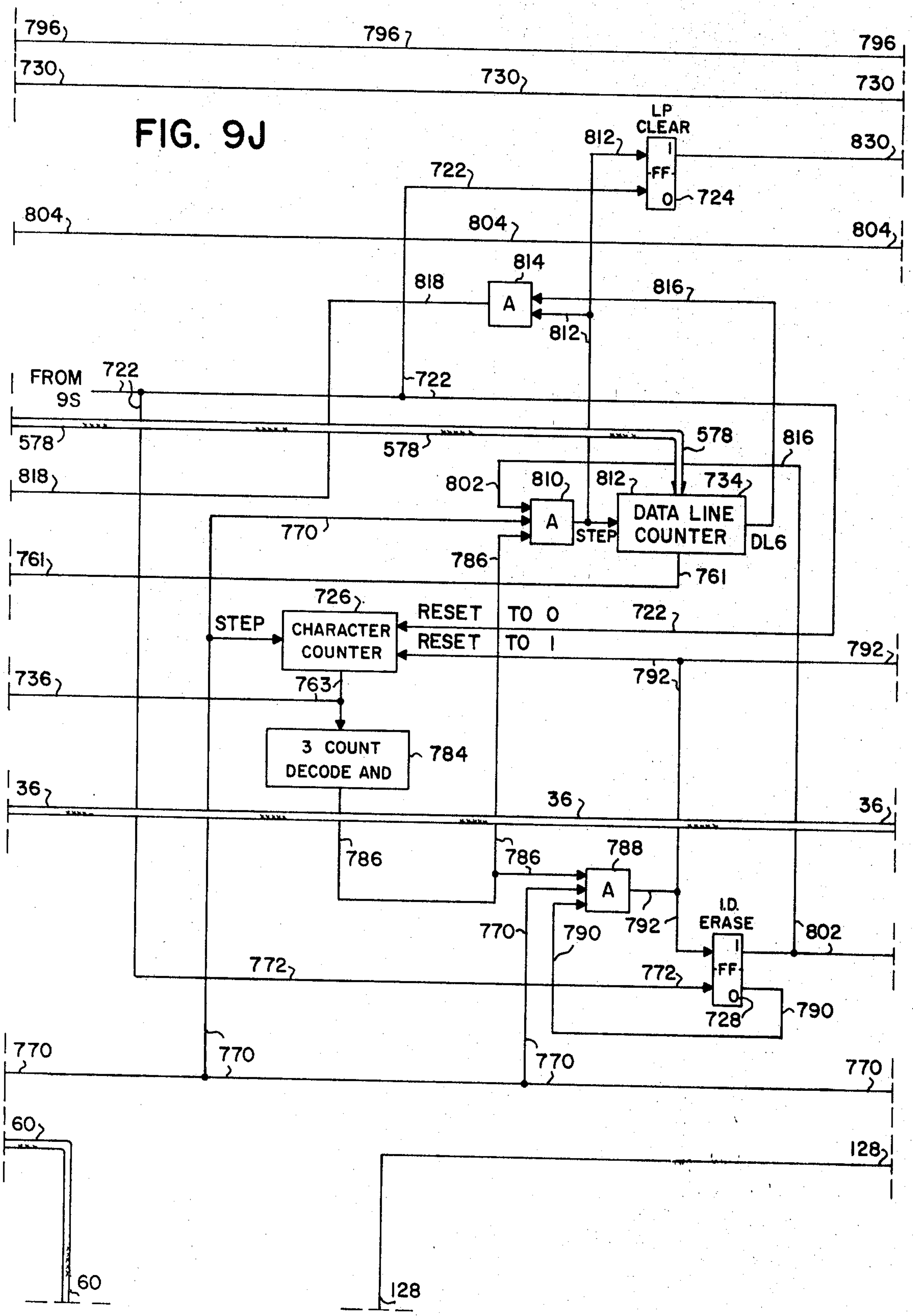
Figure 9K:
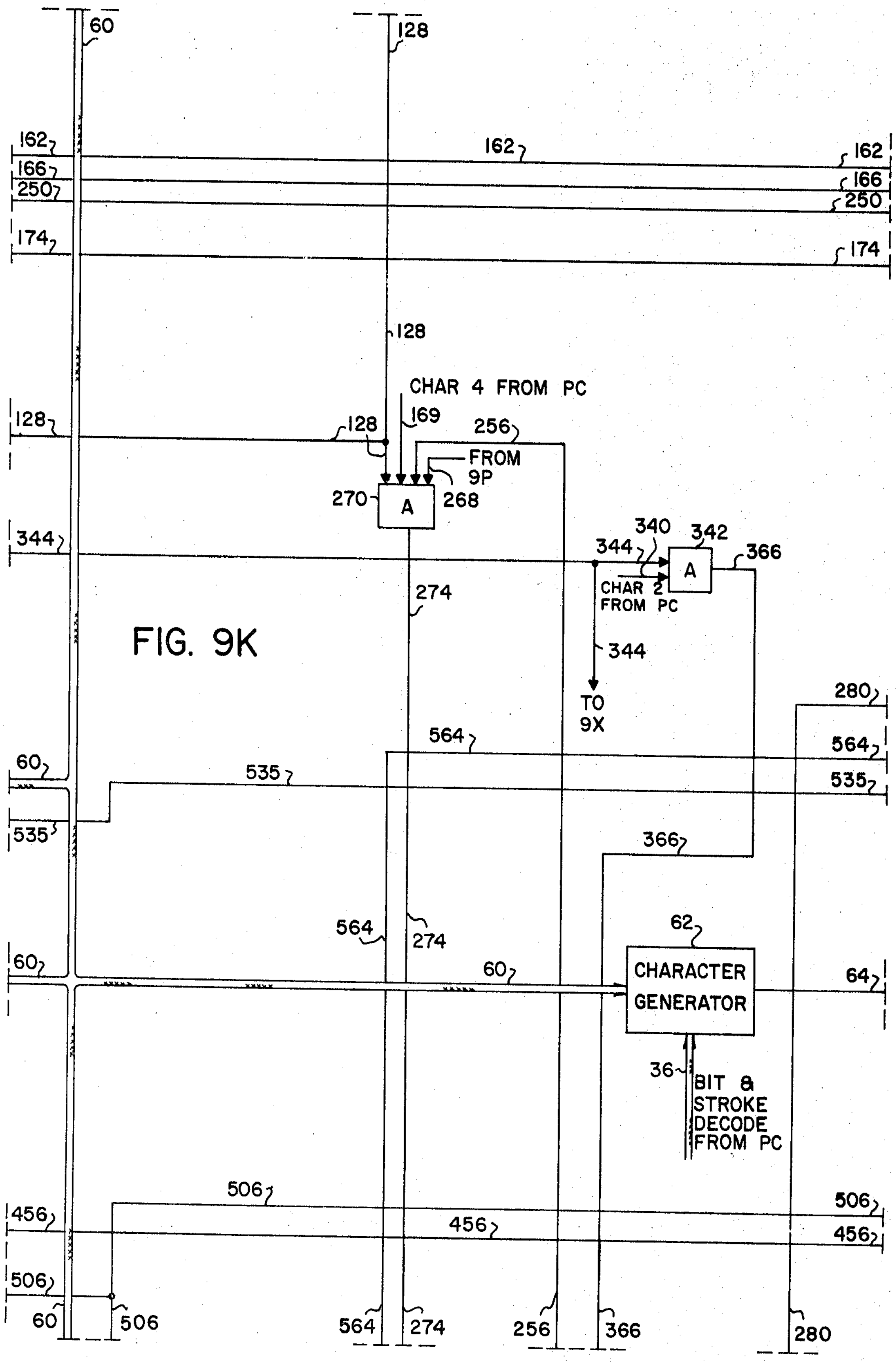
Figure 9L:
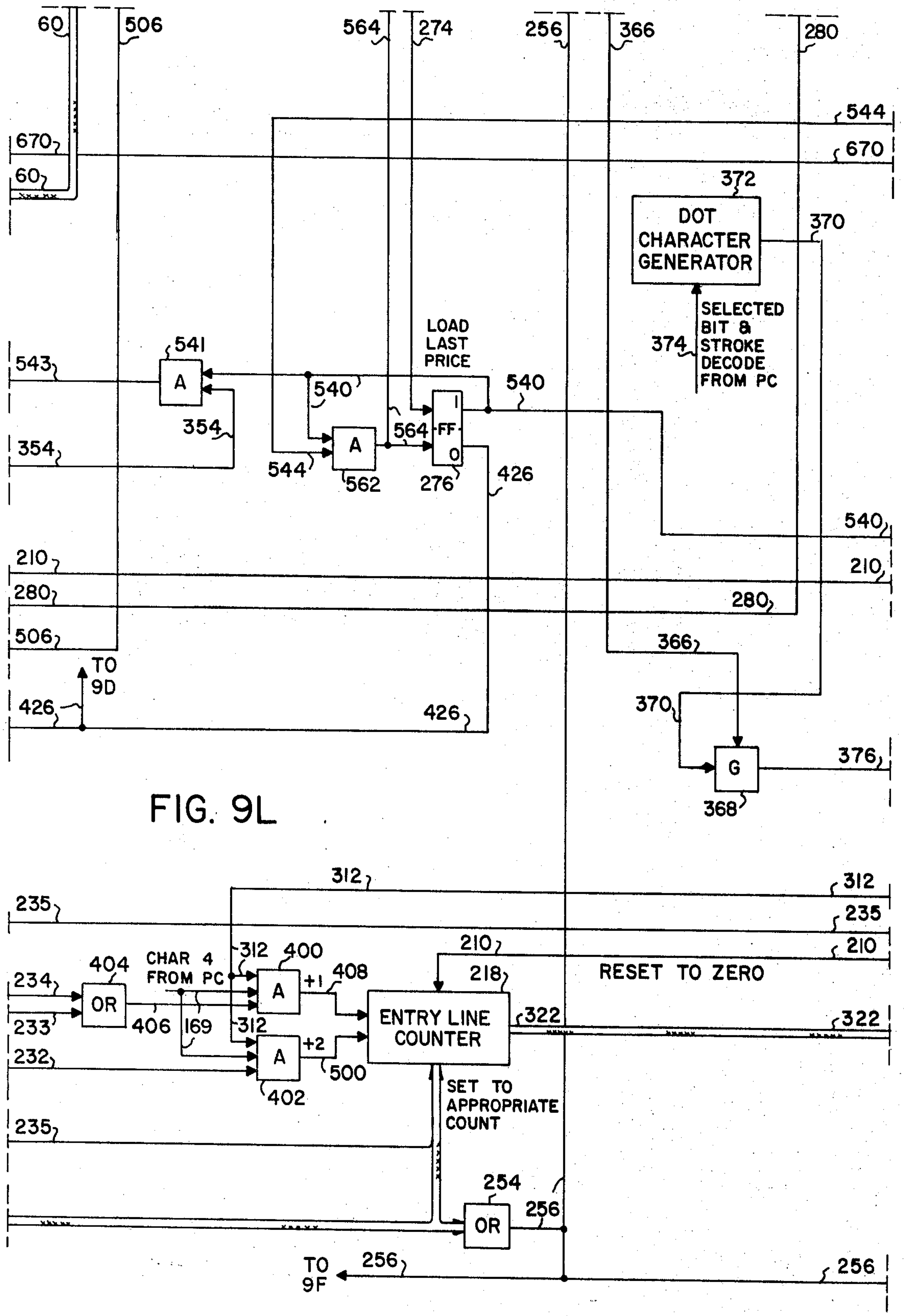
Figure 9M:
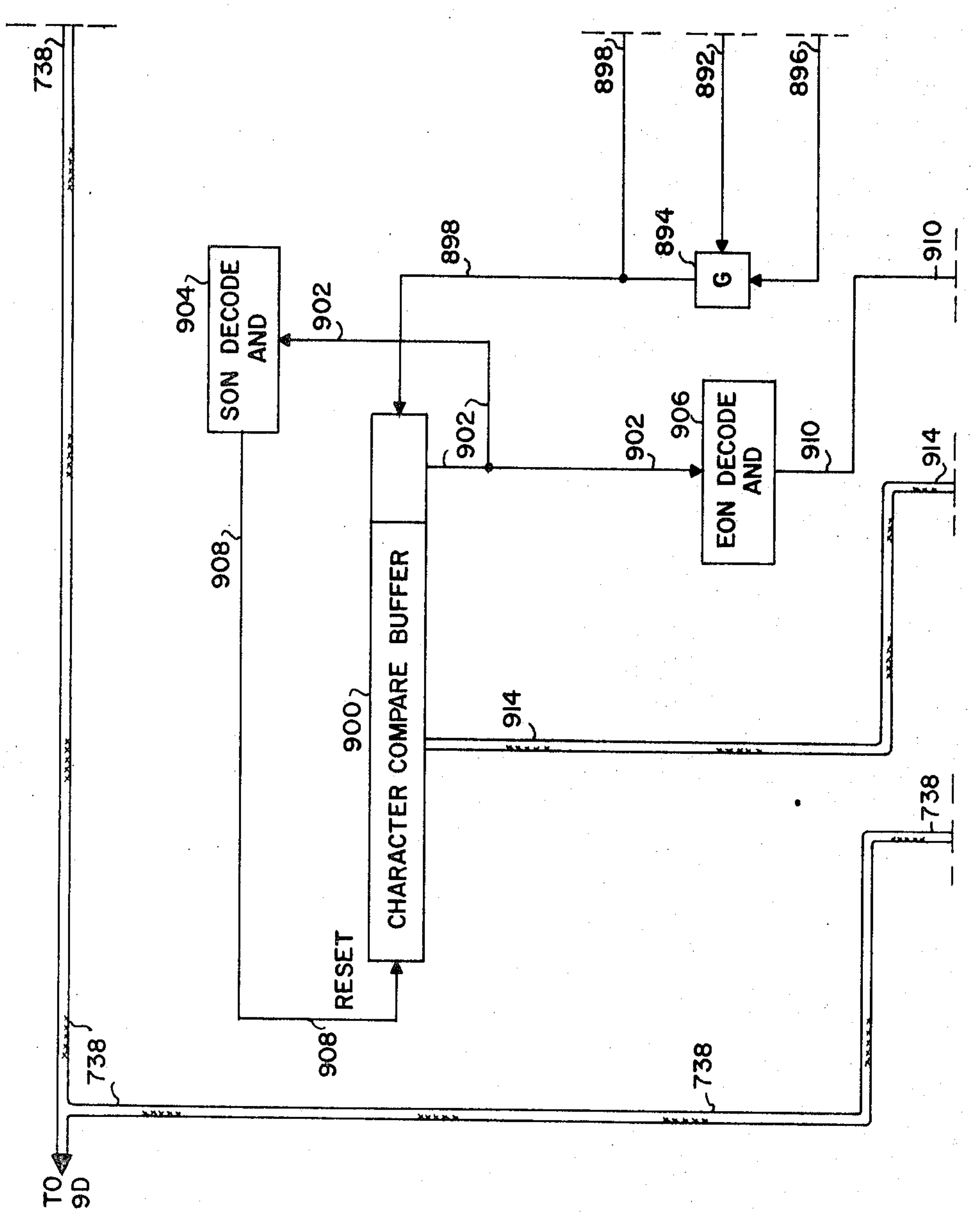
Figure 9N:
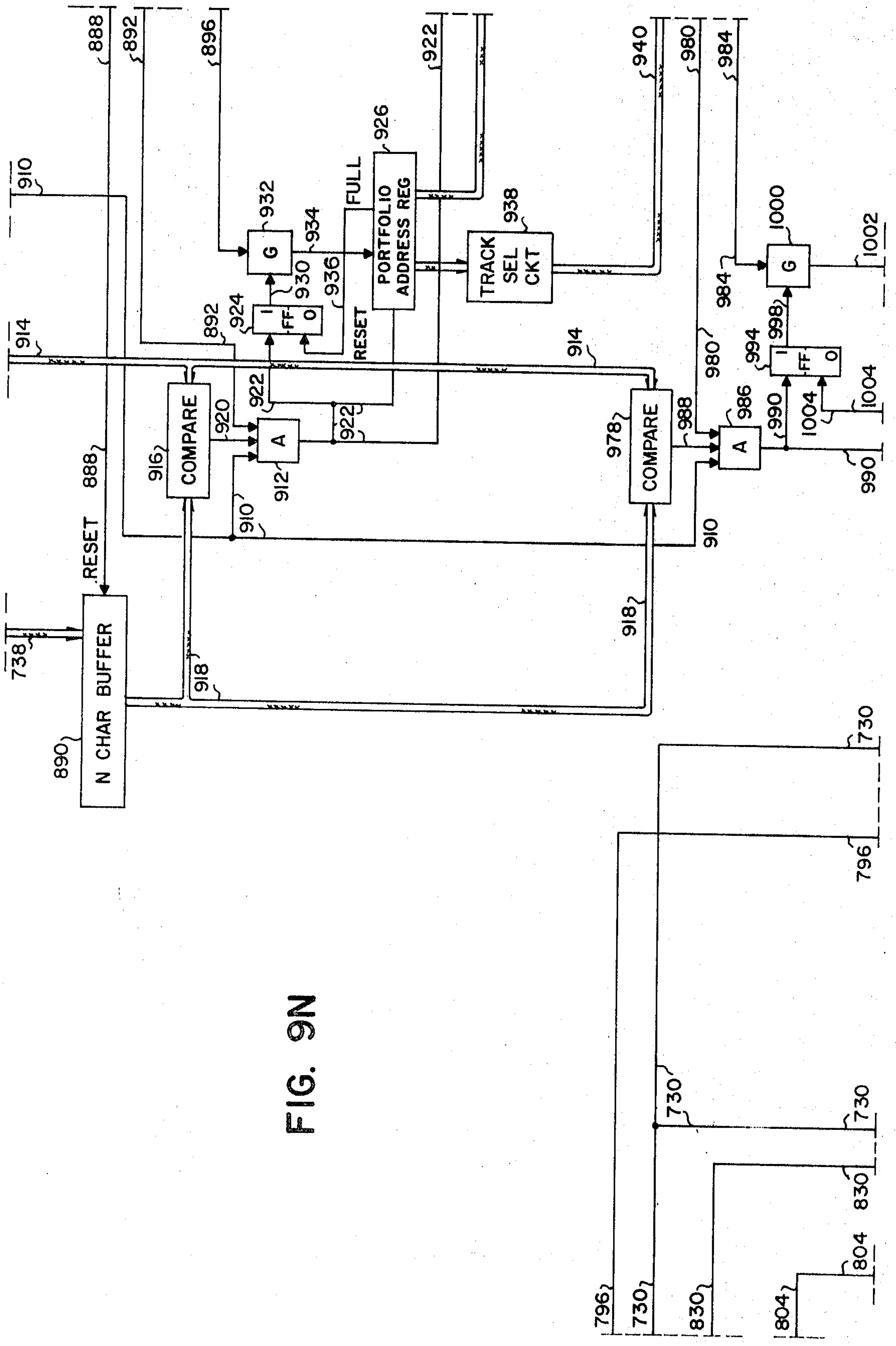
Figure 90:
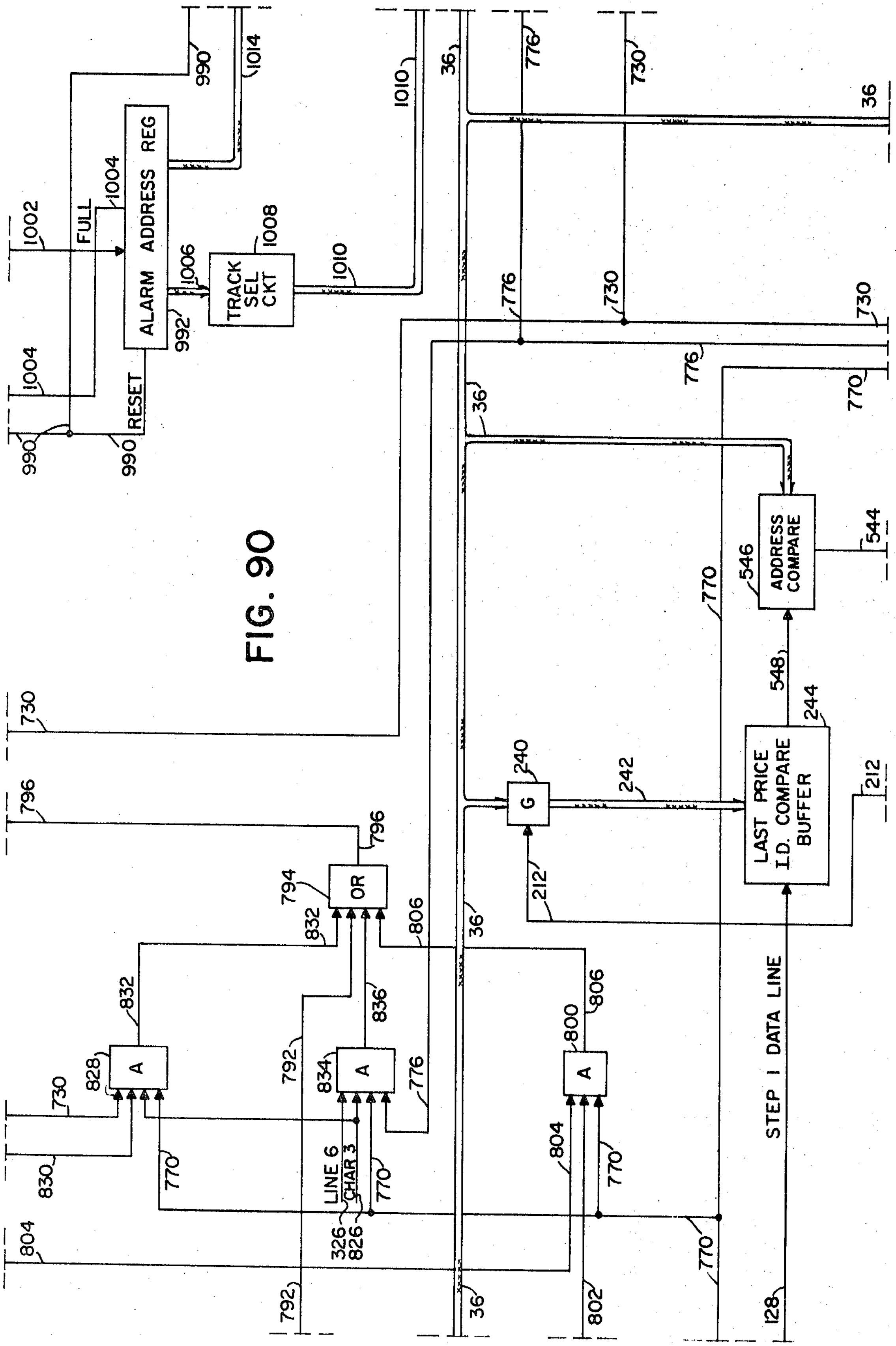
Figure 9P:
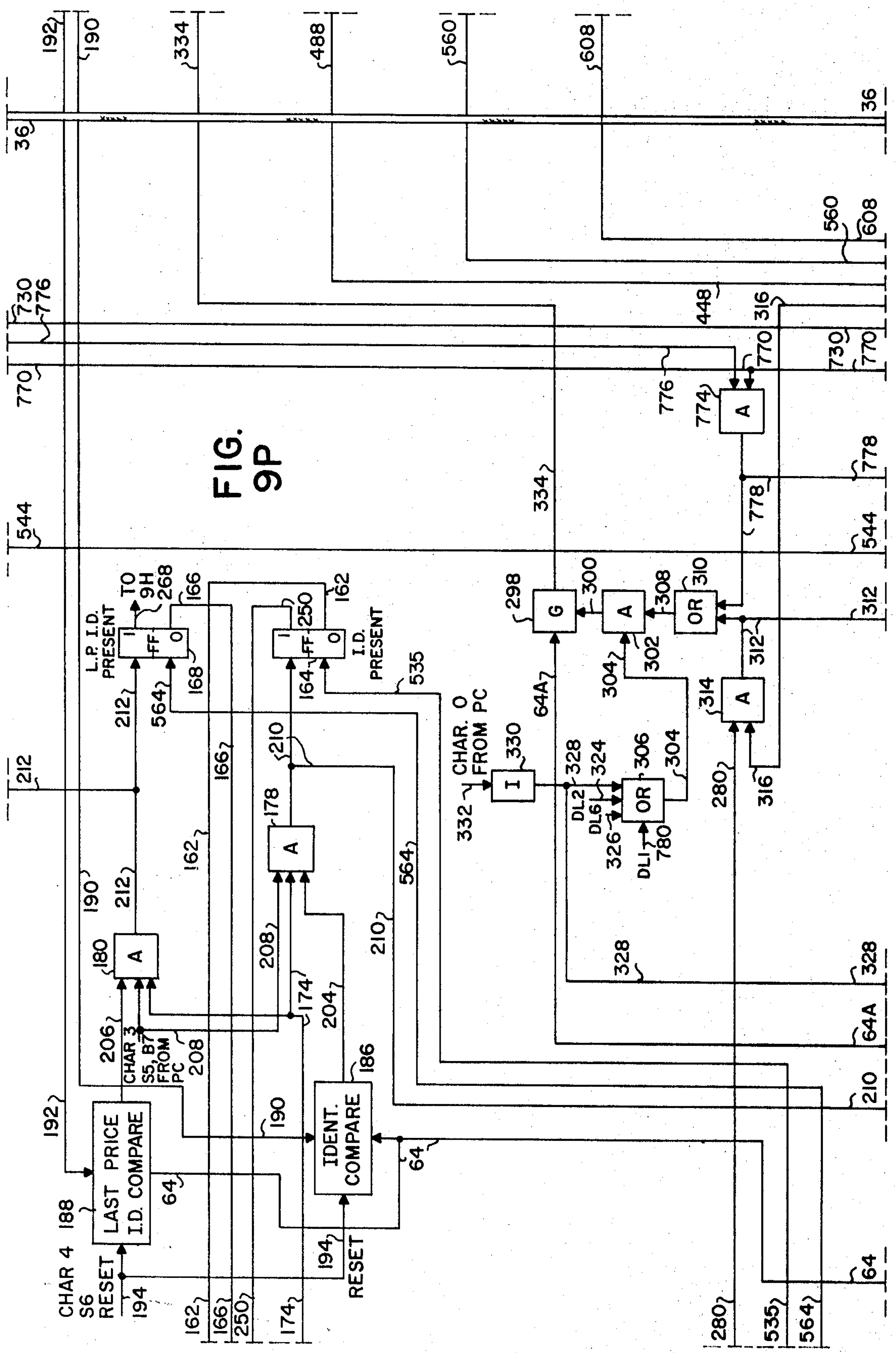
Figure 9Q:
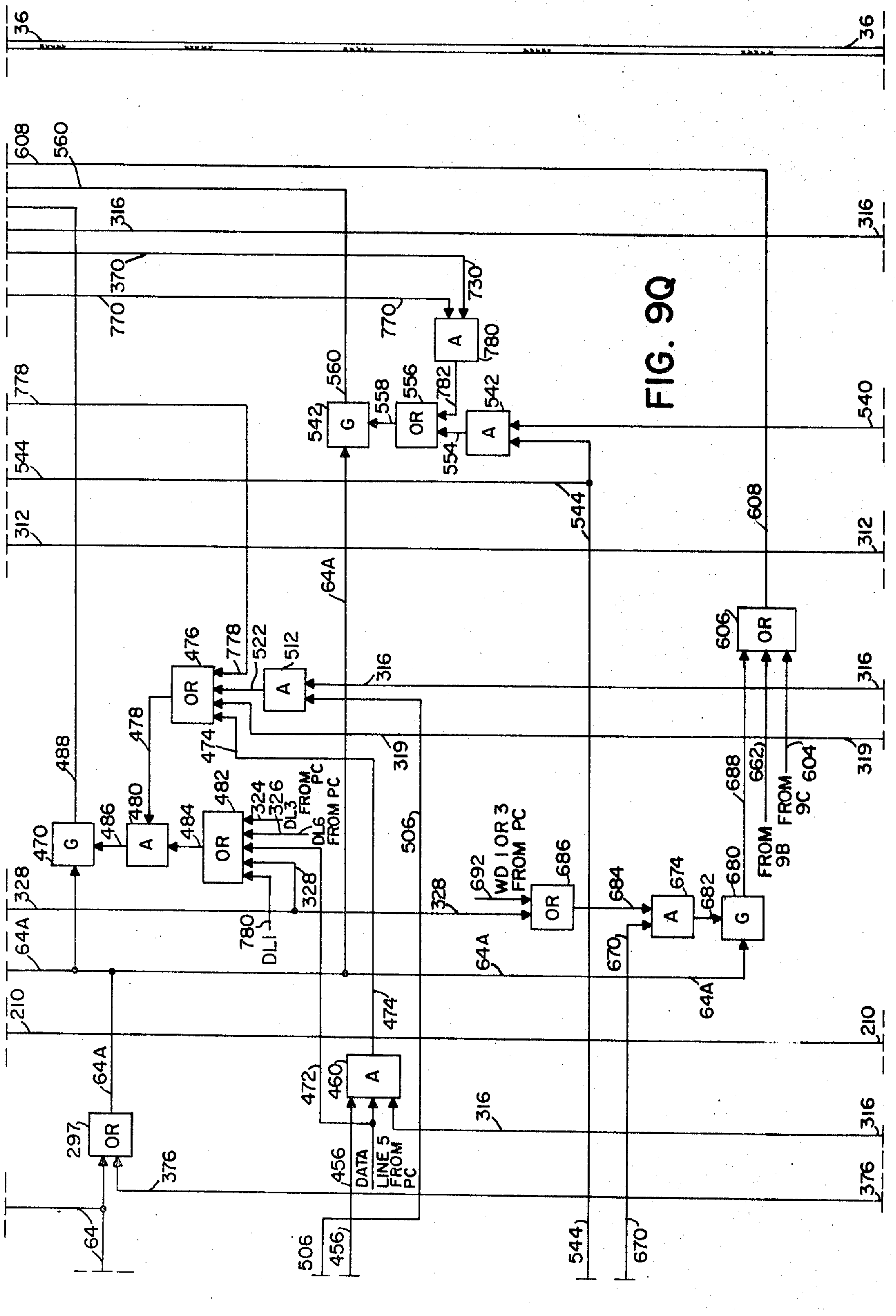
Figure 9R:
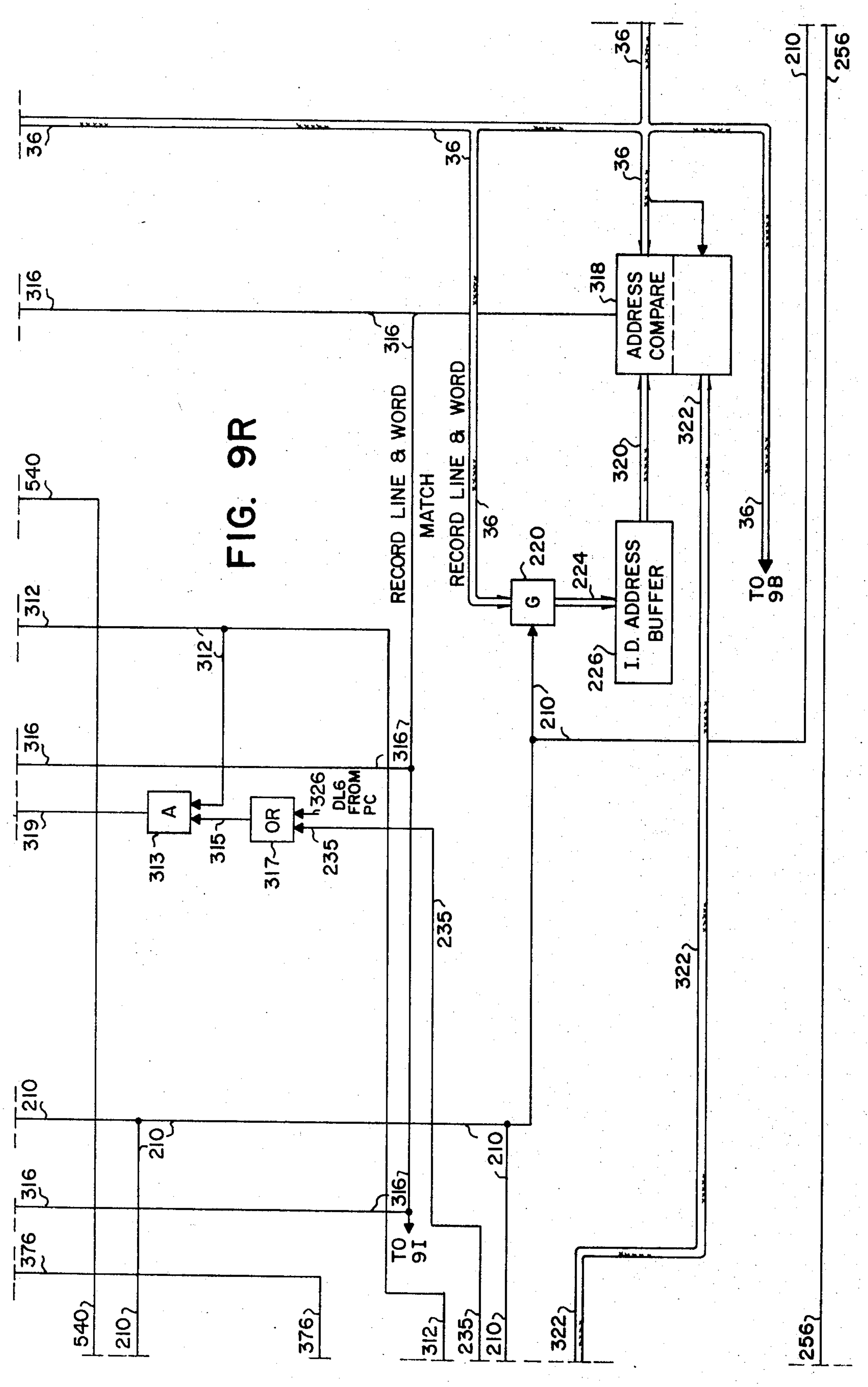
Figure 9S:
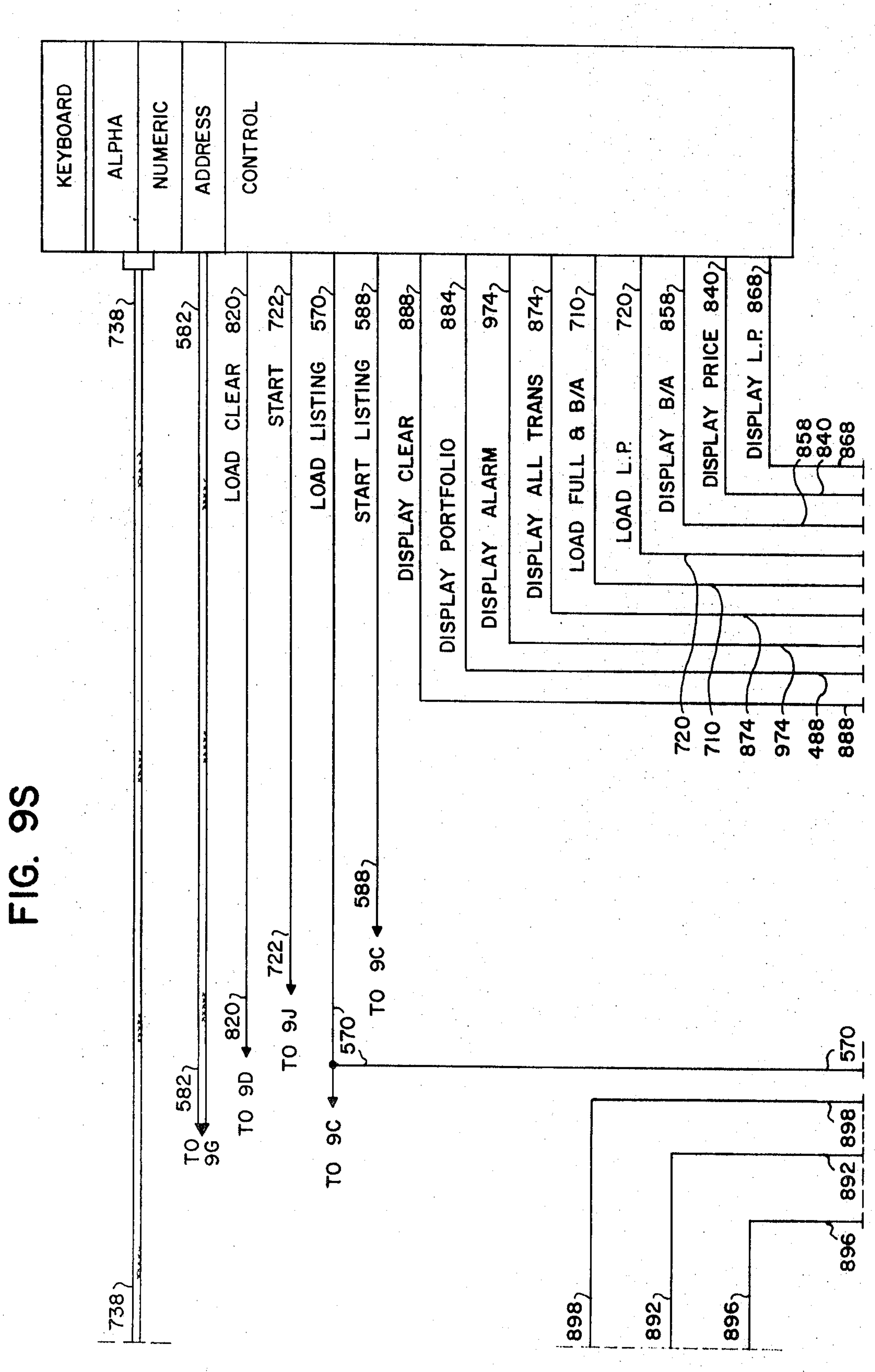
Figure 9T:
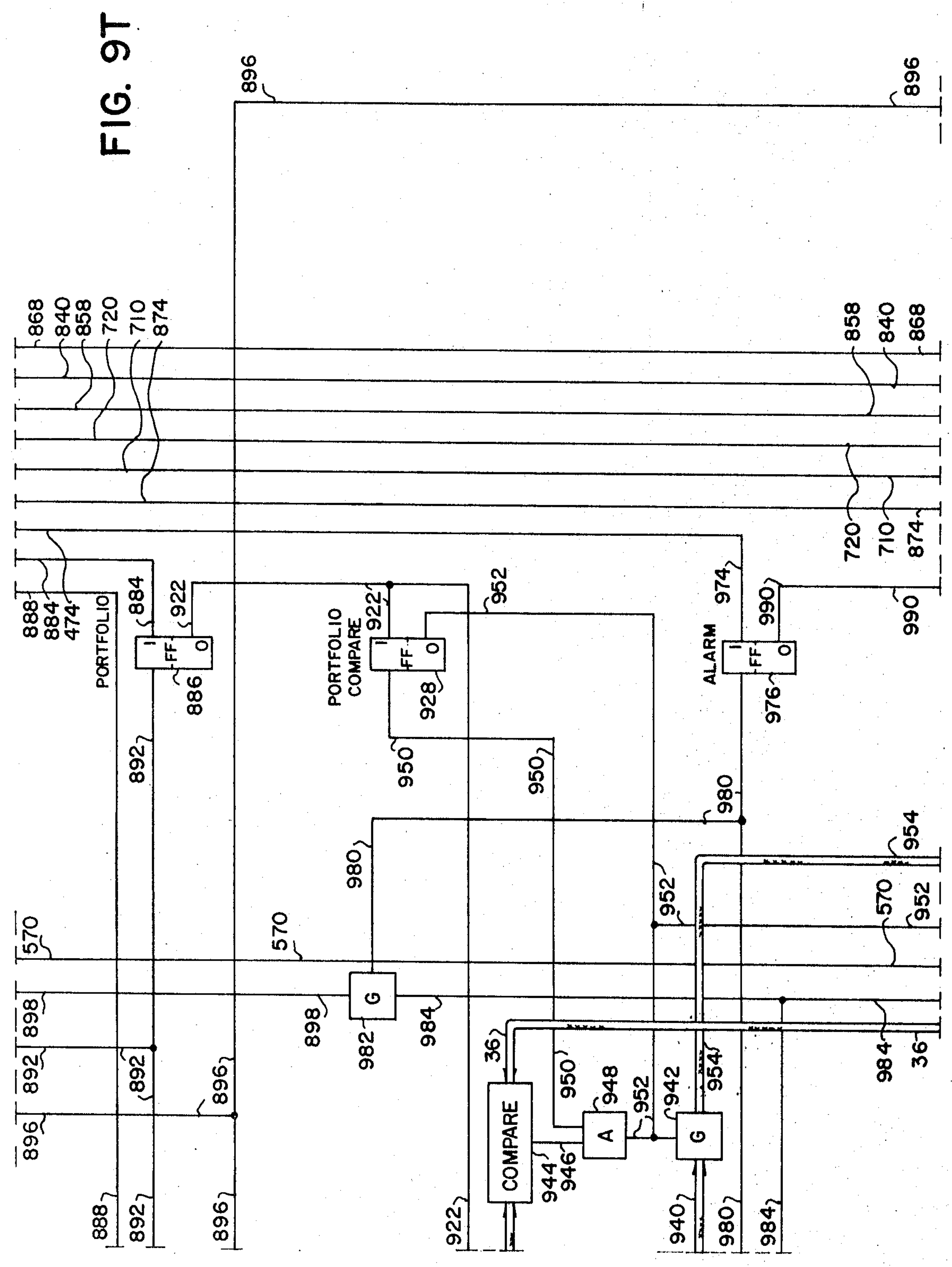
Figure 9U:
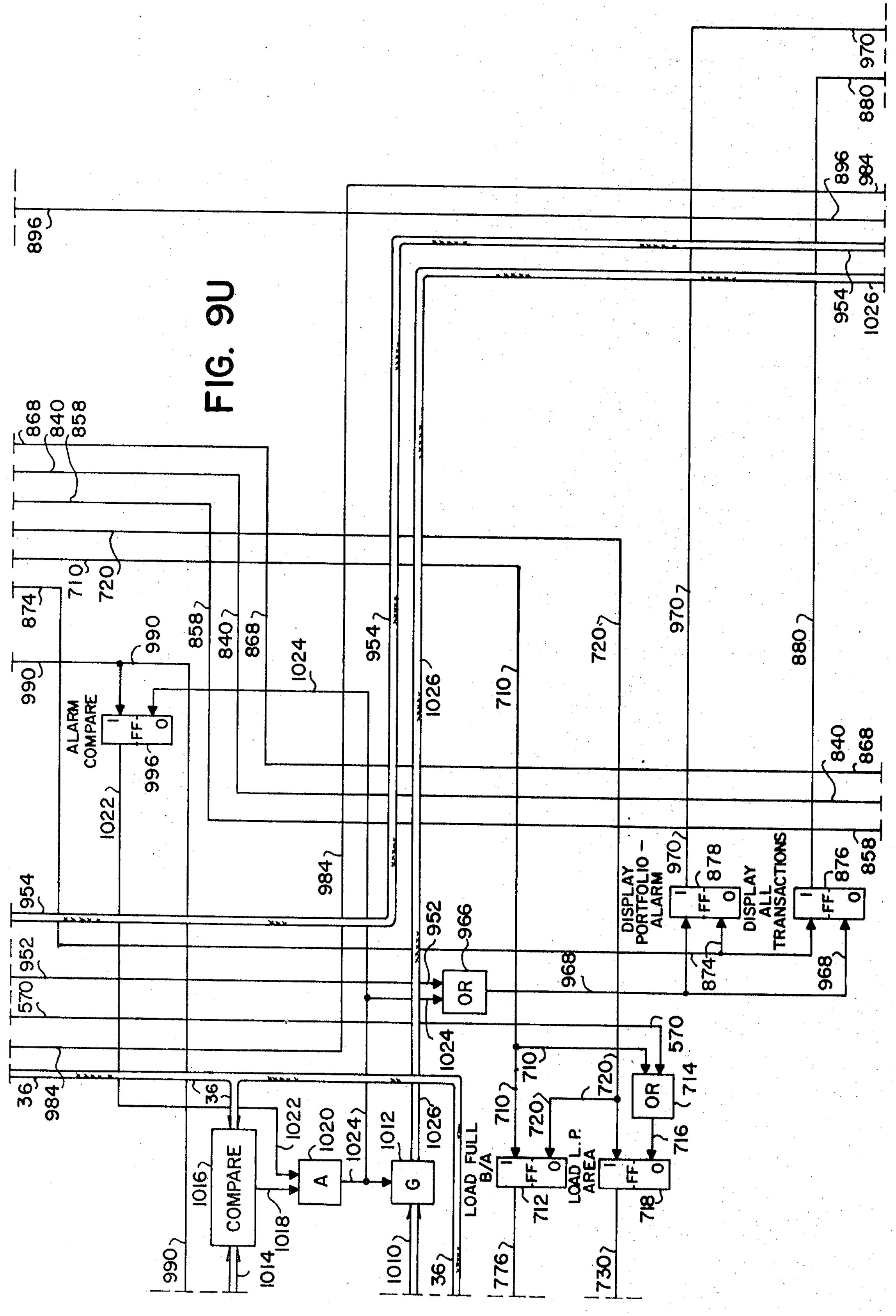
Figure 9V:
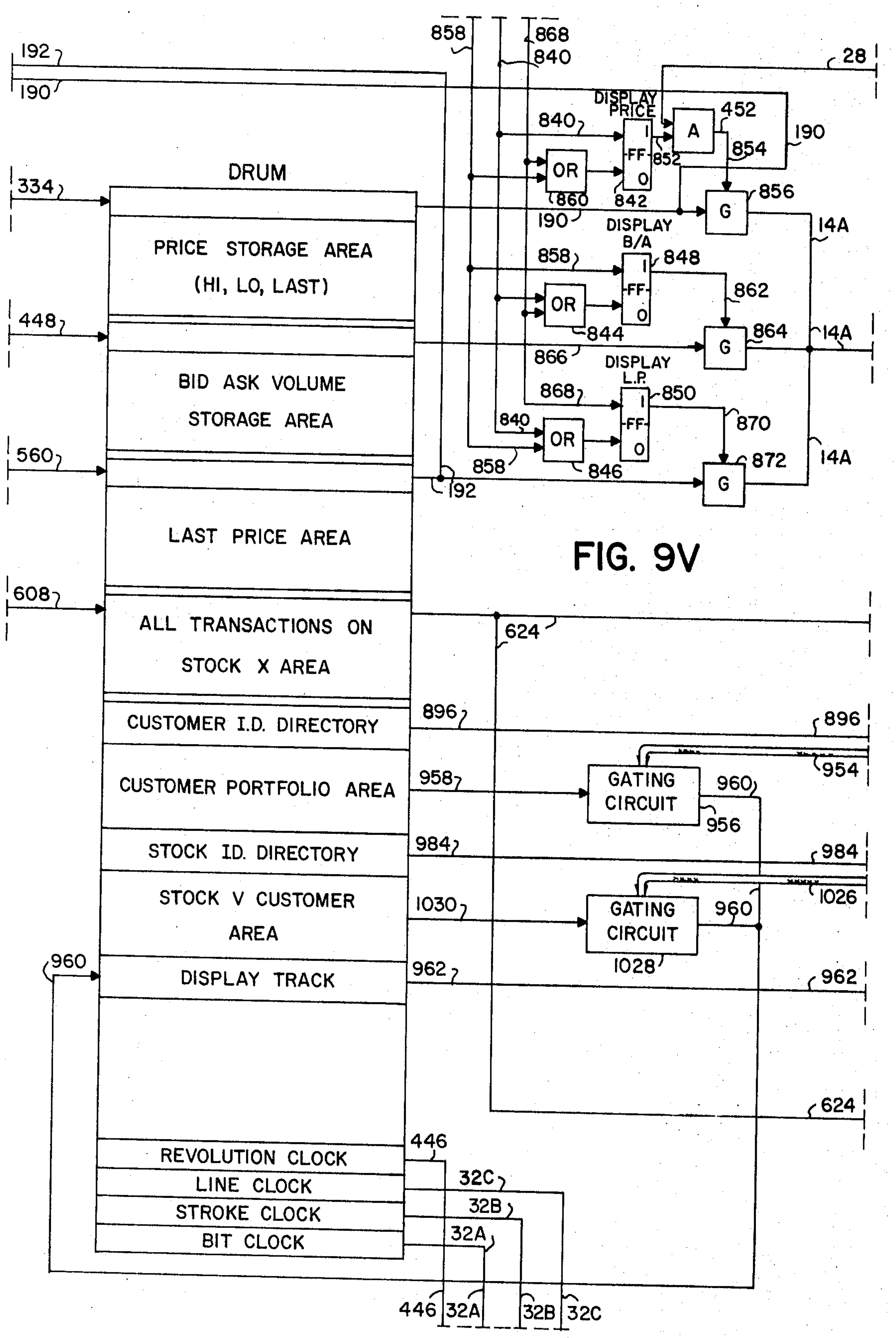
Figure 9W:
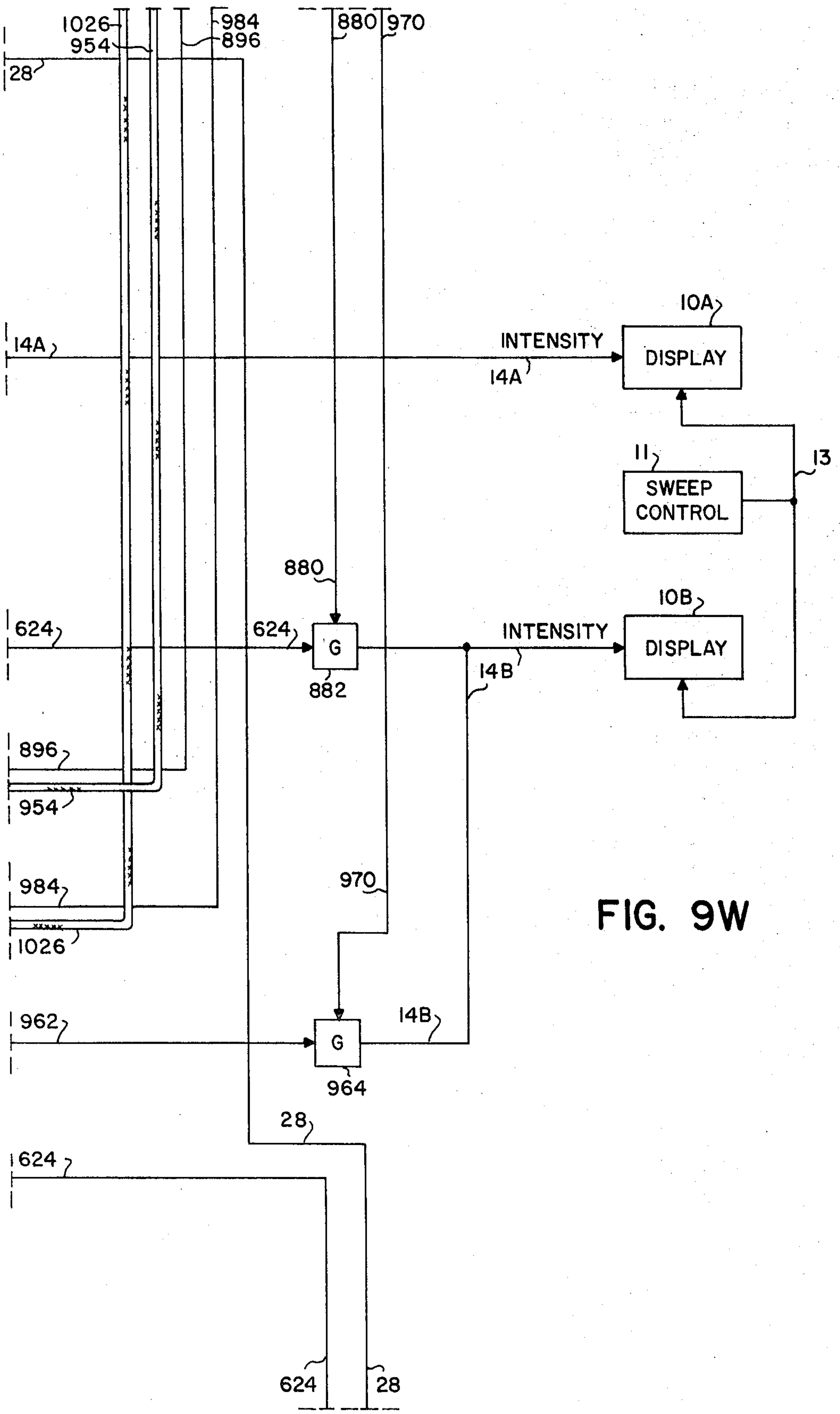
Figure 9X:
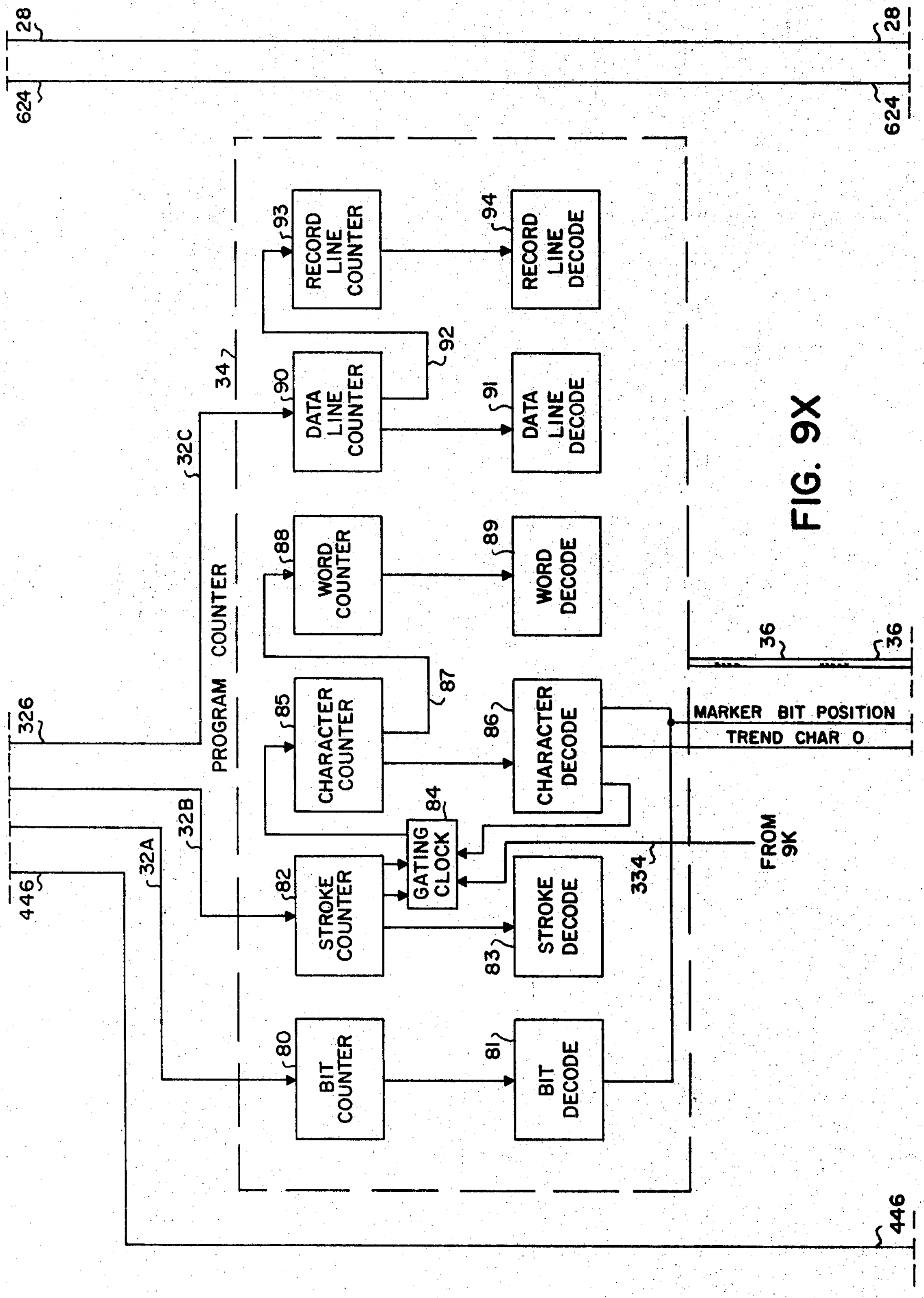
Figure 9Y:
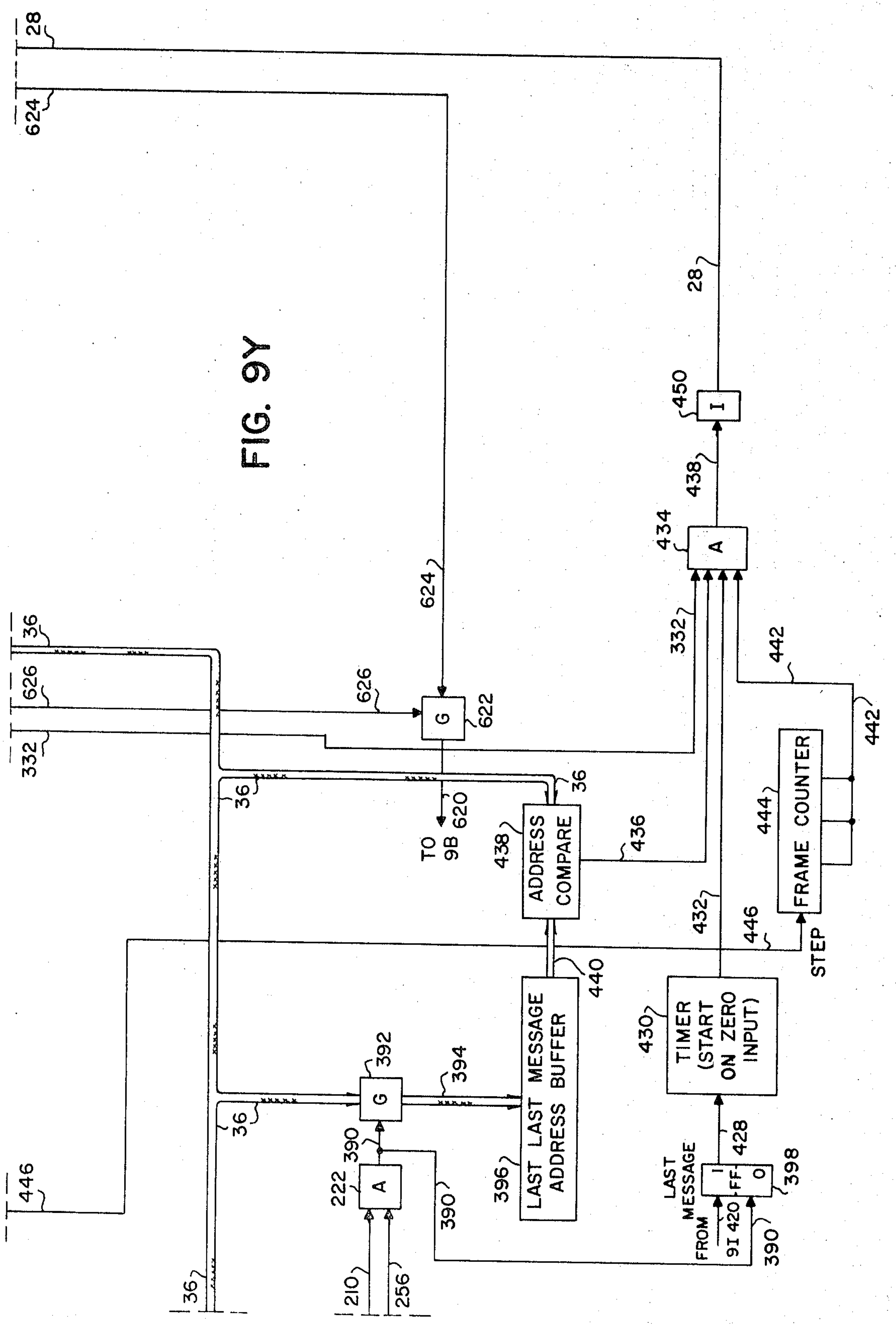

FIG. 9A—9Y, when combined, form a composite schematic block diagram of a preferred embodiment of the invention.

Figure 10:
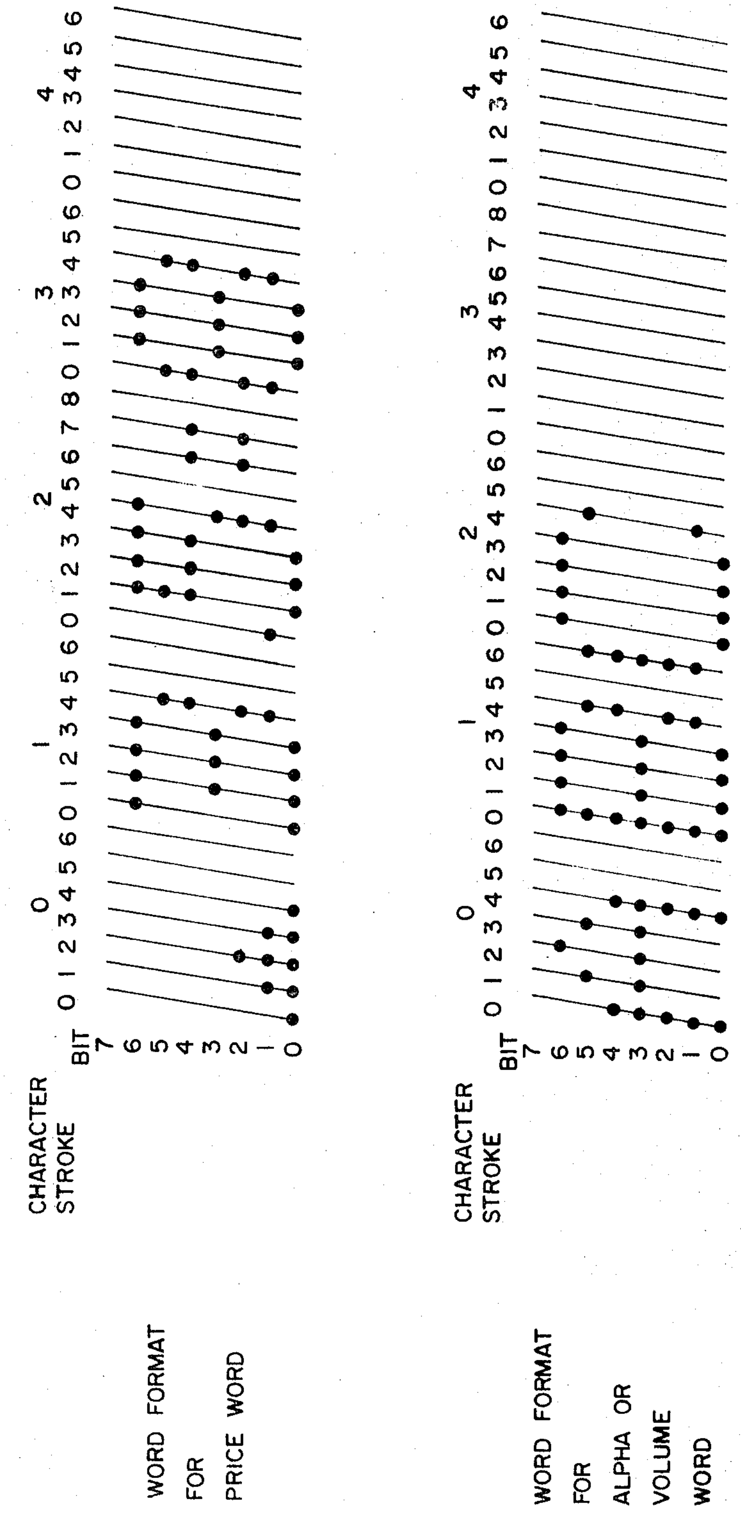

FIG. 10 is a diagram illustrating the form in which words may be mapped on the display devices in a preferred embodiment of the invention.

GENERAL DESCRIPTION

Figure 1:
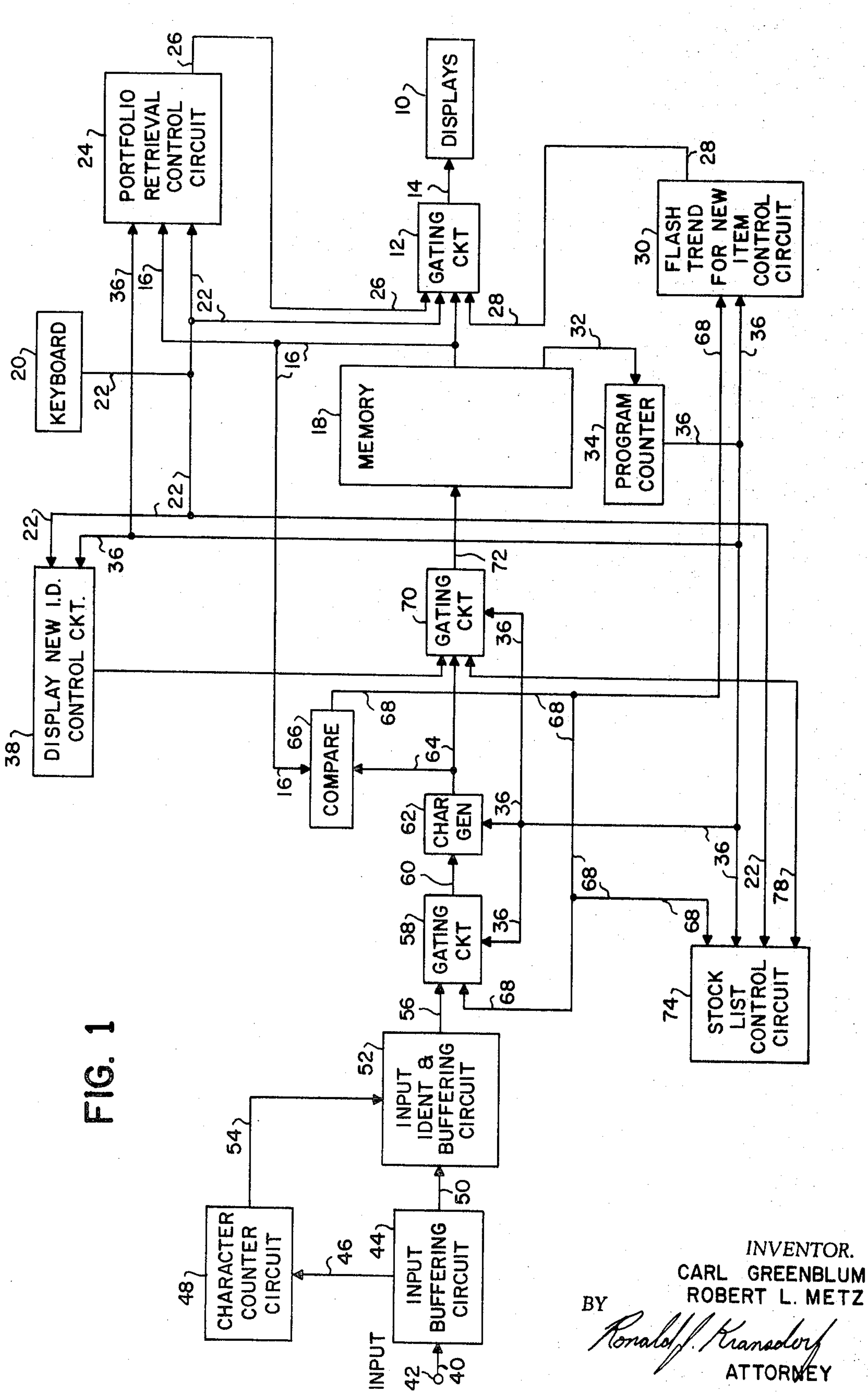
FIG. 1 is a generalized schematic block diagram of a preferred embodiment of the invention.

Referring now to FIG. 1, it is seen that, for a preferred embodiment of the invention, a plurality of display devices 10 are provided. In the following discussion it will be assumed that the display devices are cathode ray tube (CRT) monitors which are swept in synchronism by sweep control circuitry. This aspect of the operation will be described in more detail later. The intensity control input for displays 10 are derived from gating circuit 12 through lines 14. There is a line 14 applying intensity inputs to each of the display devices 10. The data to be displayed on displays 10 are applied to gating circuit 12 through lines 16 from memory 18.

Memory 18 may be any form of memory element having individual, identifiable, memory slots or positions which may be selectively written into or read out from, but is preferably a recirculating memory such as a magnetic drum, magnetic disc, or recirculating delay line. The storage slots or positions may be physical positions or may be time slots as in a recirculating delay line. In the preferred embodiment of the invention it will be assumed that memory 18 is a magnetic drum which is divided into a plurality of sections, there being a section for each form in which information is to be displayed. For example, if the system is being used to display stock quotation information, as it is in the preferred embodiment of the invention, there is a section of the drum for the close, open, high, low, last format, a section of the drum for the close, bid, ask, volume, last format, a section of the drum for the last price only format, etc. There are one or more tracks in each section of memory 18 corresponding to each of the display devices 10 which is to display information in the format for the given section. Assuming that there is a read head for each track of the drum 18, there is a line 16 for each track of the drum.

The particular lines 16 which gating circuit 12 connects to the lines 14 are determined by control inputs from keyboard 20 through lines 22 and from portfolio-retrieval control circuit 24 through lines 26. Keyboard 20 will be assumed to have a complete alpha-numeric keyboard and to also have display address keys and a plurality of control keys which may be used to select the particular form of display which is to appear on a particular display element 10 as well as to perform other functions which will be described in more detail later. The lines 22 applied to gating circuit 12 are the primary means for selecting the display form to appear on each of the display devices 10. Portfolio-retrieval control circuit 24 is an information retrieval circuit which compares an alpha-numeric keyboard input from keyboard 20 with directory information from selected tracks on memory 18 and, when a match is detected, generates output signals on lines 26 to permit the desired data to be passed to display devices 10 for viewing. The structure and operation of this circuit will be described in greater detail in conjunction with the description of FIGS. 9A—9Y.

The final control input to gating circuit 12 is output line 28 from flash-trend-for-new-item control circuit 30. Referring to FIG. 2 it is seen that to the left of each last price entry in the close, open, high, low, last format there is an arrow which is pointed either up or down. This arrow signified the trend of the last entry or, in other words, indicates whether the direction of the last change in price was up or down. In order to permit an observer viewing a board containing a large number of displays of the type shown in FIG. 2 to notice a change in a particular item, particularly where there is no physical movement of number wheels as in present stockboards, the trends marker is caused to blink on and off for several seconds after a change occurs. Control circuit 30 is used to detect when the trends marker for an item which has recently been changed is being swept on a CRT screen and to selectively inhibit the application of the intensity input for this trend's display so as to provide a flashing effect. The details of the circuitry for accomplishing this object will be described in greater detail in conjunction with the description of FIGS. 9A—9Y.

In addition to the storage sections on memory drum 18 which are used to store information to be displayed, there are a number of clock tracks on the drum. These clock tracks cause output pulses on lines 32 which are applied to increment program counters 34. The settings of program counters 34 at any given instant indicate the position of the drum in its revolution cycle and may be used to address the drum to store information thereon and/or read information therefrom. Output lines 36 from program counters 34 are thus applied to flash control circuit 30 and portfolio-retrieval control circuit 24 to control the operation of the circuits in a manner which will be described in more detail later. Lines 36 are also applied as one set of inputs to display new ID- control circuit 38, the other inputs to this circuit being the output lines 22 from keyboard 20. Control circuit 38 is utilized when it is desired to change the stock ID which is being displayed in a particular position on a particular CRT of the display board. For example, referring to FIG. 2, assume that it is desired to change the stock listed in the upper left-hand corner on the tube from ABC to FED. This would be accomplished by recording the positions on a stockboard at which it is desired to make the change on keyboard 20 and then typing the ID of the new stock which it is desired to display in this position. Control circuit 38 converts the information as to tube position into a corresponding drum address and, when the program counter reaches the corresponding address, causes the stock ID presently recorded on the drum for that position to be erased and the new stock ID to be recorded in the position in its place. Data for the old ID will also be erased and informing data for that ID will no longer be recorded. The new ID which is recorded on the drum will also appear on the display device. As will be seen shortly, incoming data relating to the new stock ID will be recorded in the appropriate positions on the drum.

Consider now the manner in which information is loaded into the various storage sections of memory 18. Input line 40 from input terminal 42 is applied to an input buffering circuit 44. The input buffering circuit not only assembles the incoming bits into characters, but also monitors the characters to detect various control characters such as a start-of-message or end-of-message code. When a start-of-message character is detected, a signal is applied through lines 46 to activate character counter 48.

Input Message Format

Figure 8:
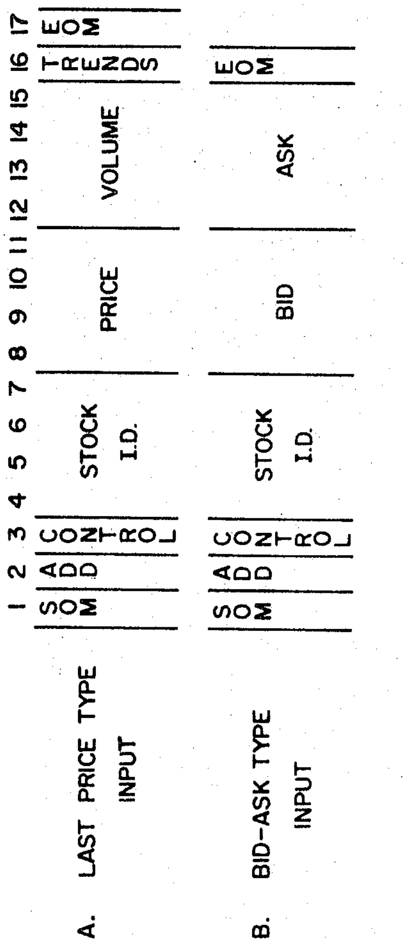
FIG. 8 is a diagram illustrating the various forms in which information may be applied to the system in the preferred embodiment of the invention.

The significance of a character in an input message is a function of its position in the message. For the stock market system of the preferred embodiment of the invention a variety of messages may appear on input line 40. However, only two of these messages types are utilized in the system being described. Referring to FIG. 8 it is seen that these are a last-price type message and a bid-ask type message. The first seven character positions of these two messages are identical. The first character is a unique start-of-message code which may be detected and utilized to start the character counter circuit 48. The second character is an address character which is not utilized in the present invention. The third character is a control character which indicates the type of message. The messages of interest for the embodiment of the invention being described are a last-price-only message, a high-last message which means that the price coming over the line is the last price for the particular stock and that the price is the high for the day for that stock, a low-last message which is similar to a high-last message except that the incoming price is a low for the day, a unison message which is applied to the system at the beginning of the day and includes the open, high, low and last prices for the identified stock, a close message which is also applied to the system at the beginning of the day and contains the closing price for the preceding day, and a bid-ask type message. The next four character positions, character positions 4—7, contain the stock identification characters. For a last-price-type input, character positions 8—11 contain the price, character positions 12—15 the volume in 100 shares of the particular transaction, character position 16 a trend character to indicate whether the last change for the stock was an upward or downward one, and character position 17 a unique end-of-message code. For close messages there are no volume or trends characters and the end-of-message code is in character position 12. For a bid-ask type message, character positions 8—11 contain the bid price, character positions 12-—18 the ask price, and character position 16 the unique end-of-message code.

The characters assembled in input buffering circuit 44 are applied through lines 50 to input identification and buffering circuit 52. The characters applied to circuit 52 are routed to the proper one of the buffers therein under control of signals applied through lines 54 from character counter circuit 48. Thus, the third character of an input message is routed to a control character buffer where it is decoded to indicate the type of message being received. Characters 4 through 7 are routed to an ID buffer. The contents of the ID buffer are passed, a character at a time, through lines 56, gating circuit 58, lines 60, character generator 62, and line 64 to one input of compare circuit 66. The other input to compare circuit 66 is output line 16 from memory 18. It should be appreciated that there are in fact a plurality of compare circuits 66, each of which compares the information stored in the ID buffer in circuit 52 with stock ID's read from a corresponding track on memory 18 which track feeds an output line 16. The tracks may be in the same section of memory 18 or in different sections. The circuitry 52 and 56—64 is however common to all of the compare circuits 66. Character generator 62 is required to convert from the Teletype or similar code used to transmit information to this system into the video code required to cause characters to be displayed on display devices 10. The character generator also converts the parallel-by-character inputs on lines 60 into a serial-by-bit output on line 64 which is required for writing information on the drum and comparing against information read therefrom. The parallel-to-serial conversion is performed under control of the program counter.

The price or bid information in character positions 8—11 of the input message is stored in a second buffer in circuit 52 and the volume or ask information in character positions 12—15 is stored in a third buffer. As before, the storing of this information in the proper buffer is performed under control of the count in character counter circuit 48. If the message is a last-price type input, the trend character in character position 16 is also stored in an appropriate character position of a buffer in circuit 52.

Figure 4:
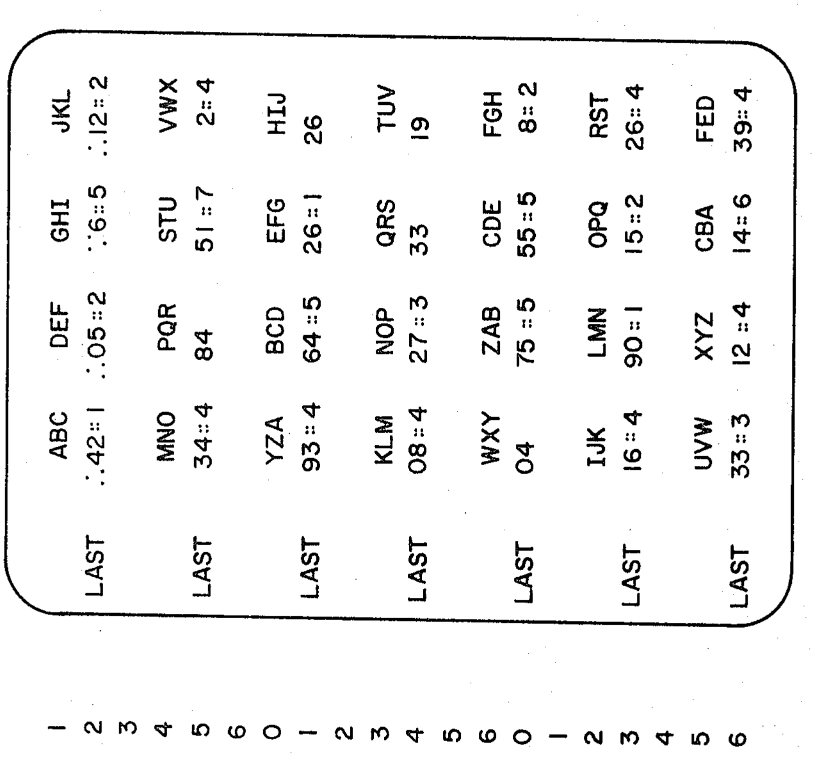

When a successful comparison occurs in compare circuit 66 between the stock ID stored in circuit 52 and an ID read from one of the tracks of memory 18, a signal appears on compare circuit output line 68 which signal is applied to gating circuit 58. The fact that a successful comparison has occurred is stored and, when an end-of-message character is detected by input buffering circuit 44, gating circuit 58 is activated to apply the information stored in the price-or-bid buffer and the volume-or-ask buffer through character generator 62 and line 64 to gating circuit 70. Gating circuits 58 and 70 are controlled, at least in part, by signals on program counter output line 36. Gating circuit 70 passes the information applied to it through one of the lines 72 to be stored in appropriate memory slots in memory 18. The storing of information in memory 18 is performed partially under control of the control characters stored from character position 3 of the input message and partially under control of the program counter. It should be noted that a particular piece of information, such as the price of a transaction, may in fact be stored in several storage positions of memory 18. If, for example, the price of transaction is a high for the particular stock for the day, the price is stored in the high position (see FIG. 2) and in the last position for the stock. If a last-price-only display of the type shown in FIG. 4 is also available, then the price is also stored in the appropriate position for this form of display.

Keyboard output lines 22, program counter output lines 36, and compare circuit output line 68 are also applied as inputs to stock-list control circuit 74. This circuit is utilized to generate a display of the type shown in FIG. 5. For this type of display, a particular stock, such as stock ABC, is selected, and all transactions on that stock are listed in chronological order. The listing for each transaction includes both the price and the volume in 100 shares. When the last transaction is recorded in the lower right-hand corner, the next transaction is recorded in the upper left-hand corner. A marker 76 is used to indicate the position at which the last transaction was recorded. The manner in which this marker is utilized and controlled will be described later.

Control circuit 74 receives from keyboard 20 through lines 22 the position on a display device 10 at which the stock ID on which it is desired to have a listing is stored in, for example, the form shown in FIG. 2. This position is converted into the corresponding address in memory 18 at which the desired ID is stored and this generated address is stored in circuit 74. The stored address is compared against the address from program counter 34 on lines 36. When a match is detected between these two addresses, a signal appears on line 68 indicating a match between the input ID and the ID being read from the drum at that time, and an indication is received from the control-character-storing buffer that the input is a last-price-type input, an output signal is generated on line 78 from control circuit 74 which signal causes the price and volume information in the buffers of circuit 52 to be stored in the appropriate section of memory 18 at the position following that at which marker 76 is stored. The details of how this operation is accomplished will be described in detail in conjunction with the description of FIG. 9A—9Y.

Detailed Functional

Before launching into a detailed description of the circuitry of the preferred embodiment of the invention as shown in FIG. 9A—9, the various functions which the circuit is to accomplish will be briefly reviewed. The first function which the circuit is to perform is to accept input information of the type shown in FIG. 8 and to convert this information into information suitable for display in all three of the forms shown in FIGS. 2, 3 and 4. The display appears on a bank of CRTs and the form of the display (i.e. the form shown in FIG. 2, FIG. 3 or FIG. 4) may be selected under manual control. The individual stocks which are to be displayed in each of the possible forms and the position of each of these stocks on the display board in each of the forms may also be varied under manual control. Thus, it is possible to arrange the stocks in alphabetical order as shown in the drawings, or to arrange the stocks in any other desired order such as by industry or by geographic area. Each last price displayed in the form shown in FIG. 2 has adjacent to it a trends indicator to inform the viewer as to whether the last change in price on the stock was upward or downward. When a new transaction is received for a particular stock the trends indicator is caused to flash or blink for a predetermined period of time in order to attract the viewer's attention to the area of the board in which the change occurred.

Figure 5:
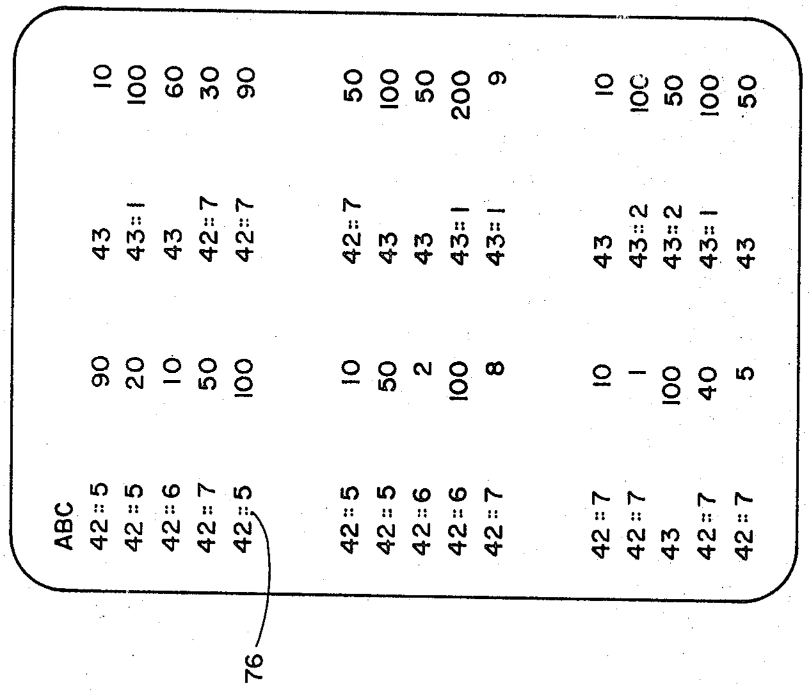

The system shown in FIGS. 9A—9 is also capable of displaying the price and volume of all transactions, or selected transactions, on a particular one or more stocks and of varying the stocks for which this information is displayed. A display of this type is shown in FIG. 5. A listing of this type may be utilized to plot a graph of the behavior of the stock.

Figure 6:
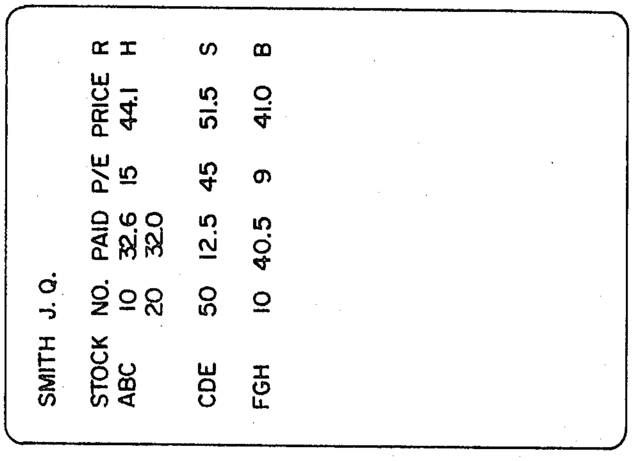

The system is also capable of performing at least two additional functions. Extra space on memory drum 18 may be used to store, on a periodically updated basis, the stock portfolios of selected customers so as to enable the broker to study the portfolio as he is talking to the customer and make meaningful recommendations. FIG. 6 shows what such a display might look like. The customer's name would be keyed into the system and would appear with the display at the top of the tube. The display would include the identifications of the stocks held by the customer, the number of shares purchased at each transaction, the price paid for each block of shares, the price-to-earnings ratio of the stock, the present price of the stock or the closing stock price of the stock at the end of the preceding day, and a recommendation as to whether the stock should be held, sold or bought. Other facts which might be of interest to the broker would include the date at which each purchase was made, the dividend being paid by the stock, its yeild, etc.

Spare space on the drum could also be used to assist the broker in reacting to significant news on a particular stock. For example, if news comes on the wire service that an antitrust suit has been brought against company ABC, the broker might wish to inform all customers hold ABC to sell as quickly as possible. A display of the type shown in FIG. 7 would therefore be useful. This system provides the capability of keying in a given stock identification and getting back a display which lists the customers holding that stock, the number of shares held, and the price which the customer paid for the stock. For a display of the type shown in either FIG. 6 or FIG. 7, the number of stocks held or the number of people holding a stock may exceed that which can be displayed on a single screen. When this occurs, an indication such as that shown at the bottom of FIG. 7 might appear. This indicates that more information is to be displayed and may be obtained by keying into the system the code ABCY.

DETAILED CIRCUIT DESCRIPTION

FIG. 9A—9Y, when combined, form a detailed schematic block diagram of a preferred embodiment of the invention. Where possible, the same numbers have been used to define elements in these FIGS. as were used for the corresponding elements in FIG. 1.

Control Timing

Referring now to FIG. 9V, it is seen that at the bottom end of drum 18 there are a plurality of clock tracks individually designated the revolution clock, the line clock, the stroke clock and the bit clock. The revolution clock track has only a single mark on it and generates an output signal on line 446 at the beginning of each drum revolution. The outputs from the remaining clock tracks on the drum are applied to program counter 34 (FIG. 9X) to permit the circuit to keep track of the position of the drum at any given instant. Output line 32A from the bit clock track is applied to increment bit counter 80 in program counter 34. The contents of the counter 80 are applied to bit decode circuit 81, the output from which reflects the bit count in counter 80 at any given instant. The output from the stroke clock track is applied through line 32B to increment stroke counter 82. Stroke decode circuit 83 monitors the count in stroke counter 82 and generates an output reflecting the contents thereof. As will be seen shortly, seven strokes are normally allocated for each character. However, one character in each word, the particular character depending on whether the word is a price-type word or not, contains nine strokes. Gating circuit 84 operates under control of line 344 in a manner to be described later to control whether character counter 85 is incremented when the stroke count is seven or nine. Character decoder 86 monitors the contents of character counter 85 and generates an output signal reflecting the count contained therein. Since there are five characters in each word, an overflow from the character 5 position of character counter 85 on line 87 is utilized to increment word counter 88. The contents of word counter 88 are monitored by word decoder 89 which decoder generates an output signal reflecting the count contained in the word counter. The final clock track is the line clock track the output signals from which are applied through line 32C to increment data line counter 90. Data line decoder 91 monitors the count in the data line counter and generates an output signal reflecting the count contained therein. As will be seen shortly, there are seven data lines in each record line. Therefore, an overflow on line 92 from data line counter 90, which overflow occurs when the data line counter is incremented from a count of six to a count of zero, is applied to increment record line counter 93. The contents of record line counter 93 are monitored by record line decoder 94 which decoder generates an output signal reflecting the count therein.

Output lines 36 from program counter 34 contain the decoded outputs from all of the decoders in program counter 34. However, as will be apparent from the description to follow, only selected ones of the decoder outputs are in fact utilized at each point in the circuit where the lines 36 are applied. There are also many places in the circuit where a particular output line from one of the decoders is required. Thus, for example, various operations occur at character 0 time or at character 4 time. In order to avoid an excessive number of lines running across the various sheets of the drawings, no attempt has been made to connect these various outputs from the program counter to the counter itself but the lines have instead been designated, at their point of destination, with an alpha-numeric designation of the decoder output line which they represent and have been assigned a number the same as any other line in the circuit. Thus, the character 4 line is designated CHAR 4 from PC and assigned a reference number 169.

In order to better understand the significance of the various terms used in conjunction with program counter 34 it would be well at this point to describe in detail the manner in which displays are generated on a CRT screen in the preferred embodiment of the invention. Referring first to FIG. 10, it is seen that each character of the display is formed from a 5 × 7 matrix of dots. Each line of the display is formed by having the CRT beam trace a repetitive series of near vertical lines. These lines are referred to as strokes. During each stroke, there are seven possible positions at which the intensity of the beam may be increased to cause a dot to appear on the CRT screen. Thus, characters are formed by selectively energizing the intensity input of the CRT as the beam is tracing the stroke. Each of the points on a stroke where the beam may be intensified is called a bit. Thus there are eight bits, designated bits 0—7, for each stroke. Seven of these eight bits, the bits 0-—6 may be used in forming a character. There are seven strokes used for each character with five of these strokes being used to trace the character and the remaining two being used for character separation. The seven strokes of a normal character are designated strokes 0—6. Where a price type word is being recorded, there is a need to place some sort of a decimal point between the second and third character to indicate that the third character is a fraction. The second character is therefore provided with two additional strokes, for a total of nine strokes, and a four-dot pattern is recorded in strokes 6 and 7 of this character. The manner in which this four-dot pattern in bit positions 2 and 4 of strokes 6 and 7 is generated will be described later.

While the extra spacing between characters 2 and 3 is desirable with a price-type word, this extra spacing is not desirable where an alphabetic stock ID or a numeric volume-transaction is being recorded. However, in order for the system to be properly synchronized, it is necessary that all words be the same length. Therefore, since character 4 of all words is blank, an extra space preceding this character causes no problem in the display. Referring to FIG. 10, it is therefore seen that for an alpha (i.e. stock I.D.) or a volume word, it is character 3 rather than character 2 which is nine strokes in length. The control circuitry for effecting this change has been described briefly in this section and will be described in more detail later.

The manner in which a trends marker is formed in the character 0 position of a price word is also shown in Fig. 10. The trends marker shown is that for an upward trend. For a downward trend the bit 1 position would be the same with the bit 0 and bit 2 positions being reversed. Other character configurations in the character 0 position could be utilized to designate other factors relating to the last transaction.

From FIG. 10 it is also seen that each word is made up of five characters with information appearing in character positions 0—3 and character position 4 always being blank. Referring now to FIG. 2 it is seen that each line of the display in the preferred embodiment of the invention consists of four words designated words 0—3. The individual lines relating to a particular stock are referred to as data lines. The seven data lines which combine to provide the required information on a single stock are referred to as a record line. The individual data lines are designated data lines 0—6 with data line zero always being left blank to serve as a separation between two record lines. There are, for the preferred embodiment of the invention, three record lines on each display which record lines are designated 0—2.

In FIGS. 2—4 an additional word position has been shown on the left edge of the display which word position is utilized to provide an alphabetic indication of the significance of each data line of the display. No provision has been made in the circuitry shown in FIGS. 9A—9Y for providing this display. However, it could easily be provided by prerecording the required information on one or more tracks of the drum and gating this information to the display under control of the display mode selected from the keyboard at appropriate times in the sweep cycle. This display would supplement the normal display which is provided in a manner to be described later.

Information Loading

Referring now to FIG. 9A it is seen that input messages of the type shown in FIG. 8 are received on a bit by bit basis at terminal 42 and applied through line 40 to input distributor 100. Input distributor 100 assembles the incoming bits into characters and generates an output signal on line 102 when a full character has been received. The signal on line 102 is applied to condition gate 104 to pass the character in distributor 100 through lines 106 and 108 to one character buffer 110. The signal on line 102 is also applied to step character counter 112. When the character has been transferred from distributor 100 to buffer 110, distributor 100 is again free to assemble a new character. The timing of the system is such that the character in buffer 110 has always been transferred through lines 50 to input identification and buffering circuit 52 (FIG. 1) before a new character has been completely assembled in distributor 100, and the buffer is therefore always ready to receive a new character when a signal appears on line 102.

The contents of buffer 110 are applied in parallel through lines 114 to start-of-message (SOM) decode AND gate 116, 0-Fraction decode AND gate 118, 0-Fraction-ask decode AND gate 119; and end-of-message (EOM) decode AND gate 120. When a start-of-message character is shifted into buffer 110, all inputs to AND gate 116 are present resulting in an output signal on line 122 which is applied to set SOM flip-flop 124 to its ONE state. The signal on line 122 is also applied to reset character counter 112 to a count of one. As the succeeding characters of an input message (see FIG. 8) are gated from distributor 100 to buffer 110, step pulses on line 102 increment the count in character counter 112 to indicate the character of the message which is presently in the buffer. The manner in which this information is utilized will be described shortly.

When the code indicating a zero fraction is stored in character buffer 110, and a signal appears on line 54—11 indicating that it is the 11th character of the message, the fraction character of a price or bid field, which is in the buffer, AND gate 118 is fully conditioned to generate an output signal on line 124 which signal is applied to set 0 Fraction flip-flop 126 to its ONE state. Similarly, when the code indicating a 0 is in buffer 110, there is a signal on line 54—15 indicating that the fraction character of an ask field may be in the buffer, and a signal appears on line 236 which, as will be seen later, indicates that a bid-ask message has been applied to the system, AND gate 119 is fully conditioned to generate an output signal on line 125 which is applied to set 0-Fraction-ask flip-flop 127 to its ONE state. Flip-flops 126 and 127 are reset by a signal on line 54—7, or in other words, these flip-flops are reset at the character 7 time just prior to the character 11 and character 15 times respectively at which they may be set. When the end-of-message (EOM) code character is stored in buffer 110, AND gate 120 has all of its inputs present causing an output signal to appear on output line 128. An end-of-message signal on line 128 is applied to reset SOM flip-flop 124 to its ZERO state. The other elements of the system which the end-of-message signal on line 128 is applied to will be described later.

The character in buffer 110 is applied through lines 50 to steering gates 130. The character count in counter 112 is applied through lines 132 to character count decode circuit 134. The outputs on lines 54 from decode circuit 134 are applied to control the conditioning of the steering gates 130. Thus, referring to FIG. 8, none of the steering gates 130 would be conditioned when a character count of 1 or 2 appears in character counter 112. A character count of 3 would cause a gate to be conditioned to pass the character in buffer 110 through lines 136 to control character buffer 138 (FIG. 9F). A character count of 4, 5, 6 or 7 in character counter 112 would cause gates to be conditioned to pass the character in buffer 110 through lines 140 to the leftmost character position in four character identification (I.D.) buffer 142 (FIG. 9E). As each character is stored in buffer 142 a signal is also applied through OR gate 141 to shift the contents of the buffer one character position to the right. This leaves a blank character in the leftmost position in preparation for the reception of the next character. The buffer shifting method just described assumes that all zeros is not a valid character code. If such a character code is possible, an alternative method of buffer shifting must be provided.

A character count of 8, 9, 10 or 11 in character counter 112 causes steering gates to be conditioned to pass the character in buffer 110 through lines 144 to price-or-bid buffer 146. As each character is stored in buffer 146, a signal is applied through OR gate 145 to shift the contents of the buffer one character position to the right. A character count of 12, 13, 14 or 15 in character counter 112 conditions steering gates to pass the character in buffer 110 through lines 148 to volume-or-ask buffer 150. As each character is stored in this buffer, a signal is applied through OR gate 149 to shift the contents of the buffer one character position to the right. A character count of 16 in conjunction with the absence of an end-of-message indication on line 128 causes a steering gate to be conditioned to pass the trends character in buffer 110 through lines 152 to rightmost character position in buffer 146. This character overwrites character 0 (i.e. the hundreds character) of the price. The effect of this will be described later. A count of 16 in character counter 112 and an end-of-message indication on line 128, or a count of 17 in character counter 112 cause no information to be transferred through steering gates 130.

When the count in character counter 112 reaches a count of seven, the resulting signal on output line 54—7 of the output lines 54 from decoder 134 is applied as one input to AND gate 160 (FIG. 9E). The other inputs to this AND gate are output line 162 from the ZERO side of ID-present flip-flop 164 (FIG. 9P), output line 166 from the ZERO side of last-price-ID-present flip-flop 168 and character 4 output line 169 from the program counter. As will be seen later, flip-flop 164 is reset to its ZERO state when all information resulting from a match with a stock ID in the format shown in FIG. 2 has been stored on drum 18. Similarly, flip-flop 168 is reset to its ZERO state when all information resulting from a match on a stock ID in the last-price-only format shown in FIG. 4 has been recorded on drum 18. Since character 4 is always a blank, the input on line 169 assures that AND gate 160 is not fully conditioned in the middle of a word. AND gate 160 is therefore fully conditioned at the end of the first word after ID buffer 142 is fully loaded and all information from a previous match which it is desired to record on drum 18 has been recorded. When AND gate 160 is fully conditioned, the resulting output signal on line 170 is applied to set ident-compare flip-flop 172 to its ONE state.

Stock ID Comparison

The setting of flip-flop 172 to its ONE state results in a signal on ONE-side output line 174 which is applied as the conditioning input to gates 176 (FIG. 9H) and as one of the inputs to AND gates 178 (FIG. 9P), 180 and 182 (FIG. 9E). Gates 176 being conditioned permits the rightmost character in buffer 142 to be applied through lines 184, now conditioned gates 176, and lines 60 to character generator 62 (FIG. 9K). As indicated previously, character generator 62 converts the information from the 6-bit Teletype code in which it is received to the 35-bit video code required to cause characters to be displayed on display devices 10. Character generator 62 also performs a parallel to serial conversion, accepting inputs in parallel a character at a time and generating outputs on output line 64 in the 35-bit video code a bit at a time. This is accomplished as a multistage operation in the character generator by first taking the data on the six input lines and, by matrix or other well known techniques, converting it into a signal on one out of X output lines, where X is the total number of characters which may be displayed on the display devices. With six input lines, X may not exceed 64. However, since many of the possible input code combinations are used for control purposes, such as the special SOM and EOM codes, the actual number of output lines from the first stage of the character generator would probably be about 40. These lines are applied to a second stage which may likewise be a matrix or similar encoding device which converts the one-out-of-X input code into the required character codes on the 35 video lines. This 35-bit video code character is stored in the character generator and then gated out a bit at a time onto output line 64 under control of bit count and stroke count signals on output lines 36 from program counter 34. Since the circuitry described above involves well-known state of the art techniques, and since the particular elements and techniques employed in the circuit do not form part of this invention, the details of character generator 62 have not been shown.

The bits on line 64 are applied as one input to ident-compare circuit 186 (FIG. 9P) and as one input to last-price-ident-compare circuit 188. It should again be noted that all the circuitry feeding character generator 62, character generator 62 itself, and line 64 are common to all tracks in all sections of drum 18 and to all display devices of the display board. However, there is a compare circuit 186, and related circuitry including flip-flop 164, for each track of drum 18 in the section labeled "price-storage area," and there is a compare circuit 188, and related circuitry including flip-flop 168, for each track of the drum in the section labeled "last-price area." The lines 162 and 166 shown as inputs to AND gate 160 are therefore only representative, and there would, in fact, be an input to this AND gate from the ZERO side of each of the flip-flops of this type.

The other information input to compare circuit 186 is output line 190 from the head reading the corresponding track of drum 18 in the price-storage area, and the other input to compare circuit 188 is output line 192 from the head reading the corresponding track in the last-price area of drum 18. Compare circuits 186 and 188 are reset to indicate a successful comparison in response to a signal on line 194 which signal appears when program counter 34 is set to indicate stroke 5 of character 4. In order to appreciate the significance of the reset signal on line 194, it should be remembered that character 4 is always blank and strokes 5 and 6 are used to provide a two-stroke space between characters. Thus, strokes 5 of character 4 will always be a blank stroke which occurs one stroke before the end of a word. The compare circuits may thus be safely reset at this time in preparation for comparison on the next word.

Since ident-compare flip-flop 172 (FIG. 9E) is always set at character 4 time, the first character applied to compare circuits 186 and 188 from drum 18 after gates 176 are conditioned will be character 0 of a word. Character 0 of the ID word stored in buffer 142 is in the rightmost position of the buffer at this time and is therefore the character applied to character generator 62. Compare circuits 186 and 188 therefore perform a comparison between character 0 of the word being read from the drum and character 0 of the ID word stored in buffer 142. At stroke six time a signal appears on line 196 from program counter 34 which signal is applied as a second input to AND gate 182 (FIG. 9E). Since it is still character 0 which is being read from the drum, there is no signal on character 4 output line 169 from the program counter and inverter 198 (FIG. 9H) is therefore generating an output signal on line 200 which signal is applied to fully condition AND gate 182 to generate an output signal on line 202 which is applied through OR gate 141 to cause a shift right operation in buffer 142. This brings character 1 into the rightmost position of the buffer and causes this character to be applied through conditioned gates 176 to character generator 62. When the character generator receives a stroke 1, bit 1 input from the program counter, it starts gating out the video code for the second character of the ID code (i.e. character 1), a bit at a time, to compare circuits 186 and 188 in synchronism with the application of the character code for character 1 of the word being read from the drum to these compare circuits. If a mismatch is detected in either of the compare circuits at any time during the compare operation, the compare circuit is set to a mismatch condition terminating the output on the respective output lines 204 and 206. The application of bits to the compare circuits to be compared continues however, regardless of whether the compare circuits are in a set or reset condition.

When stroke 6 of character 1 is reached, AND gate 182 is again fully conditioned to cause a shift operation in buffer 142 bringing the third character (character 2) of the stock ID in this buffer into the rightmost position of the buffer. This character is thus applied to the character generator and, in due course, compared against character 2 of the word being read from the drum. Character 3, the final information character of the stock ID, is similarly applied to the character generator and compared against the corresponding character of the word being read from the drum. At stroke 5, bit 7 time of character 3, or in other words when the comparison on the information-containing portion of character 3 has been completed, the program counter applies a signal through line 208 to one input each of AND gates 178 (FIG. 9P) and 180. Since ID compare flip-flop 172 is in its ONE state at this time, there is a signal on ONE-side output line 174 at this time supplying a second input to each of these AND gates. If ident-compare circuit 186 has not been set to its mismatch condition during the word comparison just performed there is also a signal on line 204 at this time fully conditioning AND gate 178 to generate an output signal on line 210. Similarly, if compare circuit 188 has not been set to its mismatch condition during the preceding word compare operation, there is a signal on line 206 at this time fully conditioning AND gate 180 to generate an output signal on line 212.

Assume initially, for the sake of discussion, that mismatches have occurred in both of the compared circuits and that the signal on line 208 therefore results in neither AND gate 178 nor AND gate 180 being fully conditioned. In this event the circuit will operate in a manner to now be described, to continue to search for stock IDs on the tracks of drum 18 which are being looked at which match the stock ID stored in buffer 142. It should be noted that the operations to be now described will be performed whether a match is detected or not until an end-of-message signal is received on line 128. However, these operations are without meaning once successful comparisons have been performed in both of the compare circuits.

At stroke 6 character 3 time, just after a signal is applied to line 208, a signal is again applied to line 196 resulting in a fourth shift operation in buffer 142. Since the buffer is only four characters long, the fourth shift operation restores the contents of the buffer to its initial condition. Character 0 of the stock ID is thus reapplied to character generator 62 and, from the character generator to the ID compare circuits where this character is compared against a character 4, (which character is always a blank or all zeros character) being read from the drum. This will, in all likelihood, result in a mismatch occurring in both compare circuits. However, since both compare circuits were tested for comparison at the end of the preceding character, a match or a mismatch on this character is meaningless. The signal on line 194 resets both compare circuits to a match condition at the end of this character in preparation for a comparison against the next word read from the drum. At stroke six time of character 4 is a signal is also applied to line 196. However, since there is a signal on character 4 output line 169 from the program counter at this time, inverter 198 is not generating an output signal on line 200 and a shift operation is therefore not performed. The buffer thus remains with its contents in the initial condition in preparation for comparisons in the compare circuits against the next words read from drum 18.

At this point it should be mentioned that the revolution rate of the drum is such that it completes many revolutions during the time that a message from terminal 42 is being loaded into the system. Thus, there is at least one complete revolution of drum 18, and probably more, between the time that ident-compare flip-flop 172 is set to its ONE state and the time that an end-of-message character is received in buffer 110. This revolution of the drum may be used for the ident-compare operation.

The second words from the price-storage area and the last-price area of drum 18 are applied to ident-compare circuits 186 and 188 respectively and compared against the stock ID stored in buffer 142 in a manner identical to that just described for the first words. This sequence of operation is repeated time and again until an end-of-message signal appears on line 128. During this time each word in the two areas of drum 18 being looked at is compared against the stock ID stored in buffer 142 at least once and most words are compared against the stock ID several times. It should be noted that comparisons are made against all words on the drum rather than merely merely on stock ID words. Additional circuitry could be provided to limit the comparisons to stock ID words only. However, since the other words on the drum are numeric words rather than alpha words a mismatch will always occur on these words and there is no harm in performing the additional comparisons.

As indicated previously, when a match is detected between the stock ID stored in buffer 142 and a stock ID read from the track in the price-storage area of drum 18, AND gate 178 (FIG. 9P) is fully conditioned to generate an output signal on line 210. This signal is applied to set ID-present flip-flop 164 to its ONE state, to reset bid-ask flip-flop 216 (FIG. 9I) to its ZERO state, to reset entry line counter 218 (FIG. 9L) to a count of zero, to condition gate 220 (FIG. 9R), and as one input to AND gate 222 (FIG. 9Y). The conditioning of gate 220 permits the record line and word address at which the match occurred, which address is on the record line and word output lines of the output lines 36 from program counter 34 to be passed through lines 224 to ID address buffer 226. The manner in which this address is utilized will be described shortly. It should be noted that the record line and word at which the match occurs is independent of the track in the price storage area of drum 18 which contains the matching stock ID. This track may be determined by noting which of the ID present flip-flops 164 is set to its ONE state.

The contents of control character buffer 138 (FIG. 9F) are applied through lines 228 to control character decode circuit 230. Output lines 231—236 from decoder 230 have signals thereon when the control character in buffer 138 indicates that the input is a last-price-only message, a high-last message, a low-last message, a unison message, a close message, or a bid-ask message, respectively. Bid-ask flip-flop 216 (FIG. 9I) is to be set to its ONE state only if the control character in buffer 138 indicates that a bid-ask message has been received. Thus, this flip-flop is reset to its ZERO state when a match is detected and is then set to its ONE state when a match is detected and is then set to its ONE state only if a signal appears on bid-ask output line 236 from decoder 230.

Entry line counter 218 (FIG. 9L) determines the data line in a particular record at which the price information stored in buffer 146 is to be recorded. For certain types of messages, such as high-last messages and low-last messages, this price is to be recorded on more than one line of the record. The counter is thus reset to zero when a match is detected and is then set to indicate the appropriate line depending on the type of message which is received. If there is a signal on last-price-only line 231, the counter is set to a count of six since data line 6 is the only line of the record at which the price is to be recorded. If a high-last message is received, the resulting signal on line 232 causes the counter to be set to a count of 4 indicating that the price is first to be recorded on data line 4 of the record. The manner in which the count is up-dated to permit a recording on line 6 as well will be described later. Similarly, a low-last message indication on line 233 causes counter 218 to be set to a count of 5 indicating that the price is first to be recorded on line 5 of the record. A unison message indication on line 234 causes the counter to be set to a count of 3 since it is on line 3 of the record which the unison price is to first be recorded. A close message indication on line 235 causes the counter to be set to a count of 2 since the close price is recorded on line 2 of a record. It should be noted that a bid-ask indication on line 236 is not applied to the entry line counter, thus leaving the counter set to a count of zero. The manner in which the entry line control for this type of message is handled, and the operation and use of the entry line counter will be described later in conjunction with a description of the loading of information into drum 18.

Referring now to FIG. 9P it is seen that when a match is detected in last-price-ID-compare circuit 188, the resulting output signal on line 212 from AND gate 180 is applied to set last-price-ID present flip-flop 168 to its ONE state and is also applied as a conditioning input to gate 240 (FIG. 9-0). The conditioning of gate 240 permits the record line, data line, and word address of the stock ID in last price area of drum 18 which the match occurred on to be transferred through lines 242 to last-price-ID-compare buffer 244. The manner in which this information is utilized will be described shortly. As before, the information in buffer 244 is common for all tracks in the last-price area of drum 18 and the particular track on which the match occurred is indicated by the ID present flip-flop 168 which is set.

It is possible that the message received by the system relates to a stock which is not to be displayed in either the format shown in FIG. 2 or the format shown in FIG. 4. Under these conditions, when an end-of-message code is detected in one character buffer 110, (FIG. 9A) there will be nothing to load into drum 18 and none of the ID present flip-flops 164 and 168 will be set to their ONE state. Under this condition, the end-of-message signal on line 128 will be applied to reset SOM flip-flop 124 and ID compare flip-flop 172 to their ZERO state thus resetting the system in preparation for the next message to be applied to terminal 42.

Load Price

If ID present flip-flop 164 has been set to its ONE state, indicating that an ID match was had in the price storage area of drum 18 during the ID compare operation, there is a signal on output line 250 from this flip-flop which is applied as one input to AND gate 252 (FIG. 9H). The signals on lines 231—234, indicating that a price-type message has been received, are applied as the inputs to OR gate 254 (FIG. 9L). Output line 256 from OR gate 254 is applied, among other places, as one of the inputs to OR gate 258 (FIG. 9F). The other inputs to OR gate 258 are close line 235 and bid-ask line 236 from decoder 230. OR gate 258, therefore, generates an output signal on line 260 if either a price-type message or a bid-ask message is received or, in other words, if there is an output signal on any one of the lines 231—236. The signal on output line 260 from OR gate 258 is applied as a second input to AND gate 252. The remaining inputs to AND gate 252 are end-of-message line 128 and character 4 line 169 from the program counter. While only a single line 250 is shown in the FIG., the output lines 250 from all of the ID present flip-flops are in fact OR'ed together and applied as one of the inputs to AND gate 252. AND gate 252 is therefore conditioned to generate an output signal on line 262 at the first character 4 time after an end-of-message character has been transferred into buffer 110 if the message which preceded the end-of-message character was either a price-type message or a bid-ask message and a match was obtained between the stock ID of the message and a stock ID stored in the price storage area of drum 18. A signal on line 262 is applied to set set-load-volume flip-flop 264 (FIG. 9I) and load flip-flop to their ONE state. As will be seen shortly, load flip-flop 266 controls the loading of either price or bid-ask data into the price storage area and bid-ask-volume storage area of drum 18 respectively.

If a match was had in last-price-ID-compare circuit 188 between the stock ID stored in buffer 142 and a stock ID stored on the track being looked at of the last-price area of drum 18, then last-price ID flip-flop 168 is in its ONE state, generating an output signal on ONE-side output line 268, when an end-of-message signal appears on line 128. Lines 128 and 268 are two of the inputs to AND gate 270 (FIG. 9K). The other inputs to this AND gate are output line 256 from OR gate 254 and character 4 output line 169 from the program counter. As indicated previously, a signal on line 256 indicates that a last-price type message has been received by the system. AND gate 270 is therefore fully conditioned to generate an output signal on line 274 at the first character 4 time after an end-of-message character has been shifted into buffer 110 if the message preceding the end-of-message character is a last-price-type message and if, during the preceding ID-compare time, a match was detected between the stock ID of the input message and a stock ID stored in the last-price area of drum 18. The signal on line 274 is applied to set load-last-price flip-flop 276 (FIG. 9L) to its ONE state. As will be seen shortly, flip-flop 276 is utilized to control the loading of price information into the last-price area of drum 18. The signal on EOM line 128 is also applied to increment the address in buffer 244 (FIG. 9-0) by one data line. The reason for this will be described later.

With one exception which will be mentioned later, the price-loading operations which are performed under the control of load flip-flop 266 and load-last-price flip-flop 276 are completely independent of each other. These loading operations will therefore be described independently although it should be understood that they may, in fact, be going on concurrently.

When load flip-flop 266 is in its ONE state, the resulting output signal on line 280 is applied, among other places, as one input to AND gate 282. If it is assumed that the input message is not a bid-ask type message, bid-ask flip-flop 216 is in its ZERO state at this time resulting in a signal on ZERO-side output line 284 from this flip-flop, which signal is applied to a second input of AND gate 282. When volume is not being loaded for a display of the type shown in FIG. 5, inverter 356 (FIG. 9H) is generating an output signal on line 354 which is applied to fully conditioned AND gate 282 to generate an output signal on line 286. More will be said about the signal on line 354 later. The signal on line 286 is applied through OR gate 288 and line 290 as the conditioning input to gate 292 and as one input to AND gate 294 (FIG. 9F). The conditioning of gate 292 permits the price, bid, and/or trends data stored in buffer 146 to be applied through lines 296, conditioned gates 292 and lines 60 to character generator 62. Since load flip-flop 266 is set to its ONE state at character 4 time, the trends character in the rightmost position of the buffer 146 will be the first character applied to character generator 62 during a character 4 time. However, nothing is done with the character applied to generator 62 at this time. At stroke 6 time a signal is applied through line 196 from the program counter to a second input of AND gate 294, but, since there is a signal on character 4 output line 169 from the program counter at this time, inverter 198 (FIG. 9H) is not generating an output signal on line 200 and AND gate 294 is therefore not fully conditioned. A shift operation in buffer 146 is therefore not performed.

At the following character 0 time the trends character is again applied through conditioned gates 292 to character generator 62. This character is converted into video code and applied, a bit at a time, to line 64 under control of bit and stroke signals from the program counter. The signals on line 64 are applied through OR gate 297 (FIG. 9Q) and line 64A as the information input to gate 298. The conditioning input to gate 298 is output line 300 from AND gate 302. The inputs to AND gate 302 are output line 304 from OR gate 306 and output line 308 from OR gate 310. One input to OR gate 310 is output line 312 from AND gate 314. The inputs to AND gate 314 are output line 280 from the ONE side of load flip-flop 266 and match output line 316 from address compare circuit 318 (FIG. 9R). One set of inputs to address compare circuit 318 are the word, data line, and record line decode output lines 36 from program counter 34. The other set of record line and word addresses for compare circuit 318 are derived from ID address buffer 226 through lines 320. Lines 322 supply the other set of data line addresses from entry line counter 218. It is therefore seen that AND gate 314 is fully conditioned to generate an output signal on line 312 when load flip-flop 266 is in its ONE state and the drum is in a position such that the record line, data line, and word under the write head of the drum track of interest is the same as the address stored in buffer 226 and entry line counter 218.

The function of OR gate 306 (FIG. 9P) is to inhibit writing in the character 0 position of the words in a display of the type shown in FIG. 2 except when writing is being performed on data line 2, in which case a 100s bit of the close price may be recorded in this character position, or when writing is being performed on data line 6, in which case a trends character may be written in the character 0 position. Therefore, the inputs to OR gate 306 are data line 2 line 324 and data line 6 line 326 from the program counter and output line 328 from inverter 330. The input to inverter 330 is character 0 line 332 from the program counter.

Assume first, for the sake of discussion, that the input message is a close price which arises at the beginning of the day and that the entry line counter has therefore been set to line 2. Under these conditions, when AND gate 314 is fully conditioned to generate an output signal through line 312 and OR gate 310 to an input of AND gate 302, there is a signal on data line 2 line 324 which is applied through OR gate 306 to the other input of this AND gate. This results in AND gate 302 being fully conditioned to generate an output signal on line 300 which conditions gate 298 to pass the signals appearing on line 64A through line 334 to the write head for the appropriate track in the price storage area of drum 18. It should, at this point, be mentioned that while only one gate 298 has been shown, there is in fact a gate 298 and a line 334 for each track in the price storage area of drum 18. The signal on the line 300 is AND'ed with an output from the corresponding ID present flip-flop 164 in order to determine the particular gate 298 which is to be activated at any given time.

Output line 312 from AND gate 314 (FIG. 9P) is also connected as one input to AND gate 313 (FIG. 9R). The other input to this AND gate is output line 315 from OR gate 317. One input to OR gate 317 is close line 235 from control character decoder 230. Therefore, at data line 2 time, when a match is detected in address compare circuit 318, AND gate 313 is fully conditioned to generate an output signal on line 319 which is applied through OR gate 476 and line 478 as one input to AND gate 480. The other input to AND gate 480 is output line 484 from OR gate 482. Since data line 2 line 324 is one of the inputs to OR gate 482, AND gate 480 is fully conditioned at this time to generate an output signal on line 486. The signal on line 486 conditions gate 470 to permit the close price on line 64A, including the 100s digit in the character 0 position, to be passed through line 488 to be recorded on the appropriate track in the bid-ask volume-storage area of drum 18. The close price on line 2 of the bid-ask volume format shown in FIG. 3 is in this manner recorded. It is thus seen that a close price is simultaneously recorded in both the price storage area and the bid-ask-volume storage area on drum 18.

Since, with a close-type input, there is no trends character, the 100s position (character 0) of the price in buffer 146 is not written over and appears in the rightmost position (in the character 0 position) of buffer 146. This is the character which is initially written into the appropriate track of drum 18. Since there is an output signal from OR gate 288 (FIG. 9I) on line 290 at this time, and there is no signal on character 4 line 169 from the program counter permitting inverter 198 (FIG. 9H) to generate an output signal on line 200, at stroke 6 time AND gate 294 (FIG. 9F) is fully conditioned to generate an output signal on line 336 which is applied through OR gate 145 to shift buffer 146 one position to the right. This brings character 1, the tens digit of the closing price, into the rightmost position of the buffer. Since gate 292 (FIG. 9I) is still conditioned, this character is, in turn, applied through character generator 62 to line 64 and through conditioned gate 298 to be recorded on the drum 18. At character 1, stroke 6 time, AND gate 294 is again fully conditioned to cause a second shift right operation in buffer 146 bringing the units digit, character 2, of the closing price into the rightmost position of the buffer. This digit is likewise applied through the character generator to be recorded on drum 18.

When character 2 is being recorded on the drum, there is a signal on character 2 output line 340 from the program counter which signal is applied as one input to AND gate 342, (FIG. 9K). The other input to this AND gate is output line 344 from AND gate 346 (FIG. 9H). The inputs to AND gate 346 are ZERO-side output line 348 from load-ID-control flip-flop 350, ZERO-side output line 352 from ident-compare flip-flop 172, output line 354 from inverter 356, output line 358 from the ZERO side of load volume flip-flop 360, and output line 359 from OR gate 361 (FIG. 9A). The inputs to OR gate 361 are output line 363 from AND gate 365 and output line 367 from AND gate 369. Output line 520 from AND gate 510 (FIG. 9H) is connected as one input to AND gate 369 and through inverter 371 and line 373 as one input to AND gate 365. The other inputs to AND gates 365 and 369 respectively are ZERO-side output line 375 from 0-Fraction flip-flop 126 and ZERO-side output line 377 from 0-Fraction ask flip-flop 127. The input to inverter 356 is output line 362 from AND gate 364. Flip-flops 172 and 350 are in their ONE state when stock ID information is being applied through character generator 62 to lines 64, while flip-flop 360 is in its ONE state and AND gate 364 fully conditioned when volume information is being applied through the character generated to line 64. It is therefore seen that AND gate 346 is fully conditioned if neither stock ID or volume information is being applied to line 64, or, in other words, when price information is being applied to this line, since referring to FIGS. 2—5, neither the fraction nor the decimal point is written when the fraction on a price is zero, an output from AND gate 346 is also inhibited when a price with a 0-Fraction is being written. The signal on line 359 assures this condition. Since this is the condition when price information is being loaded from buffer 146, there is a signal on line 344 to fully conditioned AND gate 342 resulting in an output signal on line 366 which is applied as a conditioning input to gate 368 (FIG. 9L). The signal on line 344 is also applied as one of the inputs to gating circuit 84 (FIG. 9X) in character generator 34. As indicated previously, when a signal appears on line 344, character 2 has nine strokes and character 3 seven strokes whereas, when there is no signal on line 344 character 2 has 7 strokes and character 3, 9 strokes. The reason for the two extra strokes in character 2 will now be apparent.

The information input to gate 368 is output line 370 from dot character generator 372. The inputs to generator 372 on lines 374 from the program counter, and the configuration of the generator itself, would vary with the nature of the dot pattern utilized to separate the digits portion from the fraction portion of a price quotation. For the four-dot square pattern shown in FIG. 10, the dots are located at bit positions 2 and 4 of strokes 6 and 7. The dot character generator could be made up of two OR gates, one of which has the bit 2 and bit 4 output lines from the character generator and the other of which has the stroke 6 and stroke 7 output lines from the character generator as inputs, with the outputs from the OR gates being applied as inputs to an AND gate. The output from the AND gate would be line 370. When gate 368 is conditioned, the four dot pattern is applied through this gate, line 376, OR gate 297 (FIG. 9Q), line 64A, conditioned gate 298, and line 334 to be recorded on the drum in the appropriate stroke and bit positions. Since only strokes 0—4 are used in writing character 2, there will be no overlap between this character and the dots. In fact, there will be a one stroke space between character 2 and the dots and also a one stroke space between the dots and the first stroke of character 3.

At stroke 6 time of character 2 AND gate 294 is again conditioned to bring character 3, the fraction character, into the rightmost position of buffer 146. This character is recorded on the drum in a manner identical to that for the characters previously described. At stroke 6 time of character 3 AND gate 294 is again conditioned to shift character 0 back into the rightmost position of the buffer. The register is thus restored to its initial condition. Since, at stroke 6 time of character 4 there is a signal on line 169, inverter 198 is not generating an output signal on line 200 and AND gate 294 is therefore not conditioned to generate an output signal on line 336. Buffer 146 thus remains in its initial condition. At character 4 time a signal is also applied as one input to AND gate 380 (FIG. 9I). However, a second input to this AND gate is output line 382 from inverter 384. The input to inverter 384 is close input line 235 from control character decoder 230. Under the assumption presently being made, there is no signal on line 382 at this time and AND gate 380 is therefore not conditioned to apply an output signal to line 386. The effect of a signal on line 386 will be discussed later.

The writing of the close price just described was performed on data line 2. As drum 18 continues its rotation, program counter 34 is continuously incremented. At the first data line 6, character 3, stroke 6 time after the recording of the close price, a signal appears on line 412 from the program counter, which signal is applied as one input to AND gate 414 (FIG. 9I). The other input to this AND gate is output line 316 from address compare circuit 318, which line has a signal on it at this time, indicating that a record line and word match has occurred. Output line 416 from AND gate 414 is connected as one input to AND gate 418 the other input to this AND gate being ONE-side output line 280 from load flip-flop 266. AND gate 418 being fully conditioned results in a signal on line 420 which is applied to reset load flip-flop 266 to its ZERO state.

ZERO-side output line 424 from load flip-flop 266 is connected as one input to AND gate 530 (FIG. 9H). Since, as was just indicated, AND gate 380 is not fully conditioned at this time, there is no signal on line 386 and inverter 524 is therefore applying a signal through line 526 to a second input of AND gate 530. The final input to AND gate 530 is character 4 input line 169 from the program counter. Therefore, at the first character 4 time after the load flip-flop is reset, AND gate 530 is fully conditioned to generate an output signal on line 532 which signal is applied through OR gate 533 and line 535 to reset set-load-volume flip-flop 264 (FIG. 9I) and ID present flip-flop 164 (FIG. 9P) to their ZERO state. The circuit is thus restored to its initial condition in preparation for a new input message at terminal 42.

Since the close price is to be entered only on line 2, no stepping of entry line counter 218 is required. In order to investigate the situation which occurs when this counter is to be incremented, assume that the close message is followed by a unison message giving the opening price of the stock. This opening price is also to be recorded in the high, low, and last positions. The unison message will contain a trends character indicating whether the opening transaction is higher or lower than the close the previous day. If the opening price is the same as the closing price the preceding day, the trends marker will be in the same direction as it was for the last price entered the previous day. For a unison message, when the end-of-message indication is received from AND gate 120 on line 128, control character decode 230 is generating an output signal on unison output line 234, there is a trends character in the rightmost position of buffer 146, followed by three price characters, and there is a volume stored in buffer 150. Assuming that a match was detected in ID compare circuit 186 while ID compare flip-flop 172 was in its ONE state, ID present flip-flop 164, set-load-volume flip-flop 264, and load flip-flop 266 are in this ONE state, and bid-ask flip-flop 216 is in its ZERO state. The presence of a signal on unison output line 234 from control character decode 230 causes entry line counter 218 to be set to a count of 3 indicating that the price in buffer 146 is to be first loaded on to line 3, the open line, for a display of the form shown in FIG. 2. When a match condition is detected, causing an output signal on line 210 from AND gate 178 (FIG. 9P), the signal on line 234 which is applied through OR gate 254 (FIG. 9L) to line 256 fully conditions AND gate 222 (FIG. 9Y). The resulting output signal on line 390 from AND gate 222 is applied as a conditioning input to gate 392. Gate 392 being conditioned permits the record line, data line, and word address at which the match occurred to be transferred through gates 392 and lines 394 to last-last-message-address buffer 396. The use to which the address in this buffer is put will be described shortly. The signal on line 390 is also applied to reset last-message flip-flop 398 to its ZERO state.

As before, the price, and now the trends character, in buffer 146 are successively shifted through the register during each word time and the succeeding characters apply through character generator 62 to line 64 a bit at a time. However, until an address match is detected in address compare circuit 318, no use is made of the information appearing on line 64. However, when a match is detected causing a signal to appear on line 316, AND gate 314 (FIG. 9P) is fully conditioned to generate an output signal which is applied through OR gate 310 to one input of AND gate 302. The first time that this condition exists, the character 0 trends character, in buffer 146 is being applied to character generator 62. This being the case, there is a signal on character 0 line 332 from the program counter preventing inverter 330 from generating an output signal on line 328 to OR gate 306. Since entry line counter 218 was initially set to data line 3, this is the line on which the first match occurs and thus, neither of the other inputs to OR gate 306 is present. Since only one of the inputs to AND gate 302 is present during character 0 time, this character is not passed by gate 298 and the recording of the trends character in the open price position (date line 2) of the display is thus inhibited.

At stroke 6 time of character 0 buffer 146 is shifted right in a manner previously described to bring character 1, the tens digit of the price, into the rightmost position of this register. This character, the character following it, the decimal point from dot character generator 372, and the fraction digit, if any, are recorded in succeeding character positions of the drum track in a manner previously described. The signal on output line 312 from AND gate 314, which signal indicates that a match has been detected, is applied as one input to AND gates 400 (FIG. 9L) and 402. A second input to each of these AND gates is character 4, line 169 from the program counter. Since there is a signal on unison line 234, OR gate 404 is generating an output signal on line 406 which is applied to fully condition AND gate 400 at character 4 time to generate an output signal on line 408. The signal on line 408 causes the count in entry line counter 218 to be incremented by one. The count in this counter is thus incremented to a count of four indicating that the price stored in buffer 146 is to be written on the high line, data line 4, of the record in the format shown in FIG. 2.

A new comparison will therefore be had in address compare circuit 318 when data line counter 90 in program counter 34 has been stepped to a count of four. Again, since none of the inputs to OR gate 306 are present, the trends character in the character 0 position will be suppressed and the remaining characters in buffer 146 stored in the appropriate character positions of the record on the proper track of drum 18. At character 4 time AND gate 400 is again conditioned to cause the count in entry line counter 218 to be incremented to a count of 5. This results in the price in buffer 146 being recorded on the low line, data line 5, of the matched-on record. Again, since none of the inputs to OR gate 306 are present at character 0 time, the trends character is suppressed. At character 4 time of data line 5 AND gate 400 is again fully conditioned to increment the entry line counter to a count of six.

With data line 6 in the program counter, there is a signal on line 326 from the program counter resulting in an output signal on line 304 at character 0 time which permits the trends character to be recorded on the drum. The trends character in the last price position of the display in the form shown in FIG. 2 is in this manner recorded. The recording of the remaining characters on this line of the display is achieved in a manner identical to that described above. At stroke 6 time of character 3, when data line 6 is being written, the program counter applies a signal to line 412 which signal in conjunction with the record line and word match signals on line 316, fully conditions AND gate 414 (FIG. 9I) to generate an output signal on line 416. The signal on line 416, in conjunction with the signal on ONE-side output line 280 from load flip-flop 266 fully conditions AND gate 418 to generate an output signal on line 420. The signal on line 420 is applied to reset load flip-flop 266 to its ZERO state and to set last message flip-flop 398 (FIG. 9Y) to its ONE state. At character 4, data line 6 time a signal is again applied through character 4 line 169 from the program counter to an input of AND gate 380 (FIG. 9I). Since there is no signal on close line 235 from control character decoder 230 at this time inverter 384 is applying a signal through line 382 to a second input of AND gate 380. The other inputs to AND gate 380, all of which are present at this time, are ONE-side output line 422 from set-load-volume flip-flop 264, ZERO-side output line 424 from load flip-flop 266, ZERO-side output line 284 from bid-ask flip-flop 216, and ZERO-side output line 426 from load-last-price flip-flop 276. When AND gate 380 is fully conditioned, it generates an output signal on line 386 which is applied to set load-volume flip-flop 360 (FIG. 9H) to its ONE state.

Data line 6 line 326 from the program counter is also applied through OR gate 317 (FIG. 9R) and line 315 as one input to AND gate 313. Since AND gate 314 (FIG. 9P) is generating an output signal on line 312 during the data line 6 time just described, AND gate 313 is fully conditioned when this line is being written to generate an output signal on line 319. The signal on line 319 is applied through OR gate 476 (FIG. 9Q) to one input to AND gate 480. Data line 6 line 326 is also applied through OR gate 482 to fully conditioned AND gate 480 to generate a conditioning input for gate 470. The conditioning of gate 470 permits the last price being written on data line 6, including the trends character in the character 0 position, to be recorded in the data line 6 position of the corresponding entry in the bid-ask-volume storage area of drum 18. It is thus seen that a last price on data line 6 is recorded in both the price storage area and the bid-ask-volume storage area of drum 18.

Flash Trends

Referring now to FIG. 9Y, it is seen that when last message flip-flop 398 was reset to its ZERO state by the signal on line 390, the signal on ONE-side output line 428 from this flip-flop terminated. Timer 430 is of a type which is started when its input terminates. This means that timer 430 is started when a match is detected on a last-price-type input. The subsequent setting of flip-flop 398 to its ONE state when load flip-flop 266 is reset effectively sets flip-flop 398 in preparation for the next match on a last-price-type input for which a trends marker will be required. The duration of timer 430 corresponds to the time period during which it is desired to have a trends marker flash after a change in the associated last price has occurred. The time will usually be several seconds. It should be noted that the output from timer 430 is not affected by the setting of flip-flop 398 to its ONE state. However, if a signal appears on line 390, resetting flip-flop 398 to its ZERO state while timer 430 is running, the timer is restarted and even though the flashing of the trends marker which the timer was controlling has not occurred for the required period of time, the flashing ceases.

Output line 432 from timer 430 is applied as one input to AND gate 434. A second input to this AND gate is output line 332 from the character decoder of program counter 34. Line 332 has a signal on it when the decoder is decoding character 0, character 0 being the trends character position. A third input to AND gate 434 is match output line 436 from address compare circuit 438. One set of inputs to address compare circuit 438 are the record line, data line and word address output lines 36 from program counter 34. The other set of inputs to this circuit are output lines 440 from last-last-message-address buffer 396. It will be remembered that this buffer is storing the record line, data line, and word address at which the last match occurred. A signal therefore appears on line 336 when the data line on which the last price was written, data line 6, of the record and word in which the last change was made is being looked at. The final input to AND gate 434 is line 442. Line 442 is connected to receive outputs from selected positions of frame counter 444. Frame counter 444 is shifted in response to a signal on line 446. Line 446 receives signals from the read head of the revolution clock track on drum 18. This means that a signal appears on line 446 once for each revolution of drum 18 and that the count in frame counter 444 is incremented once for each revolution of the drum. The connections to line 442 from frame counter 444 determines the rate at which flashing occurs and the relative duration of the on and off periods of each flash.

From the above it is apparent that AND gate 434 is fully conditioned to generate an output signal on line 448 when the trends character for the last price change is being read, timer 430 is on, and the frame counter is at one of the counts which causes an output on line 442. A signal on line 448 is applied to inverter 450 to prevent a signal from appearing on line 28. Line 28 is connected as one of the inputs to AND gate 452 (FIG. 9V). As will be seen later, AND gate 452 controls the gating of information from the price storage area of the track being looked at of drum 18 to a display device. When there is no signal on line 28 the application of an intensity input to the display device for the trends character is inhibited. By utilizing the frame counter to selectively inhibit and not inhibit the intensity input for the trends marker at some selected rate, the desired flashing of the trends marker for a predetermined period of time is achieved.

Load Volume

It will be remembered that when load flip-flop 266 was reset to 0, AND gate 380 (FIG. 9I) was fully conditioned to generate an output signal on line 386 which resulted in load-volume flip-flop 360 (FIG. 9H) being set to its ONE state. When flip-flop 360 is in its ONE state the resulting signal on ONE-side output line 456 is connected as one input to OR gate 458 and as one input to AND gate 460 (FIG. 9Q). Output line 462 from OR gate 458 is the conditioning input to gate 464 and is also one input to AND gate 466. The other two inputs to AND gate 466 are output line 200 from inverter 198 and stroke 6 line 196 from the program counter. Output line 468 from AND gate 466 is connected through OR gate 149 to shift the contents of buffer 150. The character in the rightmost position in buffer 150 is applied through conditioned gate 464 and lines 60 to character generator 62. Character generator 62 converts the succeeding characters of the volume into the equivalent characters in the video code and spews these characters out, a bit at a time, onto line 64. These bits are applied through OR gate 297 and line 64A to the information input of gate 470 (FIG. 9Q).

This sequence of operations is repeated over and over, with the contents of buffer 150 being recycled during each word time, until drum 18 has completed a full revolution and an address compare condition is again detected in address compare circuit 318 (FIG. 9R). The record line and word match lines 316 from address compare circuit 318 are connected as inputs to AND gates 460 (FIG. 9Q). As indicated previously, output line 456 from the ONE-side of the load volume flip-flop is another input to this AND gate. When a signal appears on data line 5 output line 472 from the program counter, AND gate 460 is fully conditioned to generate an output signal on line 474 which signal is applied through OR gate 476 and line 478 as one input to AND gate 480. Since there is a signal on line 472 at this time, OR gate 482 is generating an output signal on line 484 which fully conditions AND gate 480 to generate an output signal on line 486. This signal is applied to condition gate 470 to pass the volume bits on line 64A, including those for character 0, through line 488 to the appropriate track in the bid-ask-volume storage area of drum 18. At stroke 6 time of characters zero, one, two, and three, AND gate 466 is fully conditioned to cause a shift right operation to be performed in buffer 150. The succeeding characters of the volume stored in this buffer are in this manner applied, at the appropriate character times, to character generator 62 and shifted from character generator 62, a bit at a time, through conditioned gate 470 to be written on the drum. The volume for a particular transaction is in this manner recorded on the appropriate line, line 5, of an entry in the form shown in FIG. 3. The record line and word match signals on lines 316 are, as before, applied as inputs to AND gate 414 (FIG. 9I). When data line 6, character 3, stroke 6 of the entry in which the volume was written is reached, the resulting signal on line 412 fully conditions AND gate 414 to generate an output signal on line 416 which signal is applied as one input to AND gate 492 (FIG. 9H), the other input to this AND gate being the ONE-side output line 456 from the load-volume flip-flop. AND gate 492 being fully conditioned results in an output signal on line 494 which signal is applied to reset load volume flip-flop 360, and through OR gate 533 and line 535 to reset set-load-volume flip-flop 264, and ID present flip-flop 164. The system is thus restored to its initial condition in preparation for the reception of a new message on line 40.

The sequence of operation which occur when any of the other three types of last-price messages are received are substantially identical to those which occur when a unison message is received. The only difference is in the setting and incrementing of entry line counter 218 (FIG. 9L). When a last-only type message is received, resulting in an output signal on line 231 from control character decoder 230, entry line counter 218 is initially set to a count of six. This means that a successful comparison in address compare circuit 318 will not be had until data line 6 is reached and, since a signal appears on line 412 to cause the resetting of load flip-flop 266 at the end of data line 6, this is the only entry which is made before the load flip-flop is reset. When a high-last message is received, resulting in an output signal on line 232 from control character decoder 230, entry line counter 218 is initially set to a count of 4, resulting in the price in buffer 146 being first recorded on the high line, data line 4, of a record in the form shown in FIG. 2. At character 4 time, after the loading of the price into data line 4 has been completed, a signal appears on character 4 line 169 from the program counter which signal is applied as one input to AND gate 402. The other inputs to this AND gate are output line 312 from AND gate 314, which line has a signal on it at this time, and high-last output line 232 from control character decoder 230. AND gate 402 being fully conditioned results in an output signal on line 500 which signal is applied to increment the entry line counter by a count of two. A count of six is thus entered in the counter. When the program counter has advanced to data line 6, a match is again had in compare circuit 318 resulting in the price in buffer 146 being recorded on data line 6, the last price line, of the matched on entry. The recording of a high-last input on the high line and the last line is in this manner accomplished.

When a low-last message is received, the resulting output signal on line 233 from control character decoder 230 causes entry line counter 218 to be initially set to a count of five. The initial recording of the price in buffer 146 thus occurs on the low line, data line 5, of the matched on entry. At character 4 time of data line 5 a signal is applied through character 4 line 169 from the program counter to one input of AND gate 400, a second input to this AND gate being the signal on line 312. The final input to this AND gate is output line 406 from OR gate 404 which has a signal on it at this time as a result of the signal of low-last line 232. AND gate 400 being fully conditioned results in an output signal on line 408 which is applied to increment entry line counter 218 to a count of six. When the program counter has been advanced to data line 6, a match is again had in address compare circuit 318 resulting in the price in buffer 146 being recorded on the last price line, data line 6, of the matched on entry. The desired entering of this price on data lines 5 and 6 is in this manner effected.

It should be noted that the trends marker is written and is caused to flash for the last price entries on data line 6 in a manner identical to that previously described for the entry of a unison message. However, the writing of the trends character on data lines 4 and 5 is suppressed, also in a manner previously described. As with the unison message, each time a last price is written on data line 6 of the price storage area, the last price, including the trends marker, is also written on data line 6 of the corresponding entry in the bid-ask-volume storage area of drum 18. The load-volume flip-flop is set after the entry of the last price in each of the above described situations and, during the next revolution of the drum, the volume is loaded also in a manner previously described.

Loading of Bid-Ask Message

Since the corresponding stock ID for the price format shown in FIG. 2 and the bid-ask format shown in FIG. 3 are stored in the same record line, data line, and word positions on corresponding tracks in the price storage area in the bid-ask storage area respectively of drum 18, a match in ident-compare circuit 186 is, as previously indicated, effective for both of these storage areas. When a bid-ask message is received, it is therefore treated, during ident-compare time, in the same manner as a price type message and, when a match is detected resulting in an output signal on line 210, bid-ask flip-flop 216 (FIG. 9I) is reset. However, the signal on bid-ask output line 236 from control character decoder 230 causes this flip-flop to again be set to its ONE state. The signal on line 210 also causes the address at which the successful comparison occurred to be stored in ID address buffer 226 and ID present flip-flop 164 to be set to its ONE state. The setting of ID present flip-flop 164 to its ONE state, in conjunction with an end-of-message signal on line 128, a character 4 signal on line 169 from the program counter, and an output signal on line 260 from OR gate 258 fully condition AND gate 252 (FIG. 9H) to generate an output signal on line 262 which is applied to set load flip-flop 266 to its ONE state. Since bid-ask output line 236 from the control character decoder is one of the inputs to OR gate 258 (FIG. 9F) the load flip-flop will be set. The signal on One-side output line 280 from load flip-flop 266, in conjunction with the signal on ONE-side output line 502 from bid-ask flip-flop 216, fully condition AND gate 504 to generate an output signal on line 506. The signal on line 506 is applied as one input to AND gates 508 (FIG. 9I), 510 (FIG. 9H) and 512 (FIG. 9Q). The other input to AND gate 508 is date line 3 output line 514 from the program counter. The other input to AND gate 510 is data line 4 output line 516 from the program counter. Output line 518 from AND gate 508 is applied through OR gate 288 and line 290 to condition gate 292 to pass the bid price in buffer 146 to character generator 62. As before, the signal on line 290 is also applied to AND gate 294 to cause the bid price in this register to be shifted through the register in a cyclic manner during each word time. It should be remembered that, since bid-ask messages do not contain a trends character, the 100s bit of the bid price will be in the zero character position of this register. However, as will be seen shortly, the application of this character to the drum is inhibited. The bid price is thus applied to character generator 62 during each data line three times as long as the load and bid-ask flip-flops are set.

A signal on output line 520 from AND gate 510 (FIG. 9H) is applied through OR gate 458 and line 462 to condition gate 464 to pass the ask price in buffer 150 to character generator 62. The signal on line 462 is also applied to AND gate 466 to cause the ask price in buffer 150 to be shifted through the register during each word time. The ask price in buffer 150 is thus applied to character generator 62 during each data line 4 time that the load flip-flop and bid-ask flip-flop are both in their ONE state.

The reason that the bid price in buffer 146 is applied to the character generator during data line 3 time while the ask price in buffer 150 is applied to the character generator during data line 4 time can be understood by referring to FIG. 3 where it is seen that the bid price for an entry in the bid-ask format is recorded on data line 3 while the ask price of an entry in this format is recorded on data line 4. While the bid and ask price in buffer 146 and 150 are continuously applied to character generator 62 at the appropriate data line times as long as load flip-flop 266 and bid-ask flip-flop 216 are in their ONE state, nothing is recorded on the drum until a successful record line and word compare occurs in address compare circuit 318 (FIG. 9R). The signal on line 316, when this occurs, is applied to fully condition AND gate 512 (FIG. 9Q), resulting in an output signal on line 522 which is applied through OR gate 476 and line 478 to one input of AND gate 480. At the first data line 3 time after AND gate 512 is conditioned, the characters of the bid price from buffer 146 are successively applied through character generator 62, line 64, OR gate 297, and line 64A to the information input of gate 470. At character 0 time of this data line there is a signal on line 332 preventing inverter 330 from generating an output signal on line 328. Since none of the other inputs to OR gate 482 are present during data line 3 time, there is no signal on line 484 and AND gate 480 is therefore not conditioned to generate an output signal on line 486. The recording of character 0, the 100s digit character, of the bid price is in this manner inhibited. Characters 1, 2 and 3 of the bid price are recorded on the appropriate positions in the bid-ask area of drum 18 in a manner similar to that previously described for the recording of other price information. It will be remembered that during stroke 6 and stroke 7 time of character 2 of this price, generator 372 (FIG. 9L) generates outputs on line 370 which are applied to line 64A to provide the dots on the display separating the digits portion from the fraction portion of the applied bid price.

At data line 4 time the ask price in buffer 150 is applied to character generator 62. From character generator 62, the price is applied on a bit-by-bit basis to gate 470. Again the character 0 position is inhibited from being stored on the drum and the remaining characters of the ask price are recorded in appropriate positions. The signal on output line 520 from AND gate 510 is also applied as one input to AND gate 369 (FIG. 9A). Only when the O-fraction-ask flip-flop is in its ZERO state is AND gate 369 fully conditioned to apply a signal through OR gate 361 to fully condition AND gate 346 (FIG. 9H). Thus, for an ask price, the four-dot decimal point character at the end of character 2 appears only if a nonzero fraction exists on this price. When data line 6, character 3, stroke 6 of the matched on entry is reached by the program counter, all inputs to AND gate 414 (FIG. 9I) are present resulting in an output signal on line 416 which is applied to reset load flip-flop 266. Since bid-ask flip-flop 216 is in its ONE state, there is no signal on ZERO-side output line 284 from this flip-flop and AND gate 380 is therefore not conditioned at character 4 time. Load volume flip-flop 360 therefore remains in its ZERO state. However, the absence of a signal on line 386 permits inverter 524 (FIG. 9H) to generate an output signal on line 526 which signal is applied as one input to AND gate 580. The signal on ZERO side output line 424 from load flip-flop 266 and the character 4 signal on line 169 from the program counter fully conditioned AND gate 530 to generate an output signal on line 532 which is applied through OR gate 533 and line 535 to rest ID present flip-flop 164 set-load-volume flip-flop 264 to their ZERO state. The system is thus reset to its initial condition in preparation for receiving a new message on line 410.

Loading Last Price Area

Assume now that during ident compare time a match was had in last price ID compare circuit 188 (FIG. 9P) resulting in last-price-ID-present flip-flop 168 and load-last-price flip-flop 276 (FIG. 9L) being set to their ONE state. The signal on ONE-side output line 540 from the load-last-price flip-flop is applied as one input to AND gates 541 and 542. Assuming that volume on an all-transactions display is not being loaded at this time, AND gate 541 is fully conditioned to generate an output signal on line 543 which signal is applied through OR gate 288 to line 290. The signal on line 290 is applied to condition gate 292 to pass the price and the trends information in buffer 146 through lines 60 to character generator 62, and is also applied to AND gate 294 to cause the contents of this buffer to be cyclically shifted during each word time in a manner previously described. Since a signal continuously exists on line 290 as long as load-last-price flip-flop 276 is in its ONE state, the price and trends information in buffer 146 is continuously applied to the character generator during each word time. However, while this information is being applied to the information input of gate 542 (FIG. 9Q) nothing is stored until a match indication is generated on output line 544 from address compare circuit 547 (FIG. 9-0). One set of inputs to address compare circuit 546 is on output lines 548 from last-price-ID-compare buffer 244. It will be remembered that the record line, data line, and word at which the matching stock ID is stored was stored in buffer 244 when a match was detected in last-price ID compare circuit 188. It is desired to store the last-price information at the same record line and word position but on the following data line, the contents of buffer 244 were incremented by one data line when an EOM signal was received on line 128. The address in buffer 244 at this time is thus the address at which it is desired to store the last price. The other inputs to address compare circuit 546 are the record line, data line, and word output lines 36 from program counter 34. Therefore, when a match signal appears on line 544, the address under the write head is the address at which it is desired to write the last price.

The signal on line 544 is applied to fully condition AND gate 542 (FIG. 9Q) to generate an output signal on line 554 which signal is applied through OR gate 556 and line 558 to condition gate 542 to pass the last-price information on line 64A through line 560 to the write head for the appropriate track in the last-price area of drum 18. Assuming that the last price does not have a 0-fraction, AND gate 346 (FIG. 9H) is fully conditioned during a load-last-price operation to cause the four-dot decimal point pattern to be recorded at the end of character 2. It should, at this point, be noted that the circuitry for only a single track in the last-price area of drum 18 has been shown and that there would, in fact, be a separate gate 542 and a separate line 560 for each track in this area. The signal on line 558 would be AND'ed with an output signal on the appropriate line 268 from the last-price-ID-present flip-flop 168 which was set to cause the appropriate one of the gates 542 to be conditioned to store the last-price information on the appropriate track. It should also be noted that there is no character 0 inhibit when last-price information is being stored in the last-price area of drum 18 and the trends character is thus always stored with this entry.

The signal on line 544 is also applied as one input to AND gate 562 (FIG. 9L), the other input to this AND gate being output line 540 from the ONE-side of load-last-price flip-flop 276. Output line 564 from AND gate 562 is connected to reset load-last-price flip-flop 276 and last-price-ID-present flip-flop 168 to their ZERO state.

The operations described so far with respect to the loading of a price into the last-price area of drum 18 occur independent of whether the load flip-flop 266 is also set causing the price to be loaded into the price storage area of drum 18 as well. The only place where these two flip-flops interact is in the setting of the load-volume flip-flop by the conditioning AND gate 380 (FIG. 9I). If only the load-last-price flip-flop has been set, then set-load-volume flip-flop 264 will be in its ZERO state and, at character 4 time after the load-last-price flip-flop is reset, AND gate 380 will not be fully conditioned. A load volume operation will therefore not be performed. The reason for this is that, as may be seen from FIGS. 3 and 4, the positions in which stock IDs appear in the format of FIG. 3 is different from the positions in which these stock IDs appear in the format of FIG. 4. An attempt to load volume when a match is had only for the last-price storage area, would, therefore, result in an erroneous loading of the volume into the address position of the previous transaction. However, if both the load flip-flop 266 and the load-last-price flip-flop 276 are set for a particular stock ID input, then it is desired to load volume However, the load volume flip-flop should not be set, causing volume to be applied to character generator 62, until all price inputs have been loaded. Therefore, AND gate 380 is not fully conditioned until both load flip-flops have been reset. The set-load-volume flip-flop 264 is utilized to remember that the load flip-flop was set should this flip-flop be reset prior to the resetting of the load-last-price flip-flop.

Loading of all Transactions on Stock X Area

The system also has the capability of storing the price and volume on all transactions relating to a particular stock. FIG. 5 shows the format in which a display of this information appears. The stock, which it is desired to display is identified by the user, not by the stock ID, but by the position which the stock occupies, in the format of the type shown in FIG. 2, on a selected display device 10A. In order to simplify the description, the stocks on which a full transaction display may be obtained have been limited to those displayed in the word 0 or word 2 positions on a single display device. The selected stock must also appear on the word 0 or word 2 position of a display device although not necessarily the same display device. Therefore, only a single track in the price storage area of drum 18 need be monitored. However, as will be mentioned later, this is not a limitation on the system.

An all-transactions display is initiated by the operator by depressing a load listing key on keyboard 20 (FIG. 9S) resulting in an output signal on load listing line 570. The signal on line 570 is applied to set load listing flip-flop 572 (FIG. 9C) to its ONE state and through OR gate 714 (FIG. 9U) and line 716 to reset load-last-price-area flip-flop 718 to its ZERO state. The resulting signal on ONE-side output line 574 from load-listing flip-flop 572 is applied as the conditioning input to gates 576 (FIG. 9B). The information input to gates 576 are output lines 578 from address decoder 580 (FIG. 9G). The inputs to address decoder 580 are output lines 582 from the address keys of keyboard 20. Once the operator has depressed the load listing key, he then types in the display position of a selected display device at which the stock ID on which it is desired to have a listing is displayed. Referring to FIG. 2, if the stock having the code ABC is selected, the operator would strike the row one and column one keys. If he wishes a listing on stock STU, he would strike the row two and column 3 keys. The display row and column address applied to decoder 580 are converted into a record line and word address in the code used by the program counter. The input on line 730 to address decoder 580 controls base for the decode operation in a manner to be described later. Since there is no signal on the line during this operation, it may be ignored. Gate 576 being conditioned permits the decoded address from address decoder 580 to be applied through lines 584 to be stored in listing address register 586.

When the operator has finished keying the address at which the stock which it is desired to have an all-transactions listing on is stored, a start-listing key on keyboard 20 is depressed resulting in an output signal on start-listing line 588 which is applied to set start-listing flip-flop 590 (FIG. 9C) to its ONE state, and to reset load-listing flip-flop 572 to its ZERO state. The signal on ONE-side output line 592 from start-listing flip-flop 590 is applied as one input to AND gate 594. The other input to this AND gate is line 596 from program counter 34 which line has a signal on it when the program counter is at the position at which it is desired to write the first entry marker. Since, as will be seen shortly, an entry is made at the first position following the position where the entry marker is located, a signal appears on line 596 when the program counter is set to the last position at which an entry marker may be recorded. This is record line 2, data line 6, word 3, character 2, stroke 6, bit 1. When AND gate 594 is fully conditioned, the resulting output signal on line 596 is applied to reset start-listing flip-flop 590 to its ZERO state and is also applied through OR gate 598 and line 600 to energize marker bit generator 602. The energizing of generator 602 causes a signal of appropriate magnitude to be applied through line 604, OR gate 606 (FIG. 9Q), and line 608 to cause a bit to be recorded in the appropriate marker bit position on the single track of the all-transactions storage area on drum 18.

Since erase-marker flip-flop 610 (FIG. 9B) is in its ZERO state at this time there is a signal on ZERO-side output line 612 which is applied as one input to AND gate 614. A second input to AND gate 614 is ZERO-side output line 616 from load compare flip-flop 618 (FIG. 9C). This flip-flop is also initially in its ZERO condition. The final input to AND gate 614 is output line 620 from gate 622, (FIG. 9Y). The information input to gate 622 is output line 624 from the read head on the single track of the all-transactions area on drum 18. The conditioning input to gate 622 is output line 626 from program counter 34 which line has a signal on it when a marker bit position is being looked at. As indicated before, the marker bit position is character 2, stroke 6, bit 1. A signal therefore appears on line 620 to fully condition AND gate 614 when the presence of a marker bit is detected on the all-transaction track of drum 18. Output line 628 from AND gate 614 is connected as the conditioning input to gates 630, the information inputs to this gate being the record line, data line, and word address output lines 36 from the program counter. When gates 630 are conditioned, the address on lines 36 is applied through lines 632 to be stored in last-entry-address buffer 634. The record line, data line, and word address of the entry marker, or in other words, the address at which the last transaction on stock X is stored, is in this manner read into buffer 634. As long as erase-marker flip-flop 610 remains in its ZERO state, the above-described operation is repeated each time the entry marker is detected, or, in other words, once for each revolution of drum 18.

The record line and word address stored in listing address register 586 is applied through lines 636 as one set of inputs to address compare circuit 638. The other set of inputs to this compare circuit is the record line and word decode output lines 36 from the program counter. Therefore, when the stock ID which it is desired to have a listing on is being looked at by the read heads for the price storage area 18, address compare circuit 638 generates an output signal on line 640 which signal is applied as one input to AND gate 642. A second input to AND gate 642 is output line 256 from OR gate 254 (FIG. 9L). It will be remembered that OR gate 254 generates an output signal when a last-price type message is applied to the system. A third input to AND gate 642 is record-line-and-word match output line 316 from address compare circuit 318 (FIG. 9R). The final input to AND gate 642 is output line 250 from the ONE-side of ID-present flip-flop 164. The ID-present flip-flop 164 which has its output connected as an input to AND gate 642 determines which of the display elements 10A is adapted to have an all-transactions display compiled for a stock appearing thereon. If it is desired to have the capability of providing an all-transactions display for a stock appearing on any display element 10A, then the address input stored in register 586 would have to include an indication of the selected display element and this indication would have to be decoded and utilized to gate the output from the appropriate ID-present flip-flop to gate 642.

AND gate 642 is therefore fully conditioned when a match is had on the stock at the position indicated in register 586 and the input message is a last-price type message. Output line 644 from AND gate 642 is connected to set erase-marker flip-flop 610 to its ONE state. One-side output line 648 from flip-flop 610 is connected as one input to AND gate 650. A second input to this AND gate is the before mentioned marker-bit position output line 626 from the program counter. The final input to AND gate 650 is output line 652 from address compare circuit 654. The inputs to this address compare circuit are the record line, data line, and word address output lines 36 from the program counter and these same three addresses on lines 656 from last-entry-address buffer 634. Compare circuit 654 therefore initially generates an output on line 652 when the data line and word being looked at are the same as that where the entry marker is stored. AND gate 650 is therefore fully conditioned when the position where the entry marker is stored is being looked at and erase marker flip-flop 610 is in its ONE state.

Output line 658 from AND gate 650 is connected to reset erase-marker flip-flop 610 to its ZERO state, to set load-compare flip-flop 618 to its ONE state, to increment the count in buffer 634 by one data line, thus relating the count in this buffer to the address of the next line on which an entry is to be recorded, and to energize zero bit generator 660. Output line 662 from zero bit generator 660 is applied through OR gate 606 (FIG. 9Q) and line 608 to effectively blank out the marker which was recorded on the all-transactions track of drum 18. Load compare flip-flop 618 being in its ONE state results in signal on ONE-side output line 664 which is applied as one input to AND gate 666 and 668.

Nothing further happens until the drum has completed another revolution and has reached the data line and word position on which it is desired to write the new entry stored in the system. For the first entry this would be the record line 0, data line 2, word 0 position. Since the address of this position is now stored in buffer 634, (an increment of one from the last position sets the buffer to its first position) a successful comparison occurs in address compare circuit 654 at this time resulting in an output signal on line 652 which is applied to fully conditioned AND gate 666 to generate an output signal on line 670. Since, as may be seen from FIG. 5, there are only two columns in the all-transactions display, there is a need to match only on the least significant bit of the word address, the match in compare circuit 654 is only on the least significant bit of the two bit word address and a signal remains on line 652, and therefore on line 670, two word times. The match will, therefore, last either through word zero and the word one or through word two and word three. The signal on line 670 is applied as one input to AND gates 672 (FIG. 9I), 364 (FIG. 9H) and 674 (FIG. 9Q). The second input to AND gate 672 is output line 676 from the program counter which line has a signal on it during word 0 and word 2 time. Therefore, assuming that line 670 has a signal on it during word 0 and word 1 time, AND gate 672 will be fully conditioned at word 0 time to generate an output signal on line 678 which signal is applied through OR gate 288 to line 290 to cause the price and trends mark in buffer 146 to be shifted through the buffer and to be applied, a character at a time, to character generator 62. The output from generator 62 is applied through line 64A to the information input of gate 680 (FIG. 9Q). The conditioning input to gate 680 is output line 682 from AND gate 674. One input to AND gate 674 is the before mentioned line 670. The other input to AND gate 674 is output line 684 from OR gate 686. The function of OR gate 686 is to inhibit the writing into the character zero position except words 1 or 3 when volume is being written or, in other words, to suppress the writing of the trends character in the all transactions display. Character 0 of the price data applied from buffer 146 through character generator 62 to gate 680 is thus not passed. The remaining characters of this price are passed, a bit at a time, through line 688, OR gate 606 and line 608 to be recorded in the appropriate positions of the all-transactions track on drum 18. During stroke 6, bit 1 time of character 2 of this writing, a signal appears on line 626 from the program counter to fully condition gate 668 (FIG. 9C) to generate an output signal on line 690 which signal is applied through OR gate 598 and line 600 to energize mark-bit generator 602. The resulting output signal on line 604 is applied through OR gate 606 and line 608 to cause a mark bit to be written in the appropriate position of the entry being made. This mark bit will be utilized, as just described, to indicate the position where the next transaction on stock X is to be recorded. During appropriate bit times of strokes 6 and 7, dot character generator 372 is also energized to cause the four-dot pattern used to separate character 2 from the fraction character 3 to be generated and stored on the drum.

When word 0 terminates and word 1 begins, the signal on line 676 ceases, deconditioning AND gate 672, and a signal appears on word 1 or word 3 output line 692 from the program counter. This signal is applied to fully condition AND gate 364 (FIG. 9H) to generate an output signal on line 362 which is applied through OR gate 458 to line 462. The signal on line 462 causes the volume stored in buffer 150 to be shifted through the buffer and conditions gate 464 to pass this volume, a character at a time, to character generator 62. The characters which are generated are applied, a bit at a time, to the information input of gate 680 (FIG. 9Q). Since a signal appears on line 692 from the program counter, AND gate 674 will be conditioned for all characters of this input permitting gate 680 to pass these characters through OR gate 606 and line 608 to be recorded in the appropriate character positions of word 2 on the all-transactions track of drum 18. It should be noted that since there is a signal on line 362 at this time, inverter 356 is not generating an output signal on line 354 and AND gate 346 is therefore deconditioned, inhibiting the application of the dot characters from generator 372 to be recorded on the drum. The unwanted dot characters are thus not recorded in the volume word.

The word 1-or-word-2 signal on line 692 from the program counter is also applied as one input to AND gate 694 (FIG. 9C). The other inputs to AND gate 694 are match line 652 from address compare circuit 654 and character-3, stroke-6 output line 696 from the program counter. Therefore, when the writing of the volume entry into the appropriate position of the all-transactions track of drum 18 has been completed, AND gate 694 is fully conditioned to generate an output signal on line 698 which signal resets load compare flip-flop 618 to its ZERO state. The all-transactions listing portion of the circuit is thus restored to its initial condition with all flip-flops in their ZERO state. Each time the marker bit is detected, the record line, data line, and least significant bit of the character word where the marker is stored is read into buffer 634. Nothing further occurs until a new transaction is received on the stock being listed.

It was previously mentioned that the listed stock could only be one which appears in the word 0 or word 2 position of the selected display device 10A. It is apparent that the reason for this is that, when a listing on a stock is being recorded, the volume portion of this listing is written during word 1 or word 3 time. Since it is possible that both price storage and the all-transactions areas of drum 18 may be loaded at the same time, provisions must be made to prevent the volume word for the all-transactions entry from being applied to character generators 62 at the same time that a price word for the price storage area is being applied to the character generator. While this may be accomplished by recording volume on a second revolution of the drum, as was done to load volume into the bid-ask-volume storage area of the drum, for simplicity, it has been chosen to apply the inverted output from AND gate 364 (FIG. 9H), which output appears on line 354, as one of the inputs to AND gate 282 to inhibit the application of price data to character generator 62 during word 1 and word 3 time of an all-transactions loading cycle. This is done in order to prevent the loss of information in the price storage area of drum 18 during words 1 and 3 of an all-transactions cycle. Therefore the limitation of not selecting stock appearing in these two word positions for an all-transactions listing has been imposed. A similar limitation is imposed on the last-price storage area. AND gate 541 (FIG. 9L) to which line 354 is applied as one input, assures that a last-price will not be applied to the character generator during a volume loading operation.

Changing Items to be Displayed

The manner in which the stock to be displayed on an all-transactions display is selected has been described in the previous section. The manner in which the stocks to be displayed in the forms shown in FIGS. 2, 3, and 4, and the manner in which the positions where these stocks are to be displayed, are selected will now be described. The operator must first decide whether the stock to be loaded is to be loaded in a display of the type shown in FIGS. 2 or 3 or in a display of the type shown in FIG. 4. If it is to be loaded in a display of the type shown in FIGS. 2 and 3, a load full and bid-ask key is depressed resulting in an output signal on line 710 which signal is applied to set load-full-and-bid-ask flip-flop 712 (FIG. 9U) to its ONE state and through OR gate 714 and line 716 to reset load-last price area flip-flop 718 to its ZERO state. It should be noted that a load-listing signal on line 570 is also applied through OR gate 714 and line 716 to reset the load-last-price-area flip-flop. If, on the other hand, it is desired to change a stock in a last-price display, a load-last-price key is depressed resulting in an output signal on line 720 from the keyboard which signal is applied to set the load-last-price-area flip-flop 718 to its ONE state and to reset the load-full-and-bid-ask flip-flop to its ZERO state. Therefore, when the operator has completed his load decision, either flip-flop 712 or 718 will be in its ONE state depending on the display format in which the operator desires to make a change. Except where otherwise indicated, the remaining operations in changing a stock display are independent of which of the two flip-flops, 712 or 718, is set.

As a next step in the operation, the operator depresses a start key on the keyboard resulting in an output signal on start line 722 from the keyboard which signal is applied to reset character counter 726 (FIG. 9J) to a count of 0, and to reset last price clear flip-flop 724 and ID erase flip-flop 728 to their ZERO state. After depressing the start key, the operator then keys in the row and column position on a display of the type shown in Fig. 2 at which the ID entry which he desires to change appears. It should at this point be noted that a tube designation would also have to be keyed in where a plurality of display tubes are provided. However, for the sake of simplicity, the writing on only a single display tube has been shown in FIGS. 9A—9Y. The signal on address output lines 582 are applied to address decode circuit 580 (FIG. 9G). If the load-last-price-area flip-flop 718 is in its ONE state, ONE-side output line 730 is connected as a control input to the address decoder to switch the scale of the decode operation. Therefore, if there is no signal on line 730 and an input comes in indicating that a change is to be made in row 2, column 2, this would be decoded as record line 2, data line 1, word 2 whereas, if there is a signal on line 730 and an input comes in indicating that the change is to be made on row 2, column 2, this would be interpreted as record line 1, data line 4 word 2. Depending on the presence or absence of a signal on line 730 the address input on lines 582 is encoded into the proper drum memory address and applied through lines 578 to be stored in record line counter 732, data line counter 734, and word register 736. If there is no signal on line 730, data line counter 734 is always initially set to a count of one.

The next step in the operation occurs when the operator strikes the first character of the stock ID on the alpha portion of keyboard 20. The striking of this key results in a coded output on lines 738 which output is stored in one-character keyset buffer 740 (FIG. 9D). The fact that a character is stored in this buffer results in an output signal on at least one of the lines 742 which signal is applied through OR gate 744 and line 746 to one input of AND gate 748. The other inputs to this AND gate are the ZERO-side output lines 162 and 166 from the ID-present and last-price-ID-present flip-flops 164 and 168 respectively, the ZERO-side output lines 424, 426, 358, and 616 from the load flip-flop 266, load-last-price flip-flop 276, load-volume flip-flop 360, and load-compare flip-flop 618 respectively and the ZERO-side output line 749 from SOM flip-flop 124. AND gate 748 is therefore fully conditioned when there is a character in buffer 740 to be loaded and another load operation is not being performed or waiting to be performed. AND gate 748 is therefore effectively a priority circuit which gives the loading of new characters into the system a lower priority than any other load operation. Output line 750 from AND gate 748 is connected to set load-ID-control flip-flop 350 to its ONE state.

Output line 752 from the ONE side of load-ID-control flip-flop 350 is connected as one input to AND gate 754. The other input to AND gate 754 is match output line 756 from address compare circuit 758. One set of inputs to address compare circuit 758 are the record line, data line, word, and character decode output lines 36 from program counter 34. The other set of inputs to compare circuit 758 are output lines 760—763 from record line counter 732, data line counter 734, word register 736, and character counter 726 respectively. A signal therefore appears on line 756 when the program counter is set to the character address at which it is desired to store the character in buffer 740.

Output line 770 from AND gate 754 is connected to condition gates 772 to pass the character stored in buffer 740 through line 60 to character generator 62. Character generator 62 applies the character, a bit at a time in video code, through line 64, OR gate 297, and lines 64A to the information input of gates 298 (FIG. 9P) and 470 (FIG. 9Q). The signal on line 770 is also applied as one input to AND gate 774 (FIG. 9P), the other input to this AND gate being output line 776 for the ONE side of load-full-and-bid-ask flip-flop 712. Output line 778 from AND gate 774 is applied through OR gate 310 to one input of AND gate 302 and through OR gate 476 to one input of AND gate 480. Since there is a signal on data-line-1 output line 780 from the program counter at this time, OR gate 306 and OR gate 482 are generating output signals at this time which signals are applied to fully conditioned AND gates 302 and 480 respectively. This results in gate 298 being conditioned to store the character in buffer 740 in the character position being looked at on the selected track of the price storage area of drum 18 and in gate 470 being conditioned to store the character in buffer 740 in the appropriate character position of the track in the bid-ask-volume storage area of drum 18.

The character from character generator 62 is also applied through lines 64A to the information input of gate 542 (FIG. 9Q) and the signal on line 770 is also applied as one input to AND gate 780. If it is assumed that load-last-price-area flip-flop 718 is in its ONE state rather than the load-full-and-bid-ask flip-flop 712, the resulting output signal on line 730 is applied to fully condition AND gate 780 to generate an output signal on line 782 which signal is applied through OR gate 556 to condition gate 542 to store the character in buffer 740 in the appropriate character position on the selected track of the last-price area on drum 18. It should at this point be mentioned that the circuitry for only a single track in each of the three storage areas, and a single display element 10A, has been shown in FIGS. 9A—9Y. However, additional gating circuitry operating under control of a display device indication stored in a register as a result of the address decode in decoder 580 would be provided where multiple tracks in each storage area and multiple display devices are utilized.

In addition to the functions already described, the signal on line 770 is also applied to reset the contents of one-character keyset buffer 740 (FIG. 9D), this reset not actually becoming effective until the contents of the register have been read out and as a step input to character counter 726 (FIG. 9J). The character count in this counter is thus incremented to a count of one. The other uses which are made of the signals on line 770 will be described later.

When drum 18 has completed another revolution, plus one character, an address compare is again had in address compare circuit 758. This compare is on character position 1 rather than on character position 0. Since load flip-flop 350 is still in its ONE state, AND gate 754 is again fully conditioned to generate an output signal on line 770 which is applied to gate the contents of buffer 740 to character generator 62 and to pass the output from the character generator into the appropriate character position on tracks in selected areas of drum 18. However, since buffer 740 was reset when the first character was written into the drum, a blank character is read out at this time and the effect of this operation is to blank or erase the second character of the old ID stored on the drum or, in other words, to erase the character in the character 1 position of the drum. The signal on line 770 is again effective to reset the buffer and to increment character counter 726 to a count of two.

Since load ID control flip-flop 350 is still in its ONE state, AND gate 754 is conditioned for a third time when the program counter reaches a character 2 count resulting in an output signal on line 770 which effectively erases any character in the character 2 position of the entry being changed on the drum and increments the character count to a count of 3. A count of 3 in character counter 726 results in three-count decode AND gate 784 (FIG. 9J) being fully conditioned to generate an output signal on line 786 which signal is applied as one input to AND gate 788. A second input to AND gate 788 is output line 790 from the ZERO side of ID-erase flip-flop 728. When a match is had in address compare circuit 758 on the character 3 position, AND gate 754 is again conditioned to generate an output signal on line 770 which signal is effective to cause the erasure of any character in the character 3 position of the entry to be changed on drum 18 and it is also effective to step character counter 726 to a count of zero and to fully condition AND gate 788 to generate an output signal on line 792. The signal on line 792 resets character counter 726 to a count of one, sets ID-erase flip-flop 728 to its ONE state and is applied through OR gate 794 (FIG. 9N) and line 796 to reset load-ID-control flop 350 (FIG. 9D) and clear flip-flop 798 to their ZERO state. The circuit has thus recorded the first character of the new stock ID in the appropriate position or positions on drum 18, and has erased the remaining characters on the ID line of the selected entry. Having completed these operations, the circuit has been reset in preparation for the reception of the next character. It should be noted that the speed of the circuit components utilized is such that the above-described sequence of operations may be completed in a few milliseconds and thus may easily be completed between the time that two keys on keyboard 20 are struck by the operator.

When a second key on keyboard 20 is struck the resulting signals on lines 738 are again applied to store a character in buffer 740. The resulting appearance of a signal on at least one of the lines 742 causes OR gate 744 to generate an output on line 746 which, when another load operation is not being performed or about to be performed, fully conditions AND gate 748 to generate an output signal on line 750 to set load-ID-compare flip-flop 350 to its ONE state. It will be remembered that character counter 726 was set to a count of one at the end of the previous operation. Therefore, a match will be had in address compare circuit 758 when the character 1 position of the desired entry is in a position to be written into. The resulting output signal on match line 756 fully conditions AND gate 754 (FIG. 9G) to generate an output signal on line 770 which signal is again effective to cause the storage of the character in buffer 740 at the character 1 position of the appropriate entry or entries on drum 18. The signal on line 770 is also applied to reset buffer 740, to increment character counter 726 to a count of 2, and as one input to AND gate 800 (FIG. 9N). The other inputs to AND gate 800 are output line 802 from the ONE side of ID-erase flip-flop 728 and output line 804 from the ZERO side of clear flip-flop 798. Since signals are appearing on both of these lines at this time, AND gate 800 is fully conditioned to generate an output signal on line 806 which signal is applied through OR gate 794 and line 796 to reset load-ID-compare flip-flop 350 and clear flip-flop 798 to their ZERO state. The circuit is thus reset awaiting the next character or instruction from the operator.

If it is assumed that the new stock has a three character ID, a third key would be depressed on the keyboard resulting in load-ID-control flip-flop 350 again being set to its ONE state. When the character 2 position of the selected entry was next reached, address compare circuit 758 would again be fully conditioned resulting in an output signal on line 756 which fully conditions AND gate 754 to generate an output signal on line 770. As before, the signal on line 770 would be effective to store the character in buffer 740 in the character 2 position of the selected entry on drum 18 and to then reset buffer 740, increment the count in character counter 726 to a count of 3, and fully condition AND gate 800 to apply a signal through OR gate 794 to reset the clear and load-ID-control flip-flops. If the stock ID should have a fourth character, this character would also be stored in buffer 740 and then transferred, under control of a signal on line 770, into the character 3 position of the appropriate entry or entries on drum 18. The signal on line 770 would then reset the character buffer, step character counter 726 to a count of 0, and apply a signal through AND gate 800 and OR gate 794 to reset the clear flip-flop and the load-ID-control flip-flop. However, this signal would also find a signal on output line 786 from three-count decode AND gate 784 (FIG. 9J) being applied to one input of AND gate 810. The signal on line 770 is applied to a second input of this AND gate and the signal on output line 802 from the ONE side of ID-erase flip-flop 728 fully conditions this AND gate to generate an output signal on line 812 which signal is applied to step the count in data line counter 734 and is also applied to set last-price-clear flip-flop 724 to its ONE state and as one input to AND gate 814. If the data line counter were initially set to a count of 6, a condition which would occur only if a change was being made in the last price display, data line counter 734 would be generating an output signal on data-line-6-count output line 816 to fully condition AND gate 814 resulting in an output signal on line 818 which is applied to step the count in record line counter 732. The effect of the operation just described is to advance the address applied to address compare circuit 758 by one date line. When this advance is from the data line 6 of one record line to the data line 0 of the succeeding record line, the record line counter must also be stepped. The advance of the data line is utilized in the clear operation which will now be described.

When the operator has finished keying in the new stock ID, he may observe the board to be sure that the ID has been entered in the desired position. If the operator finds that he has made an error either in keying in the position at which the new ID is to be stored, or in the ID itself, or, if for some other reason he wishes to restore the old ID to the selected position, the data for the old stock ID is still recorded on the drum and may be restored merely by repeating the above-described sequence of operations with the same entry position again being selected and the old ID being keyed in after the selection operation has been completed. If the operator decides that the ID he has typed in is the desired one, then he may remove the price data for the old stock ID from the display and drum 18 by depressing a clear key on the keyboard resulting in an output signal on load clear-line 820. The signal on load-clear line 820 is applied to set clear flip-flop 798 (FIG. 9D) to its ONE state. The resulting signal on output line 822 from the ONE side of clear flip-flop 798 is applied through OR gate 744 and line 746 to one input of AND gate 748. When another load operation is not being performed or about to be performed, this AND gate is fully conditioned to set load-ID-control flip-flop 350 to its ONE state.

Since the load-clear key is struck after the ID has been loaded, the count in character counter 726 and data line counter 734 when this key is struck will depend on the length of the stock ID. From previous discussion it will be remembered that if the new stock ID is four characters in length the count in character counter 726 will be zero and the count in the data line counter 734 will be the line following that on which the ID is entered. For a full-or-bid-ask type entry this would be a count of two. For a three character ID, the character counter would, at this time, have a count of three in it, and the data line counter would be set to the line on which the stock ID was recorded.

The clear operation is the same no matter where it is begun. Assume, for example, that a three character ID was used so that there is a count of 3 in character counter 726. An address compare will then occur at the first address at which it is desired to erase a character. Since the buffer 740 was reset at the end of the last operation it is empty at this time and therefore, when AND gate 754 (FIG. 9G) is fully conditioned to generate output signal on line 770, a zero character is loaded into the position then being written on the drum 18. This effectively erases any character which was recorded at that position. The signal on line 770 also increments character counter 726 to a count of zero and, since there is a signal on three-count decode output line 786 (FIG. 9J) and from AND gate 784, AND gate 810 is also conditioned to generate an output signal on line 812 to increment data line counter 734 to the line following the line on which the ID is recorded. Last-price-clear flip-flop 724 is also set to its ONE state and, under conditions previously mentioned, the record line counter is incremented. Since clear flip-flop 798 is in its ONE state, AND gate 800 is not fully conditioned and there is, therefore, no output signal from OR gate 794 to reset the clear and load-ID-control flip-flops. The next successful comparison in compare circuit 758 will occur when the character 0 position of the data line following that on which the ID was recorded is being written into. The resulting output signal on line 770 will cause a zero to be read into this character position, effectively erasing the character. It will also cause buffer 740 to be reset and character counter 726 to be incremented to a count of one.

Successful comparisons on succeeding characters in address compare circuit 758 will result in the remaining characters of the data line being erased until the third character on this data line is being erased. Under these conditions, there is a signal online 786 from the three-count decode AND gate which, in conjunction with the signal online 770, fully conditions AND gate 810 to increment the data line counter. The character counter is also incremented to a count of zero by the signal on-line 770. At character 3 time a signal also appears on character 3 line 826 from the program counter which signal is applied as one input to AND gate 828 (FIG. 9N). Line 770 is a second input to this AND gate and a third input to this AND gate is ONE-side output line 830 from last-price-clear flip-flop 724. The final input to AND gate 828 is output line 730 from the ONE side of load-last-price flip-flop 718 (FIG. 9U). Therefore, if a load-last-price operation is being performed, so that it is only desired to clear the last price line following the stock ID, AND gate 828 is fully conditioned after the data line following the stock ID has been cleared to generate an output on line 832 which is applied through OR gate 794 and line 796 to reset the clear flip-flop and the load-ID-control flip-flop to their ZERO state. This effectively completes the loading of the new stock ID. A last price for the new stock ID will be recorded on the board the next time that a transaction for this stock appears on line 40.

If, on the other hand, a load-full-or-bid-ask operation is being performed, the data line counter is incremented to a count of three at this time and the load flip-flop is still in its ONE state. The loading of zeros into data line three of the selected entry thus proceeds as the count in character counter 726 is incremented to cause address compares in address compare circuit 758 to occur on succeeding character positions. At character three time of data line 3, AND gate 810 is again fully conditioned, causing the data line counter to be incremented to a count of four. Data line 4 of the selected entry, data line 5 of the selected entry, and data line 6 of the selected entry are erased by having blanks loaded into them in a manner identical to that described above for data lines 2 and 3. When the erasing of data line 6 has been completed, signals appear on data line 6 line 326, and character 3 line 826 from the program counter. These signals are applied as two inputs to AND gate 834 (FIG. 9N). The other inputs to this AND gate are line 770 and output line 776 from the ONE-side of load-full-and-bid-ask flip-flop 712 (FIG. 9U). When AND gate 834 is fully conditioned, a signal appears on output line 836 which is applied through OR gate 794 and line 796 to reset the clear and load-ID-control flip-flops. The loading of a full-and-bid-ask change is thus completed. New data for the new stock ID in the price and bid-ask areas of the drum will be loaded when a new transaction on the newly loaded stock appears on line 40. Since close and unison messages are only received at the beginning of a day, if the change is not made before this time, the open and close, and possibly the high and low, prices will remain blank on the new stock.

There are four areas of drum 18 the loading of which has not yet been described. The first of these areas, the customer ID directory, is a single track which contains the name of each customer whose portfolio it is desired to display in the format shown in FIG. 6 followed by the address in the customer portfolio area of the drum where the portfolio for the particular customer is stored. The loading of the customer ID directory is an off-line operation which is performed by use of standard drum loading techniques during hours when no information is being applied to line 40. The customer portfolio area of the drum contains the information, for each of a selected group of customers of a particular broker. While certain portions of these data could be loaded on an online basis such as, for example, the current price, the circuit complexity required to do so does not seem justified. This portion of the drum would therefore also be loaded, using standard drum loading techniques, on an off-line basis during hours when information is not being applied to the system.

Figure 7:
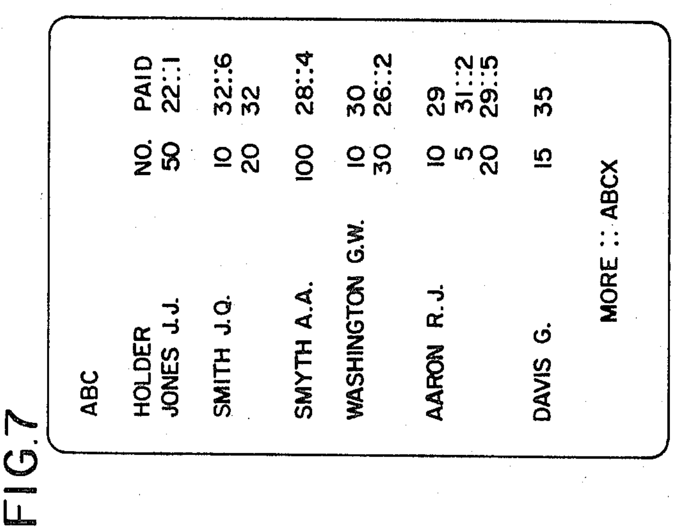

The stock ID directory is also a single track which contains a listing of all stocks which are to be displayed in the format shown in FIG. 7, each stock ID being followed by the address in the stock-v-customer storage area of the drum at which the list of customers holding the stock is stored. The stock-v-customer area of the drum contains the information shown in FIG. 7 for each of a selected group of stocks. Both the stock ID directory and the stock-v-customer area of the drum are loaded, using standard drum loading techniques, on an off-line basis during hours when information is not being applied to line 40.

OUTPUT FOR DISPLAY

Stockboard

A plurality of display devices 10A (FIG. 9W) are provided which are scanned under control of signals on lines 13 from sweep control circuits 11. Because of variations in CRT parameters, and other factors, a separate sweep control circuit would probably be required for each tube with only power supplies being shared. However, with suitable elements a greater sharing of elements in the sweep control circuits may be possible. While in accordance with the teachings of this invention the various display devices may display any one, or any combination of the various types of information stored on drum 18, for the purpose of illustration the board display devices 10A will be limited to displaying the information in the price storage area, the information in the bid-ask-volume storage area or the information in the last-price area. The operator decides which of these three types of displays he wishes by depressing one of three keys on keyboard 20 (FIG. 9S). If the operator wishes to display information in the form shown in FIG. 2, he depresses the display-price key, causing an output signal on line 840 which is applied to set display-price flip-flop 842 (FIG. 9V) to its ONE state and is also applied through OR gate 844 and OR gate 846 to reset display-bid-ask flip-flop 848 and display-last-price flip-flop 850 respectively to their ZERO state. Output line 852 from the ONE side of display-price flip-flop 842 is connected as one input to AND gate 452, the other input to this AND gate being the before-mentioned output line 28 from inverter 450. It will be remembered that the signal on line 28 is used to control the blinking of the trends character of a new display. Output line 854 from AND gate 452 is connected as the conditioning input to gate 856. The information input to gate 856 is output line 190 from the read head of the selected track in the price storage area of drum 18. Intensity input line 14A to display device 10A is the output line from gate 856. The desired price information in the format shown in FIG. 2 is in this manner applied to the display device.

If the operator wishes instead to display information in the bid-ask format shown in FIG. 3, he depresses the display-bid-ask key on keyboard 20 resulting in an output signal on display-bid-ask line 858. The signal online 858 is connected to set display bid-ask flip-flop 848 to its ONE state and is also applied through OR gate 846 to reset display-last-price flip-flop 850 to its ZERO state and through OR gate 860 to reset display-price flip-flop 842 to its ZERO state. Display-bid-ask flip-flop 848 being in its ONE state results in a signal on ONE-side output line 862 which is applied as the conditioning input to gate 864. The information input to gate 864 is output line 866 from the read head of the selected track in the bid-ask-volume storage area of drum 18. Intensity input line 14A to display device 10A is the output line from gate 864. The desired bid-ask-volume display of FIG. 3 is thus achieved on display device 10A.

If the operator wishes a last-price display, a display-last-price key on keyboard 20 is depressed, resulting in an output signal on display-last-price line 868. The signal on line 868 is applied to set display-last-price flip-flop 850 to its ONE state and is also applied through OR gates 844 and 860 to reset display-bid-ask flip-flop 848 and display-price flip-flop 842 respectively to their ZERO state. Display-last-price flip-flop 850 being in its ONE state results in a signal on ONE-side output line 872. The information input to gate 872 is output line 192 from the last-price area of drum 18. Intensity input line 14A to display device 10A serves as the output line from gate 872. The desired last-price display in the format shown in FIG. 4 is in this manner achieved on the display device.

At this point it should be noted that there is in fact a gate 856, a gate 864, and a gate 872 for each track in the corresponding storage areas of drum 18, and that there is a track in each of these storage areas for each display device 10A. All of these gates would be conditioned when the corresponding flip-flop is set and either additional gating circuitry would be required to cause the flashing trends indication on the proper display device or a flash trends circuit 30 (FIG. 1) would be required for each display device. The latter would, of course, be the preferable arrangement since it would improve the likelihood of the flash occurring for the full period indicated by timer 430 (FIG. 9Y).

Display All Transactions

Again, for purposes of illustration, a single display device 10B (FIG. 9W) has been provided which may be utilized to display either an all-transactions display on a single stock, a customer portfolio display such as is shown in FIG. 6, or a stock versus customer display such as is shown in FIG. 7. If the customer wishes an all-transactions display on display device 10B, a display-all-transactions key on keyboard 20 (FIG. 9S), is depressed resulting in an output signal on display-all-transactions line 874 which signal is applied to set display-all-transactions flip-flop 876 (FIG. 9U) to its ONE state and to reset display portfolio-or-alarm flip-flop 878 to its ZERO state. The signal on ONE-side output line 880 from display-all-transactions flip-flop 876 is applied as the conditioning input to gate 882 (FIG. 9W). The information input to gate 882 is output line 824 from the all-transactions track on drum 18. Intensity input line 14B to display device 10B is the output line from gate 882. It is thus seen that the desired all-transaction display on display device 10B is achieved when flip-flop 876 is set to its ONE state.

Display Portfolio

If a particular customer contacts the broker, or if the broker desires to contact a particular customer, and the broker requires an instantaneous display of the customer's portfolio in order to provide more meaningful advice to the customer, the broker first depresses the display-portfolio key on the keyboard (FIG. 9S) resulting in an output signal on line 884 which is applied to set portfolio flip-flop 886 (FIG. 9T) to its ONE state. Either before or after depressing the display-portfolio key, the operator depresses a display-clear key on the keyboard which results in an output signal on line 888 which is applied to reset N-character buffer 890 (FIG. 9N). The operator then keys in the name of the customer whose portfolio it is desired to retrieve, starting with the customer's last name and then following with either the customer's first name or the customer's initials. As the key for each character of the name is struck, coded signals are applied through lines 738 to be stored in the rightmost character position of buffer 890. A shift left operation occurs in the buffer as each new character is applied. Portfolio flip-flop 886 being in its ONE state results in a signal on ONE-side output line 892 which is applied as a conditioning input to gate 894 (FIG. 9M). The information input to gate 894 is output line 896 from the customer-ID directory track of drum 18. The output from gate 894 is applied, a bit at a time, through line 898 to be shifted into (N+1)-character compare buffer 900. Bits are shifted into buffer 900 from right to left. Each customer ID on the customer-ID directory track of drum 18 is preceded by a unique start-of-name (SON) character and is terminated by a unique end-of-name (EON) character. The contents of the rightmost character position of buffer 900 are applied through lines 902 to a SON decode AND gate 904 and EON decode AND gate 906. When the SON code is detected in this character position, AND gate 904 generates an output signal on line 908 which signal is applied to reset all characters in buffer 900 including the start-of-name character.

The characters of the name are then shifted into buffer 900 until the end-of-name character is detected in the rightmost character position at which time EON decode AND gate 906 is fully conditioned to generate an output signal on line 910. This signal is applied as one input to AND gate 912 (FIG. 9N). The characters other than the rightmost character in buffer 900, or in other words, all characters in the buffer except the end-of-name character, are applied through lines 914 as one set of inputs to compare circuit 916. The other set of inputs to this compare circuit are the output lines 918 from N-character buffer 890. It should be noted that there will be a number of zero characters on the left-hand side of buffer 900 depending on how much shorter the customer's name is than N-characters. However, since characters are also shifted into buffer 890 from right to left, there will be alike number of zero positions on the left-hand side of this buffer and the zeros will therefore not in any way affect the compare operation. Compare circuit 916 generates an output signal on line 920 when the instantaneous inputs applied to its two sets of input are the same. Line 920 is connected as a second input to AND gate 912. The other input to AND gate 912 is output line 892 from the ONE side of portfolio flip-flop 886. When drum 18 has rotated to a position such that the customer ID read from the customer-ID directory track on drum 18 is the same as the customer identification stored in character buffer 890, AND gate 912 is therefore fully conditioned to generate an output signal on line 922 which is applied to set flip-flop 924 to its ONE state, to reset portfolio-address register 926, to reset portfolio flip-flop 886, and to set portfolio compare flip-flop 928 to its ONE state.

Flip-flop 924 being in its ONE state results in a signal on ONE-side output line 930 which is applied as the conditioning input to gate 932. The information input to gate 932 is the before-mentioned output line 896 from the read head of the customer ID directory track. Therefore, one flip-flop 924 is set, the address information following the matched-on customer ID is passed through gate 932 and line 934 to be stored in portfolio address register 926. When the entire address has been read into register 926 a signal appears on register-full output line 936 which signal is applied to reset flip-flop 924 to its ZERO state. The resetting of flip-flop 924 inhibits the application of further inputs to register 926.

The track portion of the address in register 926 is applied to tracks-select circuit 938. There is an output line 940 from circuit 938 corresponding to each track in the customer-portfolio area of drum 18. The lines 940 are applied as information inputs to gates 942 (FIG. 9T). The remaining portion of the address in register 926 is applied as one set of inputs to compare circuit 944. The other set of inputs to this compare circuit are program counter output lines 36. When the drum has advanced to the desired position for read out, compare circuit 944 generates a match signal on line 946 which is applied as one input to AND gate 948. The other input to AND gate 948 is ONE-side output line 950 from portfolio-compare flip-flop 928. The output signal on line 952 from AND gate 948 is applied as the conditioning input to gate 942 to cause the signal on one of the lines 940 to be passed through the corresponding line 954 to gating circuit 956 (FIG. 9V). The conditioning of one of the gates in gating circuit 956 by a signal on a line 954 permits the customer portfolio information on the appropriate track in the customer-portfolio area of drum 18 to be passed through one of the lines 958, the conditioned one of the gates in gating circuit 956, and line 960 to be recorded on the display track of drum 18. Output line 962 from the read head of the display track is applied as the information input to gate 964. The signal on output line 952 from AND gate 948 (FIG. 9T) is also applied to reset portfolio compare flip-flop 928 to its ZERO state and through OR gate 966 (FIG. 9U) and line 968 to set display-portfolio-or-alarm flip-flop 878 to its ONE state and to reset display-all-transaction flip-flop 876 to its ZERO state. ONE-side output line 970 from display-portfolio-or-alarm flip-flop 878 is applied as the conditioning input to gate 964. The resetting of display-all-transactions flip-flop 876 deconditions gate 882. The portfolio display information passing through gate 964 is therefore the only information on intensity input line 14B to display 10B. The desired portfolio display on display device 10B is in this manner achieved.

Display Alarm

Assume now that news comes in to the broker's office that company ABC has just lost a large government contract or come out with an unfavorable earnings report or some other news which would indicate immediate action on the part of an customer holding the stock. The broker would like to be able to immediately contact customers holding this stock so as to advise them on an appropriate course of action. The display-alarm circuitry provides this capability. The broker would again hit the display clear key on keyboard 20 causing a signal to appear on line 888 which resets N-character buffer 890 (FIG. 9N). He would then depress a display-alarm key on the keyboard causing a signal to appear on display-alarm line 974 which signal is applied to set alarm flip-flop 976 (FIG. 9T) to its ONE state. The operator would then depress the appropriate keys in the alpha portion of keyboard 20 to store the characters of the desired stock ID in N-character buffer 890. The characters in buffer 890 are applied through line 918 as one set of inputs to compare circuit 978.

The signal on ONE-side output line 980 from alarm flip-flop 976 is applied as the conditioning input to gate 982 (FIG. 9T). The information input to gate 982 is output line 984 from the read head of the stock ID directory track of drum 18. Gate 982 being conditioned permits the stock ID's on this track to be applied through line 898 to be shifted into buffer 900. As with the customer ID directory, each stock ID is preceded by the unique start-of-name (SON) code and each stock ID is preceded by the unique end-of-name (EON) code. Each time the start-of-name code is detected in the rightmost character position of buffer 900, AND gate 904 generates an output signal on line 908 to reset all of the characters in buffer 900. The stock ID which follows is loaded into the buffer, and, when the EON character has been loaded into the rightmost position of the buffer, AND gate 906 generates an output signal on line 910 which is applied as one of the inputs to AND gate 986 FIG. 9N). The remaining characters in buffer 900 at this time are applied through lines 914 as the second set of inputs to compare circuit 978. When drum 18 has rotated to a point where the desired stock ID is read into buffer 900, a successful comparison occurs in compare circuit 978 resulting in a signal on match line 988 from compare circuit 978. The signal on match line 988 in conjunction with the signal on line 910 and a signal on ONE-side output line 980 from alarm flip-flop 976 fully conditions AND gate 986 to generate an output signal on line 990 which signal is applied to reset all of the characters in alarm-address register 992 (FIG. 9D), to set flip-flop 994 to its ONE state, to reset alarm flip-flop 976 to its ZERO state, and to set alarm-compare flip-flop 996 (FIG. 9U) to its ONE state.

Flip-flop 994 being in its ONE state causes a signal to appear on ONE-side output line 998 which is applied as conditioning input to gate 1000. The information input to gate 1000 is output line 984 from the read head of the stock-ID directory track of drum 18. Therefore, when flip-flop 994 is in its ONE state, the address characters following the matched-on stock ID are passed through gate 1000 at line 1002 to be stored in succeeding positions of alarm-address register 992. When the complete address has been read into this register, a signal appears on register-full output line 1004 which signal is applied to reset flip-flop 994 to its ZERO state.

The track portion of the address in register 992 is applied through lines 1006 to tracks-select circuit 1008. There is an output line 1010 from tracks-select circuit 1008 corresponding to each track in the stock-v-customer storage area of drum 18. The lines 1010 are applied as the information inputs to gates 1012. The remaining portions of the address in register 992 are applied through lines 1014 to one set of inputs of compare circuit 1016. The other set of inputs to compare circuit 1016 are output lines 26 from program counter 34. When the program counter has reached the address stored in alarm-address register 992, compare circuit 1016 generates an output signal on line 1018 which signal is applied to one input of AND gate 1020. The other input to AND gate 1020 is output line 1022 from the ONE side of alarm-compare flip-flop 996. A signal on output line 1024 from AND gate 1020 is applied to reset alarm-compare flip-flop 996 to its ZERO state and is also applied through OR gate 966 and line 968 to set display-portfolio-or-alarm flip-flop 878 to its ONE state and to reset display-all-transactions flip-flop 876 to its ZERO state. The signal on line 1024 is also applied as the conditioning input to gates 1012. This permits the track address information on lines 1010 to be applied through lines 1026 to gating circuit 1028 (FIG. 9V). Since there is a signal on only one of the lines 1026, one of the gates in gating circuit 1028 is conditioned to pass the stock-versus-customer information being read from the selected track in the stock-versus-customer area of drum 18 through a line 1030 the conditioned gate of the gates 1028 and line 960 to be recorded on the display track of the drum. The recording of new information on the display track erases any previous information which was stored there. Output line 962 from the read head of the display tracks is the information input to gate 964. The conditioning input to this gate is output line 970 from the ONE side of display-portfolio-or-alarm flip-flop 878. The desired stock-versus-customer information in the format shown in FIG. 7 is thus passed from the display track through conditioned gate 964 to intensity input line 14B for display device 10B. The desired alarm display is in this manner achieved.

Possible Variations

Many possible variations on the circuit shown in FIGS. 9A—9Y have been mentioned in the preceding sections. Among these, it has been noted that separate display devices could be provided for each type of information stored on drum 18 or that the items which may be displayed on any given display element may be grouped in any desired fashion. For example, full price and last price could appear on one group of display elements, bid-ask and all transaction on another group, with customer portfolio and alarm appearing on a third group of display devices. The particular information which is displayed, both in the customer portfolio and in the display alarm formats (FIGS. 6 and 7) may, of course, be varied in accordance with the desires of the user. The search for a customer portfolio may be made, for example, on customer number rather than customer name. Other types of displays might also be employed, either in supplement to, or in substitute for, the ones mentioned above in conjunction with FIGS. 9A—9Y. For example, instead of a close bid-ask volume last display, the display might be 11, 12, 1, 2 and last. Instead of portfolio and alarm, other types of information may be displayed such as complete financial information on a selected stock. The form in which information is stored on magnetic drum 18 may also be varied. For example, instead of grouping the information in areas by display form, the information may be grouped by display device. By modifying the circuitry somewhat, it may also be possible to store particular information on a stock, such as last price, and assemble this information into a message to be displayed in a desired form. The assembled information may, for example, be stored on a display track. Another possible modification might be to group the stocks on a track by subject matter as for example, rails, airlines, etc. By making a suitable entry on a keyboard, the operator can then switch from, for example, a display of information on rail stock to a display of information on airline stocks.

As was mentioned previously, the system is of course not limited to applications in the financial community. For example, the system might be utilized by an airline to cause the display of reservation and related information. In such an application, the display device 10A might be used to display departure and arrival time for various flights while the displays 10B are being utilized to retrieve information as to available seats on a particular flight. Other applications in the commercial or military fields are also possible.

As mentioned previously, various limitations on the selection of the stock for the all-transactions display might be eliminated by making suitable modifications in the circuit so that, for example, the stock may be selected from any display and/or from any word position of a display device. The circuit may also be modified to display only selected transaction, such as every other transaction or every fifth transaction, on the stock. This modification could be accomplished by utilizing the output from AND gate 642 (FIG. 9B) to increment a counter and setting erase marker flip-flop 610 to its ONE state in response to an output from AND gate 642 and the counter reaching a predetermined count. Another possible modification would be to provide a real-time clock in the system which would permit the time of each transaction to be stored either instead of, or in addition to, volume. Circuitry could then be provided to permit the retrieval of transactions during a given time interval.

The circuit may also be expanded to provide a graphic capability whereby the information displayed in tabular form in FIG. 5 is also displayed graphically. Circuitry for achieving this is shown, for example, in copending applications, Ser. No. 609,381 entitled "Data Display System" filed Jan. 16, 1967 on behalf of C. Greenblum and assigned to the assignee of the instant application.

Additional comparison and gating circuitry could be provided to free the bid-ask-volume display from the full display so that different stocks may appear in each and the flashing trends marker may be caused to appear in any one or all of the displays. Information other than trends may also be displayed and/or flashed. Attention may also be attracted to a particular stock display by providing the display with some form of unique appearance other than a flashing trends indicator. Any character or group of characters in the display could be caused to flash, or where a multicolor tube is available, attention could be attracted by presenting one or more of the characters of the stock display in a different color. These capabilities could be provided by straight forward extensions to the circuitry shown.

Turning to the hardware, it is of course apparent that a rotating disc, a recirculating delay line, or any other circulating type memory device could be utilized in place of the drum 18. With suitable changes in the circuitry, other forms of memory might also be employed. For example, if means were provided to read and write the positions therefrom in a sequential manner, a magnetic core memory might also be employed. Similarly while cathode-ray tubes have been indicated as the display devices in the preferred embodiment of the invention, it is apparent that, with suitable straight forward modifications to the circuitry, other forms of display elements could be employed. Another possible modification would be to control the system in response to computer outputs rather than from a keyboard. Other suitable forms of automatic or manual input might also be employed.

While the invention has been particularly shown and described with reference to a preferred embodiment therefor, it will understood by those skilled in the art that the foregoing and other changes in form and details may be made therein without departing from the spirit and scope of the invention.

We claim:

1. A system for storing and displaying selected items of information in at least two different forms comprising:

a plurality of display devices; an addressable memory element having a separate identifiable position for each item in each of the forms in which it is to be displayed in which is stored all of the information to be displayed for the item in the given form;

means for controlling the form of the information displayed on each of said display devices, said control means including means for varying the display form on at least one of said display devices;

means for sequentially applying information of various types to said system;

first means for selecting the items of the information which are to be stored, and which may be displayed, in each of said forms; and second means for selecting, from the information applied to said system, the information relating to the items selected by said first selecting means, and for storing said first selecting means, and for storing the selected information in appropriate positions of said memory element.

2. A system of the type described in claim 1 wherein said positions are grouped into a plurality of storage sections, the information for a particular form which is to be displayed on a given display device being stored in an identifiable one of said storage sections.

3. A system of the type described in claim 2 wherein said memory element is a cyclically readable memory having information to be displayed on a given display device in a first form stored in a first section thereof and information to be displayed on said display device in a second form stored in a second section; and wherein said form controlling means includes means for varying the section of said memory element from which information to be displayed on said display device is derived.

4. A system of the type described in claim 3 wherein said memory element is a magnetic drum; and wherein said sections are tracks on said magnetic drum.

5. A system of the type described in claim 2 wherein said first selecting means includes means for storing an item identifying code with each item of information stored in a section of said memory element wherein:

item identifying codes are included with the information applied to the system by the information applying means; and wherein said second selecting means include means for comparing the item identifying code of information applied to the system with item identifying codes stored in said memory element, and means responsive to a match in said comparing means for selectively storing the information applied to the system in one or more sections of said memory element.

6. A system of the type described in claim 5 wherein the information applied to the system by said information applying means is broken down into messages each of which includes an item identifying code, a control code, and at least one additional piece of information; and wherein the means for selectively storing information includes means responsive to the control code in each message for controlling the sections in said memory in which the additional pieces of information of the message are stored.

7. A system of the type described in claim 6 wherein each item of information in a section of said memory element contains an item identification code and a plurality of additional pieces of information;

wherein an additional piece of information in a message applied to the system may replace one or more of the additional pieces of information of the items having a matching item identification code; and wherein the means for selectively storing information includes means responsive to the message control code for controlling which additional pieces of information in the items are replaced.

8. A system of the type described in claim 7 wherein said form controlling means includes means for applying the output from a selected section of said memory element to control the display on a corresponding display device.

9. A system of the type described in claim 8 including means for detecting when a change has occurred in an additional piece of information of an item in a section of said memory element; and means responsive to said detecting means for causing the display of the item to have a unique appearance.

10. A system of the type described in claim 9 wherein said unique appearance causing means includes means for causing some portion of the display for the item to have a flashing appearance.

11. A system of the type described in claim 2 wherein the information applied to the system by said information applying means is broken down into messages each of which includes at least an item identifier and one piece of additional information;

including means for selecting an item having a particular item identification code;

means for recognizing when a message containing the particular item identification code is applied to the system; and means responsive to said recognizing means for storing additional information from at least selected ones of said recognized messages as succeeding items in a predetermined section of said memory element.

12. A system of the type described in claim 11 wherein said form control means includes means for indicating that a display of information on the selected item is desired; and means responsive to said indicating means for applying the information stored in said predetermined section of the memory element to control the display on a selected display device.

13. A system of the type described in claim 11 wherein said storing means includes means for generating a unique mark to be stored with an item in the section;

means for detecting said mark on an item; and means responsive to the detection of the mark and to said recognizing means for erasing the detected mark and for storing the new information and the mark as the item following that containing the erased mark.

14. A system of the type described in claim 2 wherein each item of information stored on a section of said memory element includes an item identification code and at least one additional piece of information; and wherein said first selecting means includes means for indicating the item which it is desired to change the identification code for means for entering the new identification code into the system, and means for erasing the indicated item and for recording the new identification code as the identification code for the indicated item.

15. A system of the type described in claim 14 wherein, for each item having a given item identification code in a first section of said memory element, there is a corresponding element having the same item identification code in a second section, the additional pieces of information stored with the item identification codes in the two sections being different; and wherein said first selecting means is operative, when energized to cause a change in the item identification code of and item in the first section, to cause a like change in the identification code of the corresponding item in the section.

16. A system of the type described in claim 14 wherein said item identifying means includes means for indicating the form, and therefore the section, for the item in which the change is to be made.

17. A system of the type described in claim 14 wherein each display device has a plurality of item displaying positions; and wherein each item of a section is applied to control the display of a corresponding item on a device.

18. A system of the type described in claim 17 wherein said indicating means includes means for identifying an item by its position on a display device, which item it is desired to change the item identification code of; and means for decoding said item display position to identify an item stored on a section of said memory element.

19. A system of the type described in claim 14 wherein each item identification code is made up of one or more characters; and wherein said recording and erasing means includes means responsive to the entering of the first character of a new item identification code into the system for recording the character in place of the first character of the item identification code of the indicated item and for erasing the remaining characters of the indicated item item identification code.

20. A system of the type described in claim 19 wherein said recording and erasing means includes means for indicating that the additional pieces of information for the indicated item are to be cleared, and means responsive to said clear indicating means for erasing said additional pieces of information.

21. A system of the type described in claim 1 wherein each display device has a plurality of item displaying positions; and wherein each item of a position is applied to control the display of a corresponding item on a display device.

22. A system for displaying items of information in at least two different forms comprising:

a plurality of display devices;

an addressable memory element having a separate identifiable position for each item in each of the forms in which it is to be displayed in which is stored all of the information to be displayed for the item in the given form;

means for selecting the form in which information is to be displayed on a given display device; and means responsive to said selecting means for gating information in the selected form from appropriate positions in the memory element to control the display on the given display device.

23. A system of the type described in claim 22 wherein said memory element is divided into sections with each section containing information to be displayed in a different one of said forms; and wherein said gating means varies the form of the display by changing the section of the memory element from which information to control the display on the given display device is derived.

24. A system of the type described in claim 23 wherein said memory element is a cyclically readable memory having a track in each section corresponding to each display device which is to display information in the form of the section; and wherein the information in each address position of a track operates under control of the gating means to control the display at a corresponding position of the corresponding display device.

25. A system of the type described in claim 22 including means for indicating that attention is to be attracted to a particular displayed item; and means, including in particular said gating means, operative in response to an indication from said indicating means for causing the display of the particular item to have a unique appearance.

26. A system of the type described in claim 25 wherein each item of information is made up of a plurality of characters; and wherein said unique appearance causing means includes means operative at selected ones of the times that at least one character of the particular item is being applied to the gating means for deconditioning the gating means, whereby the display of said at least one character is caused to have a flashing appearance.

27. A system of the type described in claim 22 wherein said memory element includes a directory indicating the positions in the memory element at which particular items of information in a particular form are stored; and including means for indicating a particular item on which information is desired;

means responsive to the selecting of said particular form by the form selecting means for comparing the indicated item against items stored in said directory; and means responsive to a successful comparison in said comparing means for permitting said gating means to apply the information at the position indicated for the matched on item in the directory to control the display at a display device.

28. A system of the type described in claim 27 wherein said memory element is a cyclically readable memory having a plurality of tracks, with said directory appearing on one or more tracks, said positions at which particular items of information are stored appearing on an additional one or more tracks, and another track being utilized as a display track; and wherein said means responsive to a successful comparison includes means for transferring the contents of said indicated position to said display track, and means for gating the contents of said display track to control the display at said display means.

29. A system of the type described in claim 22 wherein said display devices are cathode ray tubes (CRT's) having a viewing screen.

30. A system of the type described in claim 29 wherein said memory element is a cyclically readable memory having a plurality of tracks, there being an individual track corresponding to each form which may appear on each display device, and a plurality of individual bit positions on each track;

wherein each item of information is made up of a plurality of characters;

wherein characters are formed on the screen of said CRT by sweeping the screen with at least one horizontal sweep having a plurality of strokes, and selectively intensifying the screen at bit index positions of each stroke to form the character as a bit matrix pattern; and wherein said gating means passes the bits of a single track to control the display on a given CRT, with each bit position of the track controlling the intensification of a corresponding index bit position on the CRT screen.

31. A system for storing and displaying information on selected stocks in a plurality of different forms comprising: a plurality of display devices;

an addressable memory element having a separate identifiable position for each stock in each of the forms in which it is to be displayed in which is stored all of the information to be displayed for the stock in the given form;

means for controlling the form in which the information on the stocks is to be displayed on each of said display devices, said control means including means for varying the display form on at least one of said display devices;

means for sequentially applying stock transaction information of various types to said system;

first means for selecting the stocks on which information is to be stored and which may be displayed, in each of said forms; and second means for selecting, from the stock transaction information applied to said system, the information relating to the stocks selected by said first selecting means, and for storing information on the selected stocks in appropriate positions of the memory element.

32. A system of the type described in claim 31 wherein said positions are grouped into a plurality of storage sections, the information for a particular form which is to be displayed on a given display device being stored in an identifiable one of said storage section.

33. A system of the type described in claim 32 wherein said selecting means include means for storing a stock identification code with the information on a stock in each section of the memory element in which information on the stock appears;

wherein stock identification code is included with each stock transaction applied to the system by said information applying means; and wherein said second selecting means includes means for comparing the stock identification code of a transaction applied to the system with the stock identification codes stored in said memory element; and means responsive to a match in said comparing means for selectively storing the stock transaction information applied to the system in one or more sections of said memory element.

34. A system of the type described in claim 33 wherein the information on each stock transaction applied to the system is contained in a message which includes a stock identification code, a control code and at least one additional piece of information; and wherein the means for selectively storing information includes means responsive to the control code in each message for controlling the sections in said memory in which the additional pieces of information of the message are stored.

35. A system of the type described in claim 34 wherein the stock transaction messages applied to the system are of at least two types, a first type for which an additional piece of information is a price for the stock transaction and a second type for which additional pieces of information are a bid price and an ask price.

36. A system of the type described in claim 35 wherein the form of display of information in one section of said memory includes the price of the stock and wherein the form of display in a second section of said memory includes the bid price and ask price on each stock; and wherein said section control means operates in response to the control code in each of the messages to store the price in a message of the first type in said first section and to store the bid price and ask price in a message of said second type in said second section.

37. A system of the type described in claim 36 wherein a message of the first type includes as an additional piece of information the volume for the stock transaction; and wherein said section controlling means is operative to store the volume in a message of the first type in said second section.

38. A system of the type described in claim 33 wherein said comparing means includes a first comparing means for comparing the stock identification code of a transaction applied to the system with the stock identification codes stored in a first section of said memory element and a second comparing means for comparing the stock identification code of a transaction with a stock identification code stored in a second section of said memory; and wherein said means for selectively storing includes means responsive to a match in said first comparing means for storing stock transaction information in said first section and means responsive to a match in said second section for storing the stock transaction information in said second section.

39. A system of the type described in claim 38 wherein said first section stores information in a close, open, high, low, last form and said second section stores information in a last price only form:

wherein said memory element is an addressable cyclically accessible memory having information on each stock in each section stored at an addressable position thereof;

including means for detecting the addressable position in said memory element at which a match is had in said first comparing means;

means for detecting the addressable position at which a match is had in said second comparing means; and wherein said stock transaction information storing means includes means for storing information at the addressable position indicated in the corresponding detecting means.

40. A system of the type described in claim 34 wherein the information on a stock in a given section of the memory element includes a stock identification code and a plurality of additional pieces of information:

wherein an additional piece of information in a message applied to the system may replace one or more of the additional pieces of information for the stock having a matching stock identification code; and wherein the means for selectively storing information includes means responsive to the message control code for controlling which additional pieces of information relating to the stock are replaced.

41. A system of the type described in claim 40 wherein information is stored in a first section of said memory element in close, open, high, low, last form:

wherein a message applied to the system with a first control code has as an additional piece of information a last price for the stock identified in the message, a message applied to the system with a second control code has as an additional piece of information a price which is a last price for the stock and is also the stock's high price for the day, and a message applied to the system with a third control code has as an additional piece of information a price which is both the last price and the low price on the identified stock for the day; and wherein the means for controlling the additional pieces of information which are replaced includes means responsive to the first control code for storing the price contained in the message in the last price position for the stock in the given section, means for storing the price in a message having said second control code in the high price position for the stock in the given section and for then storing the piece in the last price position as well, and means responsive to said third control code for storing the price in the message in the low price position for the stock in the given section and for then storing the price in the last price position as well.

42. A system of the type described in claim 41 wherein information on a stock in the close, open, high, low, last form is stored on a plurality of lines with each of the above items of information being stored on an individual data line; and wherein said means for controlling information replaced includes an entry line counter, means for initially setting said entry line counter to the data line where the price in the message is to first be recorded and means operative after the recording of the price on the indicated line and responsive to the control code for incrementing said entry line counter by an appropriate amount to indicate the next line on which the price in the message is to be recorded.

43. A system of the type described in claim 41 wherein information on a stock in the close, open, high, low, last form is stored on a plurality of lines with each of the above items of information being stored on an individual data line:

wherein a message applied to the system with a fourth control code is a unison message the price for which is to be recorded as an open, high, low and last price for the stock; and wherein said means for controlling information replaced includes means responsive to said fourth control code for causing the price in the message to be first recorded on the open data line for the stock in the section, to then be recorded in succession on the high data line, the low data line, and the last data line for the stock.

44. A system of the type described in claim 41 wherein a message applied to said system with a fifth control code is a close message which contains the price at which the stock identified in the message closed the previous day; and wherein said means for controlling information replaced includes means responsive to said fifth control code for recording the price in the message as a close price for the indicated stock.

45. A system of the type described in claim 34 wherein an additional piece of information in a message is a last price for the transaction on the identified stock; and including means responsive to the reception of a message containing a last price for an identified stock for causing the display for the identified stock to have a unique appearance.

46. A system of the type described in claim 45 wherein said unique appearance causing means includes means for causing some portion of the display for the indicated stock to have a flashing appearance.

47. A system of the type described in claim 46 wherein the information stored for each stock is made up of a plurality of characters; and wherein said flashing appearance causing means is operative to cause at least one of said characters for the identified stock to have a flashing appearance.

48. A system of the type described in claim 47 wherein an additional piece of information in the message containing a last price is a trends indicator; and wherein said flashing appearance means is effective to cause the trends indicator character to have a flashing appearance for a predetermined period of time.

49. A system of the type described in claim 33 wherein the information on each stock transaction applied to the system is contained in a message which includes a stock identification code, at least one additional piece of information, and a special character which conveys particular information concerning said additional piece of information; and including means responsive to said special character for storing a predetermined character in said memory means with the information for the stock having the same stock identification code as the input message.

50. A system of the type described in claim 49 wherein each display device has a plurality of stock displaying positions:

wherein each stock of a section is applied to control the display of a corresponding stock on a display device; and wherein the predetermined character stored in said memory means is effective to cause a corresponding character to appear adjacent to the additional piece of information in the display of the identified stock.

51. A system of the type described in claim 50 wherein said special character is a trends character indicating whether the previous change in the last price of the indicated stock was an upward change or a downward change.

52. A system of the type described in claim 33 wherein each display device has a plurality of stock displaying positions; and wherein the information stored on each stock in a section of said memory means is applied to control the display of information on the stock on a display device.

53. A system of the type described in claim 32 wherein the information on each stock transaction applied to the system is contained in a message which includes a stock identification code and at least one additional piece of information:

including means for selecting a stock having a particular stock identification code;

means for recognizing when a message containing the particular stock identification code is applied to the system; and means responsive to said recognizing means for storing additional information from at least selected ones of said recognized messages as succeeding items in a predetermined section of said memory element.

54. A system of the type described in claim 53 wherein the selected ones of said recognized messages are all messages containing said stock identification code.

55. A system of the type described in claim 53 wherein said form control means includes means for indicating that a display of information on the selected stock is desired and means responsive to said indicating means for applying the information stored in said predetermined section of the memory element to control the display on a selected display device.

56. A system of the type described in claim 53 wherein the information on each stock in a section of said memory element is applied to control the display for the identified stock on a display device:

wherein said means for selecting a stock having a particular stock identification code includes means for indicating the position on a display device where a stock having the desired stock identification appears; and wherein said recognizing means includes means for converting the display position into the stock position in a section of the memory element where the corresponding stock identification code is stored and means for detecting when a transaction having information to be stored at said stock position is applied to the system.

57. A system of the type described in claim 33 wherein the information on each stock transaction applied to the system is contained in a message which includes a stock identification code and a piece of information as to the price of the transaction:

wherein the price of a transaction may include a fraction;

including means for indicating that the price of a transaction includes a fraction; and means responsive to said indicating means for storing a special character in said memory means at the point in said price just prior to said fraction.

58. A system of the type described in claim 57 wherein said special character storing means includes means responsive to said indicating means for providing extra space between the appropriate characters of the price in which said special character may be stored.

59. A system of the type described in claim 58 wherein information is stored in said memory means and displayed on said display devices as a plurality of characters:

wherein each character is formed as five strokes with two strokes normally being provided between characters; and wherein said additional space providing means include means for providing two additional strokes, for a total of four strokes, between the two characters which said special character is to be inserted between.

60. A system of the type described in claim 32 wherein the information stored on a given stock in a section of said memory element includes a stock identification code and at least one additional piece of information; and wherein said first selecting means includes means for indicating the stock which it is desired to change the identification code for, means for entering the new identification code into the system, and means for erasing the indicated stock and for recording the new stock identification code as the identification code for the indicated stock.

61. A system of the type described in claim 60 wherein information is stored on stocks in a first section of said memory element in a close-open-high-low-last form and information is stored in a second section of said memory element in a close-bid-ask-volume-last form:

wherein there is a one to one correspondence of the stock identifications in said two sections; and wherein said first selecting means is operative, when energized to cause a change in the stock identification code of a stock in the close-open-high-low-last section of the memory element, to cause a like change in the identification code of the corresponding stock in the close-bid-ask-last volume section.

62. A system of the type described in claim 60 wherein said stock identifying means includes means for indicating the form, as well as the stock identification, in which it is desired to make the change.

63. A system of the type described in claim 62 wherein two of the forms in which stock information may be displayed are a close-open-high-low-last form and a last-price-only form; and wherein said form indicating means includes means for indicating which of said two forms the change in stock identification is to be made in.

64. A system of the type described in claim 60 wherein each stock identification code is made up of one or more characters; and wherein said recording and erasing means includes means responsive to the entering of the first character of a new stock identification code into the system for recording the character in place of the first character of the stock identification code of the indicated stock and for erasing the remaining characters of the indicated stock identification code.

65. A system of the type described in claim 64 wherein said recording and erasing means includes means for indicating that the additional pieces of information for the indicated stock are to be cleared, and means responsive to said clear indicating means for erasing said additional pieces of information.

66. A system of the type described in claim 33 wherein the information on each stock transaction applied to the system is contained in a message which includes a stock identification code and at least one additional piece of information:

including means for indicating when the stock identification of a message is applied to the system and for indicating when each additional piece of information is applied to the system;

a buffer for storing said stock identification code;

a buffer for storing each additional piece of information;

means responsive to said indicating means for gating the stock identification code and each additional piece of information into the appropriate buffer; and wherein said stock identification code conforming means includes means for comparing the stock identification code stored in said stock identification code buffer with successive stock identification codes from said memory element.

67. A system of the type described in claim 66 wherein said selectively storing means includes means for gating the information in said additional information buffer into address positions of said memory element corresponding to the address positions containing the matched-on stock identification code.

68. A system of the type described in claim 67 including a character generator for converting the information applied to the system and stored in said buffers from a transmission code to a video code form in which it is stored in said memory element.

69. A system for displaying information on a plurality of different stocks in at least two different forms comprising:

plurality of display devices;

an addressable memory element having a separate identifiable address position for each of said display devices for each of the forms in which information may be displayed on it in which is stored all of the information to be displayed on one or more selected stocks in the given form;

means for selecting the form in which information is to be displayed on a given display device; and means responsive to said selecting means for gating information in the selected form from appropriate address positions in the memory element to control the display on the given display device.

70. A system of the type described in claim 69 wherein the information stored with at least some of said stocks includes a special character having predetermined significance:

including means for detecting when said special character is being applied to said gating means;

means for indicating that it is desired to attract attention to the display of information on a particular stock; and means responsive to said indicating means for selectively deconditioning said gating means at the time that said special character for the particular stock is being applied thereto, whereby the display of said special character is caused to have a flashing appearance.

71. A system of the type described in claim 70 wherein said special character is a trends character indicating an upward or downward trend in the price for the particular stock; and wherein said indicating means includes means for detecting that a change has occurred in the information stored for the particular stock.

72. A system of the type described in claim 69 wherein said memory element includes means for storing the stock portfolios of a plurality of customers, and means for storing a directory indicating the address positions in said memory element at which the portfolio of each of said customers is stored:

including means for applying to said system an indication of a customer whose portfolio it is desired to retrieve;

means responsive to said customer indication for interrogating said directory to determine the address at which said portfolio is stored; and means for utilizing the determined address to access the stored portfolio information and for utilizing said accessed information to control the display of the desired portfolio on a selected display device.

73. A system of the type described in claim 69 wherein said memory element includes means for storing a plurality of lists, each of which indicates the customers holding a different selected stock, and means for storing a directory indicating the address position in said memory element at which each of said lists is stored:

including means for applying to said system an indication of a stock which it is desired to retrieve a customer list for;

means operative in response to the indicated stock applied to the system for determining from said directory the address position in said memory at which the list which it is desired to retrieve is stored; and means for utilizing the address obtained from said directory for accessing a list stored in said memory element and for applying the accessed list to control the display on a selected display device.

74. A system for storing and displaying selected information concerning transactions on a stock comprising:

means for applying transaction information to said system;

means for detecting when transaction information on said stock has been applied to the system;

a memory means having a plurality of individually accessible memory positions;

means responsive to said detecting means for storing selected information on selected ones of said transaction in a position of said memory means associated with said stock;

a display device;

means for indicating that a display of information concerning selected transactions on said stock is desired on said display device; and means responsive to said indicating means for applying stored information from said memory means to control the display on said display device.